(12) United States Patent
Borzycki et al.

(10) Patent No.: US 9,774,658 B2
(45) Date of Patent: Sep. 26, 2017

(54) ORCHESTRATION FRAMEWORK FOR CONNECTED DEVICES

(71) Applicant: Citrix Systems, Inc., Ft. Lauderdale, FL (US)

(72) Inventors: Andrew Borzycki, Killara (AU); Mallikharjuna Reddy Deva, Sydney (AU); Nick Bissett, Bath (GB); Anil Roychoudhry, Woodcroft (AU); Guy Bieber, Santa Clara, CA (US); Uday Nandigam Gajendar, Menlo Park, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 960 days.

(21) Appl. No.: 14/026,442

(22) Filed: Sep. 13, 2013

(65) Prior Publication Data

US 2014/0108506 A1    Apr. 17, 2014

Related U.S. Application Data

(60) Provisional application No. 61/712,948, filed on Oct. 12, 2012, provisional application No. 61/712,953, (Continued)

(51) Int. Cl.
*H04L 29/08* (2006.01)

(52) U.S. Cl.
CPC .......... *H04L 67/10* (2013.01); *H04L 67/1095* (2013.01)

(58) Field of Classification Search
None
See application file for complete search history.

(56) References Cited

U.S. PATENT DOCUMENTS 6,480,096 B1    11/2002    Gutman et al.
6,609,198 B1    8/2003    Wood et al.
(Continued)

FOREIGN PATENT DOCUMENTS

CN    1613040 A    5/2005
CN    1661610 A    8/2005
(Continued)

OTHER PUBLICATIONS

Jan. 10, 2014—(PCT) Written Opinion and International Search Report, PCT/US2013/062636.
(Continued)

*Primary Examiner* — Natisha Cox
(74) *Attorney, Agent, or Firm* — Banner & Witcoff, Ltd.

(57) ABSTRACT

Systems and methods for interconnecting devices using an orchestration framework are provided herein. An orchestration framework may be provided, and the orchestration framework may interconnect multiple of devices such that the devices are available to share content and computing activities with one another. The orchestration framework may coordinate interactions between the devices that are interconnected with each other through the orchestration framework. A request to share content may be received from one of the devices. The distribution of the content to one or more of the devices may be managed using the orchestration framework. The content may be a file uploaded to a remote data store, content stored at a clipboard that is accessible to the interconnected devices, or a link.

28 Claims, 27 Drawing Sheets

Related U.S. Application Data filed on Oct. 12, 2012, provisional application No. 61/712,956, filed on Oct. 12, 2012, provisional application No. 61/712,962, filed on Oct. 12, 2012, provisional application No. 61/824,204, filed on May 16, 2013.

(56) References Cited

U.S. PATENT DOCUMENTS

| | | |
|---|---|---|
| 6,883,098 B1 | 4/2005 | Roman et al. |
| 7,043,453 B2 | 5/2006 | Stefik et al. |
| 7,065,652 B1 | 6/2006 | Xu et al. |
| 7,254,831 B2 | 8/2007 | Saunders et al. |
| 7,349,913 B2 | 3/2008 | Clark et al. |
| 7,437,752 B2 | 10/2008 | Heard et al. |
| 7,437,755 B2 | 10/2008 | Farino et al. |
| 7,490,352 B2 | 2/2009 | Kramer et al. |
| 7,502,861 B1 | 3/2009 | Protassov et al. |
| 7,529,923 B2 | 5/2009 | Chartrand et al. |
| 7,631,297 B2 | 12/2009 | Childress et al. |
| 7,644,377 B1 | 1/2010 | Saxe et al. |
| 7,665,125 B2 | 2/2010 | Heard et al. |
| 7,716,240 B2 | 5/2010 | Lim |
| 7,774,323 B2 | 8/2010 | Helfman |
| 7,779,408 B1 | 8/2010 | Papineau |
| 7,970,923 B2 | 6/2011 | Pedersen et al. |
| 8,060,596 B1 | 11/2011 | Wootton et al. |
| 8,095,517 B2 | 1/2012 | Sandoval et al. |
| 8,103,765 B2 | 1/2012 | Greifeneder et al. |
| 8,108,456 B2 | 1/2012 | Chen et al. |
| 8,296,239 B2 | 10/2012 | Nonaka |
| 8,296,821 B2 | 10/2012 | Nakae |
| 8,406,748 B2 | 3/2013 | Raleigh et al. |
| 8,468,090 B2 | 6/2013 | Lesandro et al. |
| 8,584,114 B2 | 11/2013 | Rabinovich et al. |
| 8,650,303 B1 | 2/2014 | Lang et al. |
| 8,660,530 B2 | 2/2014 | Sharp et al. |
| 8,825,863 B2 | 9/2014 | Hansson et al. |
| 8,843,734 B2 | 9/2014 | Lim |
| 8,850,010 B1 | 9/2014 | Qureshi |
| 8,850,049 B1 | 9/2014 | Qureshi |
| 8,850,423 B2 | 9/2014 | Barkie et al. |
| 8,856,909 B1 | 10/2014 | Chickering |
| 8,863,297 B2 | 10/2014 | Sharma et al. |
| 8,863,298 B2 | 10/2014 | Akella et al. |
| 8,863,299 B2 | 10/2014 | Sharma et al. |
| 8,881,228 B2 | 11/2014 | Qureshi |
| 8,918,834 B1 | 12/2014 | Samuelsson |
| 8,931,038 B2 | 1/2015 | Pulier et al. |
| 9,213,850 B2 | 12/2015 | Barton et al. |
| 9,280,377 B2 | 3/2016 | Lang et al. |
| 9,355,253 B2 | 5/2016 | Kellerman et al. |
| 9,356,895 B2 | 5/2016 | Chiu |
| 2001/0027383 A1 | 10/2001 | Maliszewski |
| 2001/0042045 A1 | 11/2001 | Howard et al. |
| 2002/0120607 A1 | 8/2002 | Price et al. |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0103075 A1* | 6/2003 | Rosselot ................ H04L 41/22 715/717 |
| 2003/0157947 A1 | 8/2003 | Fiatal et al. |
| 2003/0188193 A1 | 10/2003 | Venkataramappa |
| 2003/0229623 A1 | 12/2003 | Chang et al. |
| 2003/0236861 A1 | 12/2003 | Johnson et al. |
| 2004/0083273 A1 | 4/2004 | Madison et al. |
| 2004/0117651 A1 | 6/2004 | Little et al. |
| 2004/0123153 A1 | 6/2004 | Wright et al. |
| 2004/0243349 A1 | 12/2004 | Greifeneder et al. |
| 2005/0027843 A1 | 2/2005 | Bozak et al. |
| 2005/0027862 A1 | 2/2005 | Nguyen et al. |
| 2005/0076082 A1 | 4/2005 | Le Pennec et al. |
| 2005/0111354 A1 | 5/2005 | Asano et al. |
| 2005/0210252 A1 | 9/2005 | Freeman et al. |
| 2005/0262429 A1 | 11/2005 | Elder et al. |
| 2005/0265548 A1 | 12/2005 | Tsuchimura |
| 2005/0273592 A1 | 12/2005 | Pryor et al. |
| 2006/0005250 A1 | 1/2006 | Chu et al. |
| 2006/0070114 A1 | 3/2006 | Wood et al. |
| 2006/0075036 A1* | 4/2006 | Malik ................ H04L 67/38 709/206 |
| 2006/0080432 A1 | 4/2006 | Spataro et al. |
| 2006/0085826 A1 | 4/2006 | Funk et al. |
| 2006/0112428 A1 | 5/2006 | Etelapera |
| 2006/0161635 A1 | 7/2006 | Lamkin et al. |
| 2006/0161783 A1 | 7/2006 | Aiken et al. |
| 2006/0185004 A1 | 8/2006 | Song et al. |
| 2006/0225033 A1 | 10/2006 | Ye et al. |
| 2006/0248577 A1 | 11/2006 | Beghian et al. |
| 2006/0253508 A1 | 11/2006 | Colton et al. |
| 2006/0259755 A1 | 11/2006 | Kenoyer |
| 2006/0282889 A1 | 12/2006 | Brown et al. |
| 2007/0006327 A1 | 1/2007 | Lal et al. |
| 2007/0016771 A1 | 1/2007 | Allison et al. |
| 2007/0016907 A1 | 1/2007 | Benedetti et al. |
| 2007/0024646 A1 | 2/2007 | Saarinen et al. |
| 2007/0072598 A1 | 3/2007 | Coleman et al. |
| 2007/0079249 A1* | 4/2007 | Pall ................ G06F 9/543 715/758 |
| 2007/0100938 A1* | 5/2007 | Bagley ................ G06Q 10/10 709/204 |
| 2007/0118558 A1 | 5/2007 | Kahandaliyanage |
| 2007/0136471 A1 | 6/2007 | Jardin |
| 2007/0143515 A1 | 6/2007 | Kershaw et al. |
| 2007/0199051 A1 | 8/2007 | Parikh et al. |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0266422 A1 | 11/2007 | Germano et al. |
| 2007/0283324 A1 | 12/2007 | Geisinger |
| 2008/0027871 A1 | 1/2008 | Seo |
| 2008/0046580 A1 | 2/2008 | Lafuente et al. |
| 2008/0047006 A1 | 2/2008 | Jeong et al. |
| 2008/0066177 A1 | 3/2008 | Bender |
| 2008/0092215 A1 | 4/2008 | Soukup et al. |
| 2008/0133729 A1 | 6/2008 | Fridman et al. |
| 2008/0163188 A1 | 7/2008 | Siskind et al. |
| 2008/0178169 A1 | 7/2008 | Grossner et al. |
| 2008/0178300 A1 | 7/2008 | Brown et al. |
| 2008/0183820 A1* | 7/2008 | Golovchinsky ........ G06F 21/71 709/205 |
| 2008/0194296 A1 | 8/2008 | Roundtree |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0209564 A1 | 8/2008 | Gayde et al. |
| 2008/0229117 A1 | 9/2008 | Shin et al. |
| 2008/0270240 A1 | 10/2008 | Chu |
| 2008/0313257 A1 | 12/2008 | Allen et al. |
| 2008/0317292 A1 | 12/2008 | Baker et al. |
| 2009/0049425 A1 | 2/2009 | Liepert et al. |
| 2009/0051755 A1 | 2/2009 | Toya et al. |
| 2009/0064292 A1 | 3/2009 | Carter et al. |
| 2009/0083374 A1 | 3/2009 | Saint Clair |
| 2009/0121890 A1 | 5/2009 | Brown et al. |
| 2009/0172789 A1 | 7/2009 | Band et al. |
| 2009/0210934 A1 | 8/2009 | Innes |
| 2009/0253410 A1 | 10/2009 | Fitzgerald et al. |
| 2009/0253412 A1 | 10/2009 | Sigmund et al. |
| 2009/0265554 A1 | 10/2009 | Robles et al. |
| 2009/0282127 A1 | 11/2009 | Leblanc et al. |
| 2009/0282473 A1 | 11/2009 | Karlson et al. |
| 2009/0323916 A1 | 12/2009 | O'Sullivan et al. |
| 2009/0327885 A1* | 12/2009 | Aoki ................ G06Q 10/10 715/700 |
| 2010/0049874 A1 | 2/2010 | Chene et al. |
| 2010/0050092 A1 | 2/2010 | Williams et al. |
| 2010/0054463 A1 | 3/2010 | Tsan |
| 2010/0058352 A1 | 3/2010 | Esfahany et al. |
| 2010/0064341 A1 | 3/2010 | Aldera |
| 2010/0083358 A1 | 4/2010 | Govindarajan et al. |

(56) References Cited

U.S. PATENT DOCUMENTS

| | | |
|---|---|---|
| 2010/0124196 A1 | 5/2010 | Bonar et al. |
| 2010/0146523 A1 | 6/2010 | Brigaut et al. |
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |
| 2010/0173607 A1 | 7/2010 | Thornton et al. |
| 2010/0180346 A1 | 7/2010 | Nicolson et al. |
| 2010/0228825 A1 | 9/2010 | Hegde et al. |
| 2010/0228961 A1 | 9/2010 | Burns et al. |
| 2010/0235216 A1 | 9/2010 | Hehmeyer et al. |
| 2010/0269156 A1 | 10/2010 | Hohlfeld et al. |
| 2010/0279652 A1 | 11/2010 | Sharp et al. |
| 2011/0030044 A1 | 2/2011 | Kranendonk et al. |
| 2011/0072492 A1 | 3/2011 | Mohler et al. |
| 2011/0145360 A1 | 6/2011 | Sheshagiri et al. |
| 2011/0154266 A1 | 6/2011 | Friend et al. |
| 2011/0239125 A1 | 9/2011 | Kristensen et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0277026 A1 | 11/2011 | Agarwal et al. |
| 2011/0277027 A1 | 11/2011 | Hayton et al. |
| 2011/0283347 A1 | 11/2011 | Bhuta et al. |
| 2012/0023378 A1 | 1/2012 | Nomura et al. |
| 2012/0023556 A1 | 1/2012 | Schultz et al. |
| 2012/0066691 A1 | 3/2012 | Branton |
| 2012/0088540 A1 | 4/2012 | Smith et al. |
| 2012/0096544 A1 | 4/2012 | Hosoda |
| 2012/0102195 A1 | 4/2012 | Adams et al. |
| 2012/0110317 A1 | 5/2012 | Scheer et al. |
| 2012/0117622 A1 | 5/2012 | Gronholm et al. |
| 2012/0131343 A1 | 5/2012 | Choi et al. |
| 2012/0137364 A1 | 5/2012 | Blaisdell |
| 2012/0151033 A1 | 6/2012 | Baliga et al. |
| 2012/0154265 A1 | 6/2012 | Kim et al. |
| 2012/0159334 A1 | 6/2012 | Messerly et al. |
| 2012/0166516 A1* | 6/2012 | Simmons ............ H04L 67/1095 709/202 |
| 2012/0166524 A1 | 6/2012 | Watakabe et al. |
| 2012/0174237 A1 | 7/2012 | Krzyzanowski |
| 2012/0179909 A1 | 7/2012 | Sagi et al. |
| 2012/0191716 A1 | 7/2012 | Omoigui |
| 2012/0209949 A1 | 8/2012 | Deliyannis et al. |
| 2012/0238206 A1 | 9/2012 | Singh et al. |
| 2012/0246191 A1* | 9/2012 | Xiong .................... G06Q 50/01 707/769 |
| 2012/0246484 A1 | 9/2012 | Blaisdell et al. |
| 2012/0246731 A1 | 9/2012 | Blaisdell et al. |
| 2012/0250106 A1 | 10/2012 | Kiran Kannambadi et al. |
| 2012/0255026 A1 | 10/2012 | Baca et al. |
| 2012/0265528 A1 | 10/2012 | Gruber et al. |
| 2012/0270522 A1 | 10/2012 | Laudermilch et al. |
| 2012/0290694 A9 | 11/2012 | Marl et al. |
| 2012/0291114 A1 | 11/2012 | Poliashenko et al. |
| 2012/0317185 A1 | 12/2012 | Shah et al. |
| 2013/0007245 A1 | 1/2013 | Malik et al. |
| 2013/0013688 A1 | 1/2013 | Wang et al. |
| 2013/0013932 A1 | 1/2013 | Kong et al. |
| 2013/0014267 A1 | 1/2013 | Farrugia et al. |
| 2013/0019013 A1 | 1/2013 | Rice et al. |
| 2013/0019018 A1 | 1/2013 | Rice |
| 2013/0019282 A1 | 1/2013 | Rice et al. |
| 2013/0035063 A1 | 2/2013 | Fisk et al. |
| 2013/0042295 A1 | 2/2013 | Kelly et al. |
| 2013/0066978 A1 | 3/2013 | Bentley et al. |
| 2013/0067229 A1 | 3/2013 | German et al. |
| 2013/0078949 A1 | 3/2013 | Pecen et al. |
| 2013/0086684 A1 | 4/2013 | Mohler |
| 2013/0088605 A1* | 4/2013 | Quarfordt ............ H04L 67/1044 348/207.1 |
| 2013/0091205 A1* | 4/2013 | Kotler ................. H04L 65/4015 709/204 |
| 2013/0091440 A1* | 4/2013 | Kotler .................... G06Q 10/10 715/753 |
| 2013/0091543 A1 | 4/2013 | Wade et al. |
| 2013/0095785 A1 | 4/2013 | Sadana et al. |
| 2013/0097660 A1 | 4/2013 | Das et al. |
| 2013/0103797 A1* | 4/2013 | Park ........................ H04L 65/60 709/217 |
| 2013/0117563 A1 | 5/2013 | Grabelkovsky |
| 2013/0117840 A1 | 5/2013 | Roesner et al. |
| 2013/0124673 A1 | 5/2013 | Hjelm et al. |
| 2013/0133043 A1 | 5/2013 | Barkie et al. |
| 2013/0144934 A1* | 6/2013 | Swett ........................ G06F 8/61 709/203 |
| 2013/0151681 A1 | 6/2013 | Dournov et al. |
| 2013/0219022 A1 | 8/2013 | Manivel et al. |
| 2013/0227551 A1 | 8/2013 | Tsirkin |
| 2013/0227636 A1 | 8/2013 | Bettini et al. |
| 2013/0227659 A1 | 8/2013 | Raleigh |
| 2013/0232541 A1 | 9/2013 | Kapadia et al. |
| 2013/0237152 A1 | 9/2013 | Taggar et al. |
| 2013/0260730 A1 | 10/2013 | Toy et al. |
| 2013/0311593 A1 | 11/2013 | Prince et al. |
| 2013/0346268 A1 | 12/2013 | Pereira et al. |
| 2013/0347130 A1 | 12/2013 | Sima |
| 2014/0006512 A1 | 1/2014 | Huang et al. |
| 2014/0007215 A1 | 1/2014 | Romano et al. |
| 2014/0007222 A1 | 1/2014 | Qureshi et al. |
| 2014/0047413 A1 | 2/2014 | Sheive et al. |
| 2014/0047535 A1 | 2/2014 | Parla et al. |
| 2014/0059642 A1 | 2/2014 | Deasy et al. |
| 2014/0096199 A1 | 4/2014 | Dave et al. |
| 2014/0108649 A1 | 4/2014 | Barton et al. |
| 2014/0109072 A1 | 4/2014 | Lang et al. |
| 2014/0109078 A1 | 4/2014 | Lang et al. |
| 2014/0111316 A1* | 4/2014 | Kim ........................ G08C 17/00 340/12.5 |
| 2014/0149599 A1* | 5/2014 | Krishna .................. H04L 69/08 709/232 |
| 2014/0162614 A1 | 6/2014 | Lindeman et al. |
| 2014/0173700 A1 | 6/2014 | Awan et al. |
| 2014/0181803 A1 | 6/2014 | Cooper et al. |
| 2014/0181934 A1 | 6/2014 | Mayblum et al. |
| 2014/0189808 A1 | 7/2014 | Mahaffey et al. |
| 2014/0298401 A1 | 10/2014 | Batson et al. |
| 2014/0315536 A1 | 10/2014 | Chow et al. |
| 2015/0026827 A1 | 1/2015 | Kao et al. |
| 2015/0087270 A1 | 3/2015 | Richardson et al. |

FOREIGN PATENT DOCUMENTS

| | | |
|---|---|---|
| CN | 1708751 A | 12/2005 |
| CN | 1849774 A | 10/2006 |
| CN | 101170401 A | 4/2008 |
| CN | 101572678 A | 11/2009 |
| CN | 101588353 A | 11/2009 |
| CN | 102541635 A | 7/2012 |
| JP | 11-205380 | 7/1999 |
| JP | 2003-296210 A | 10/2003 |
| JP | 2006-094258 A | 4/2006 |
| JP | 2006155522 A | 6/2006 |
| JP | 2007215201 A | 8/2007 |
| JP | 2008-033751 A | 2/2008 |
| JP | 2008-097419 A | 4/2008 |
| JP | 2008-160753 A | 7/2008 |
| JP | 2008-527574 A | 7/2008 |
| JP | 2009-289164 A | 12/2009 |
| JP | 2010-015601 A | 1/2010 |
| KR | 10-0806993 B1 | 2/2008 |
| KR | 2012-0118819 A | 10/2012 |

OTHER PUBLICATIONS

Nov. 26, 2013—International Search Report and Written Opinion in International Application No. PCT/US2013/060388.

Feb. 4, 2014—International Search Report and Written Opinion in Application No. PCT/US2013/064349.

Jan. 21, 2014—International Search Report and Written Opinion in International Application No. PCT/US2013/063856.

(56) References Cited

OTHER PUBLICATIONS

Feb. 24, 2014—(PCT) International Search Report and Written Opinion—App PCT/US2013/060379.
Mar. 6, 2014—International Search Report and Written Opinion in International Application No. PCT/US2013/064319.
Feb. 6, 2014—International Search Report and Written opinion in International Application No. PCT/US2013/064076.
Mar. 17, 2014—International Search Report and Written Opinion in International Application No. PCT/US2013/064279.
Apr. 4, 2014—International Search Report and Written Opinion in International Application No. PCT/US2013/063429.
Jun. 3, 2014—Search Report and Written Opinion issued in International Application No. PCT/US2013/060047.
Oct. 20, 2014—(PCT) International Search Report—App PCT/US2014/036382.
Sep. 29, 2014—(PCT) International Search Report—App PCT/US2014/036326.
Dec. 20, 2013—(PCT) International Search Report and Written Opinion—App PCT/US2013/063363.
Jul. 11, 2014—(PCT) Written Opinion and International Search Report—App PCT/US13/63261.
Nov. 5, 2015—(EP) Office Action—App 13773923.1.
Aug. 1, 2012—"TPS Development Using the Microsoft .NET Framework", Teresa R Lopes, IEEE Instrumentation & Measurement Magazine (vol. 15, No. 4).
Jul. 31, 2012—Citrix: "Citrix XenMobile Technology Overview White Paper"; Citrix White papers online, pp. 1-14, XP055098728, Retrieved from the Internet: URL:http://www.insight.com/content/dam/onsight/en_US/pdfs/citrix/xenmobile-tech-overview.pdf, [retrieved on Jan. 27, 2014] the whole document.
Aug. 1, 2012—Teresa P. Lopes et al: "TPS development using the Microsoft .NET framework", IEEE Instrumentation & Measurement Magazine, IEEE Service Center, Piscataway, NJ; US, vol. 15, No. 4, pp. 34-39, XP011456193, ISSN: 1094-6969, DOI: 10.1109/MIM.2012.6263982, the whole document.
Apr. 28, 2003—Kate Gregory: "Managed, Unmanaged, Native: What Kind of Code is This?", Developer.com, pp. 1-3, XP055096991, retrieved from the Internet: <URL:http://www.developer.com/print.php/2197621>, [retrieved on Jan. 17, 2014], the whole document.

Feb. 10, 2014—(PCT) Search Report—App PCT/US/2013/065245.
Mar. 25, 2016—(CN) Office Action—App 201380057326.1.
2005—Hamed, H. et al., "Modeling and verification of IPSec and VPN security policies," 13th IEEE International Conference on Network Protocols (ICNP'05), pp. 10.
Nov. 2004—Skarmeta, A. et al., "Policy-based dynamic provision of IP services in a secure VPN coalition scenario," in IEEE Communications Magazine, vol. 42, No. 11, pp. 118-124.
Jun. 20, 2016—(EP) Extended European Search Report—App 13795317.
Nov. 13, 2015—International Search Report and Written Opinion of International Application No. PCT/US2015/026781.
Mar. 11, 2008—Vejda, T. et al., "Towards Trust Services for Language-Based Virtual Machines for Grid Computing," Trusted Computing—Challenges and Applications, ISBN: 978-3-540-68978-2.
Jul. 7, 2016—(EP) Supplementary European Search Report—App 13795317.0.
Office Action received in U.S. Appl. No. 13/963,794 dated Oct. 17, 2013.
Ranjan et al., "Programming Cloud Resource Orchestration Framework: Operations and Research Challenges", arvix.org, 2012, pp. 1-19.
Na et al., "Personal Cloud Computing Security Framework," 2010 IEEE Asia-Pacific Computing Conference, 2010, pp. 671-675.
Notice of Allowance issued in U.S. Appl. No. 13/963,825 dated Oct. 25, 2013.
Wilson et al., "Unified Security Framework", In proceedings of the 1st International Symposium on Information and Communication Technologies, pp. 500-505. Trinity College Dublin, 2003.
Mysore et al., "The Liquid Media System—a Multi-Device Streaming Media Orchestration Framework", Ubicomp 2003 Workshop, pp. 1-4.
Office Action received in U.S. Appl. No. 13/963,811 dated Nov. 8, 2013.
Office Action received in U.S. Appl. No. 13/963,825 dated Nov. 6, 2013.
Written Opinion and International Search Report, PCT/US2013/062636, dated Jan. 10, 2014.
Symantec: "What are Managed Applications and What is the Difference Between Assigned and Published;" Jan. 7, 2002; pp. 1-5.
Tilakgovind: "Understanding the Difference Between .exe and .msi: Symantec Connect;" Jan. 15, 2008.

\* cited by examiner

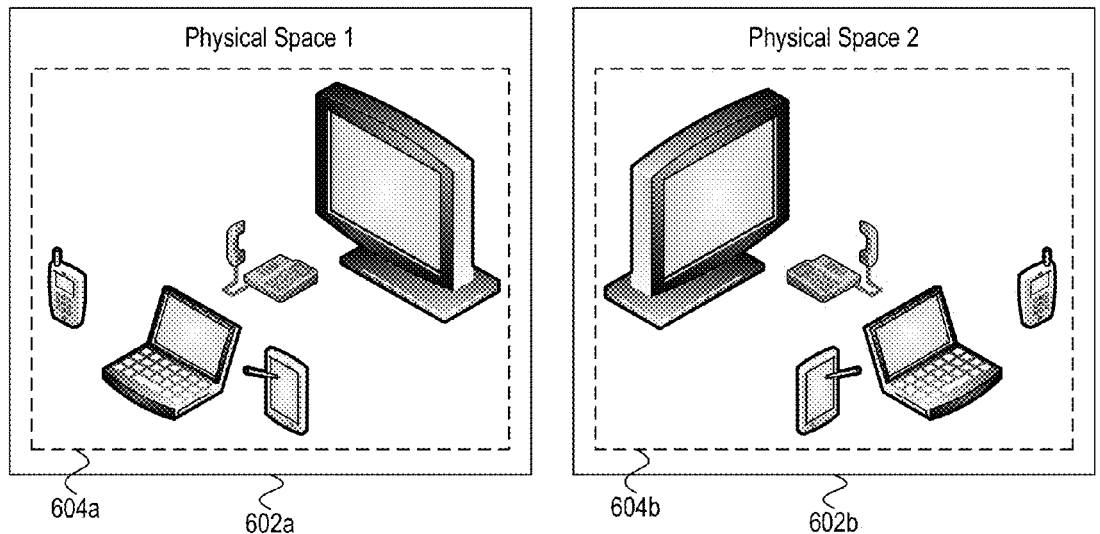
FIG. 6B
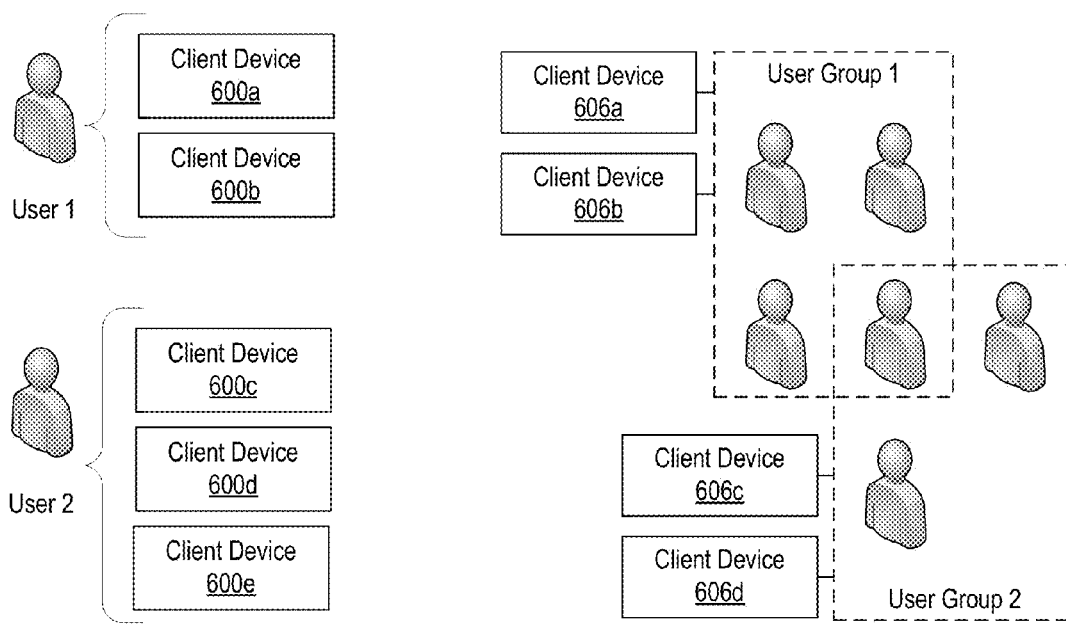
FIG. 6A
FIG. 6C

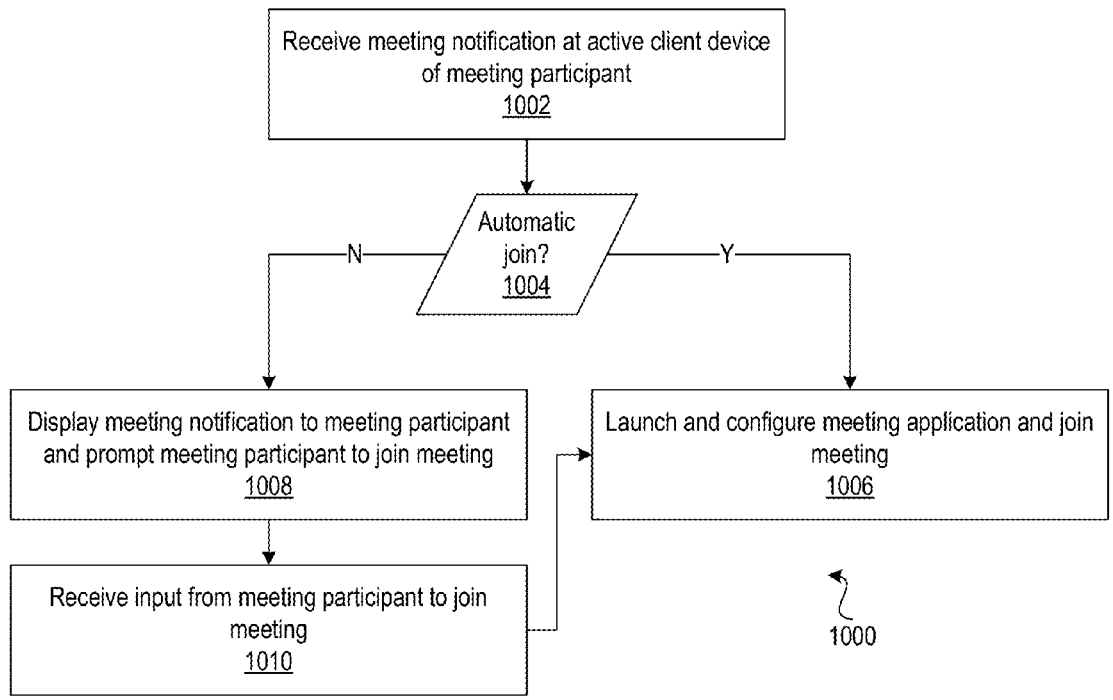
FIG. 10
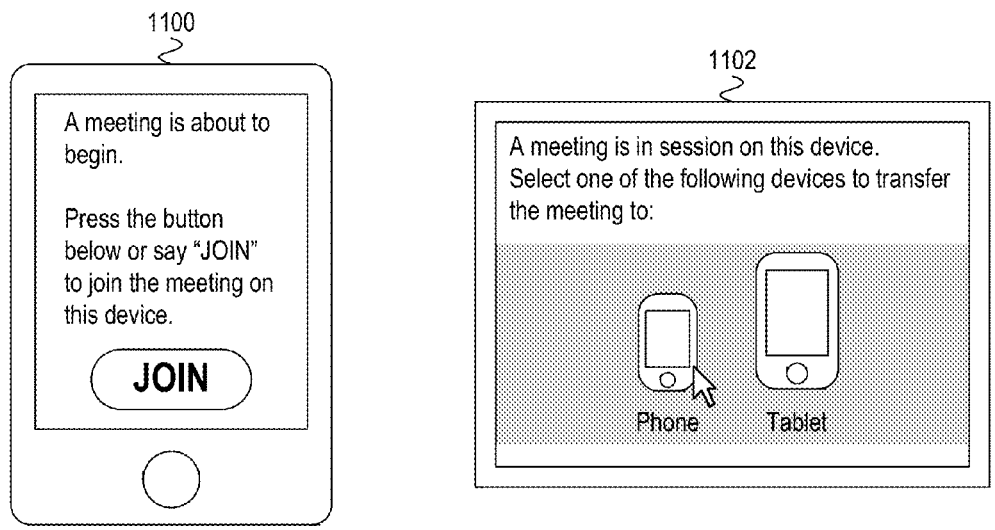
FIG. 11A  FIG. 11B

ORCHESTRATION FRAMEWORK FOR CONNECTED DEVICES

CROSS-REFERENCE TO RELATED APPLICATIONS

This application claims priority to U.S. Provisional Patent Application No. 61/712,948 entitled "Frictionless Distributive and Collaborative Work Across Time and Space" and filed on Oct. 12, 2012, U.S. Provisional Patent Application No. 61/712,953 entitled "Mobile Work and Micro Work Using an Activity Interface" and filed on Oct. 12, 2012, U.S. Provisional Patent Application No. 61/712,956 entitled "Multi-Device Interaction" and filed on Oct. 12, 2012, U.S. Provisional Patent Application No. 61/712,962 entitled "Orchestration Framework for Connected Devices" and filed on Oct. 12, 2012, and U.S. Provisional Patent Application No. 61/824,204 entitled "Multi-Device Interaction" and filed on May 16, 2013, each of which are incorporated by reference in their entirety in this disclosure.

TECHNICAL FIELD

This application generally relates to computers and computer networking. More specifically, aspects described herein relate to methods and systems for allowing a collection of devices to function as a collective, coordinated whole.

BACKGROUND

Traditionally, personal computers included operating systems, applications, and user settings for a single user. Personal computers were generally both used and managed by their owners. However, many organizations are now using virtualization, remote access, or clouds of computing resources to fulfill their computing needs. Clouds of virtualized computing resources generally allow for the operating systems, applications, and user settings of multiple users to be included on a single physical machine. Desktop virtualization technology allows multiple instances of an operating system to be kept separate, so the activity of one user does not affect the experience of other users. Cloud computing environments allow for computers owned by the cloud operator to be managed by the cloud operator but used by cloud users, who may be customers of the cloud operator.

A virtual machine receiver is an application that allows a user a type of virtualized remote access to corporate applications, desktops and data, even when said "remote" resources are on the physical machine the user may be using. Each receiver may communicate with a central enterprise server that lists which applications and other resource have been selected by the user, and which applications and other resources are available for the user to select or request.

As virtualization becomes increasingly popular and more cost effective, new problems arise that aspects described herein address. For example, moving from a single device world to a multi-device world may involve at least four types of devices—a smartphone, a tablet, a full-featured laptop or desktop computer, and a room-mounted display. Each of these devices can independently run software such as web browsers, meeting software (e.g., GoToMeeting available from Citrix Systems Inc. of Ft. Lauderdale, Fla.), personal information managers, document or productivity software, and other types of software. However, each of these devices runs independently, largely unaware of other the devices. The most linkage that may currently occur between devices typically involves mirroring screens from one device to another. Typical examples of this include displaying a laptop screen on a room-mounted display, or displaying a tablet or smartphone display on a laptop, which may then be displayed on the room mounted display. Therefore, a need exists for approaches to coordinating the operation such devices in order that the devices may be aware of each other and collaboratively function as a whole.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present specification, aspects described herein are directed to an orchestration framework for managing the interaction between interconnected devices in a coordinated fashion. Aspects described herein also allow multiple devices to function as a coherent whole, allowing each device to take on distinct functions that are complementary to one another. Aspects described herein further allow the association of devices with a given user in order to retain preferences regarding the roles of various devices associated with the user.

A first aspect described herein provides a method for interconnecting devices using an orchestration framework. An orchestration framework may be provided, and the orchestration framework may interconnect multiple of devices such that the devices are available to share content and computing activities with one another. The orchestration framework may coordinate interactions between the devices that are interconnected with each other through the orchestration framework. A request to share content may be received from one of the devices. The distribution of the content to one or more of the devices may be managed using the orchestration framework. The content may be a file uploaded to a remote data store, content stored at a clipboard that is accessible to the interconnected devices, or a link.

A second aspect described herein provides a system for interconnecting devices using an orchestration framework. The system may include at least one processor and an orchestration framework that interconnects multiple devices such that the devices are available to share content and computing activities with each other. The orchestration framework may include a set of server-side orchestration components configured to reside at an orchestration server and a set of client-side orchestration components configured to reside at a client. The server-side orchestration components may include an orchestration service that, in operation, instructs the server-side orchestration components in response to communications received at the orchestration server. The client-side orchestration components may include an orchestration agent in communication with the orchestration service. The orchestration agent may, in operation, instruct the client-side orchestration components in response to input received at a client device as well as in response to notifications received at the orchestration agent. The orchestration agent may also submit to the orchestration service a request to share content with one or more of the devices interconnected with the client device through the orchestration framework. In response to receipt of the request, the orchestration service may manage the distribution of the content to one or more of the devices interconnected with the client device through the orchestration framework.

A third aspect described herein provides non-transitory computer-readable media having instructions that, when executed cause a client device to connect to one or more devices using an orchestration agent of an orchestration framework. The orchestration framework may coordinate interactions between the client device and the devices interconnected with the client device through the orchestration framework. The client device may receive from a user a selection of content to share and the orchestration agent at the client device may then submit to an orchestration service of the orchestration framework a request to share the content. Receipt of the request at the orchestration service may cause the orchestration service to manage the distribution of the content to one or more of the devices interconnected with the client device through the orchestration framework. As used in this description, non-transitory computer-readable media refers to all computer-readable media with the sole exception being a transitory propagating signal.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 6A-C depict example sets of devices that may be related according to one or more illustrative aspects described herein.

FIG. 10 is another flowchart of example method steps for joining an online meeting.

FIGS. 11A-B depict examples of interfaces at client devices according to one or more illustrative aspects described herein.

DETAILED DESCRIPTION

Figure 1:
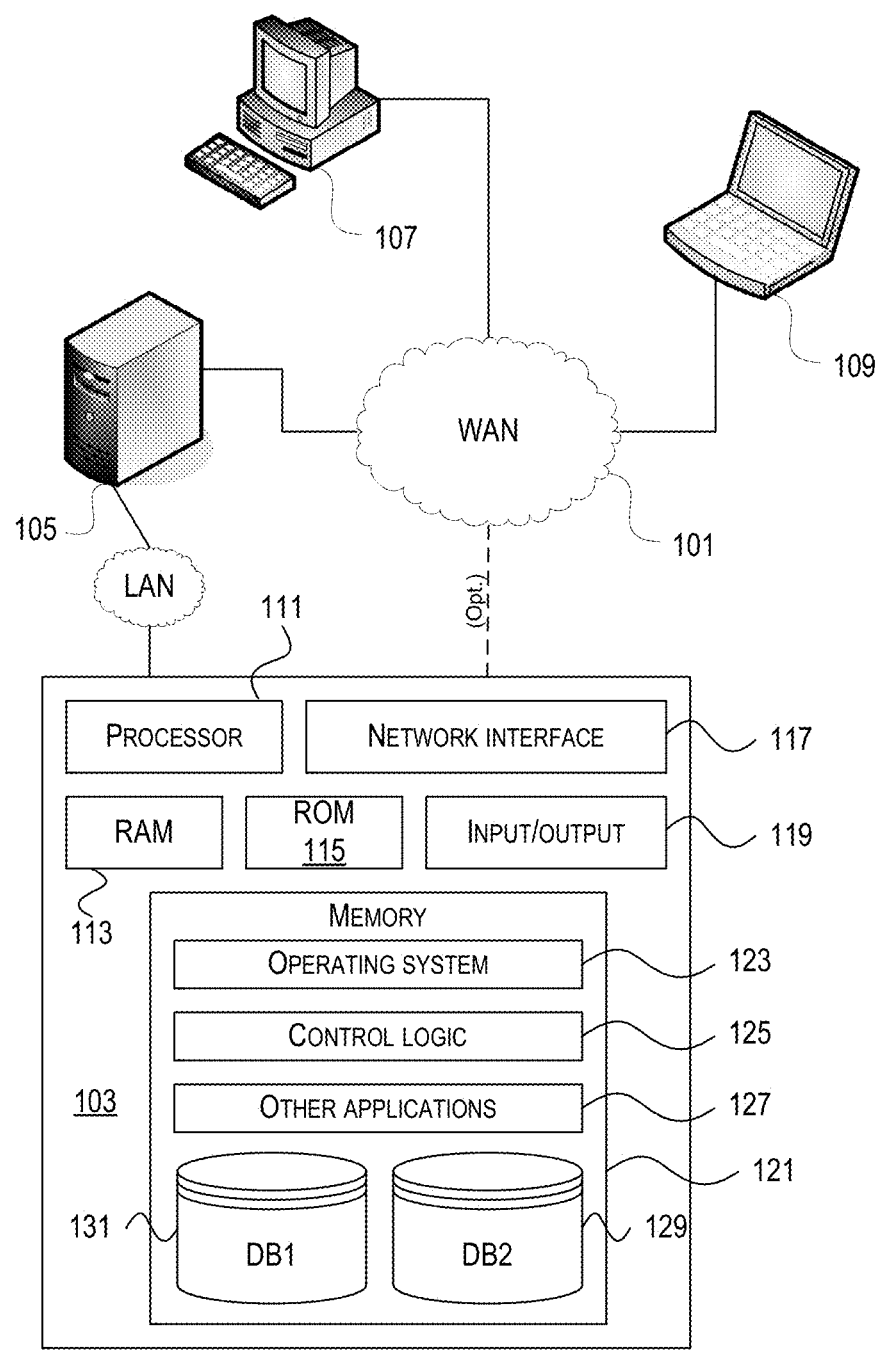
FIG. 1 depicts an illustrative computer system architecture that may be used in accordance with one or more illustrative aspects described herein.

To address the problems identified above as well as others that will be apparent to the reader, aspects described herein allow multiple devices to function as a cohesive whole, allowing each device to take on distinct functions that are complementary to one another. Through this collaboration, interconnected devices functioning as a cohesive whole provides improvements and enhancements to online meetings between remote individuals. Aspects described herein allow a collection of devices associated with an individual or associated with groups of individuals to be used in a coordinated, collective way, beyond simple screen sharing. This collective coordination of devices may be based on preferences retained for the personal devices of an individual user or on an ad hoc basis when two or more people use their devices collectively, e.g., during an online meeting conducted via meeting software at the devices.

An orchestration framework is described below that interconnects the devices utilized to conduct the online meeting and coordinates various computing activities across the interconnected devices. Using the orchestration framework, meeting participants may share content across the interconnected devices, share application functionality across the interconnected devices, or share the interconnected devices themselves during an online meeting. The orchestration framework also improves the process of joining an online meeting by proactively notifying meeting participants of upcoming meetings and, in some cases, automatically connecting their devices to the meeting. The orchestration framework also enables a meeting participant to transition from one device to another device and to seamlessly continue participating in an ongoing meeting. The orchestration framework additionally compiles a meeting history, captures content shared during the meeting, and associates the shared content with the meeting history. Meeting participants may subsequently review meeting histories and associated content. With respect to device interactions, the orchestration framework facilitates complex multiple-device behaviors. The orchestration framework facilitates flexible device interactions by providing users the ability to customize device actions.

Stated more generally, functionality, input, and output associated with an application may be spread across multiple devices that are interconnected by the orchestration framework such that the interconnected devices operate as a coordinated whole. As described in further detail below, each interconnected device may include a respective orchestration agent that communicates with an orchestration service at an orchestration server during a client-server communication session. The orchestration agents of the client devices may also communicate with each other during a peer-to-peer communication session. The orchestration agents may communication with each other to cooperate with or without the orchestration service at the orchestration server.

Some general examples of the manner in which meeting participants may utilize the orchestration framework include the following. According to one example, meeting participants may utilize the orchestration framework to make content residing at one device available at another device for presentation of the content at that other device. A meeting participant may, for example, utilize the orchestration framework to make video content residing at a tablet device available to a larger display device (e.g., a television) that presents the video content. According to another example, a computing activity may be initiated at a computing device, and a meeting participant may utilize the orchestration framework to perform a portion of that computing activity at another device. For example, an online meeting may, for example, be initiated at a mobile cellular telephone, and a meeting participant may utilize the orchestration framework to direct audio from the online meeting to a larger audio output device (e.g., a speaker system) and to direct video from the online meeting to a larger display device (e.g., a television). As another example, a document editing application may be initiated and run at one device (e.g., a tablet), input to the application may be received at a second device (e.g., a laptop), and visual output from the application may be presented at a third device (e.g., a television). Additional aspects and examples will be appreciated with the benefit of the detailed description provided below.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet). Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
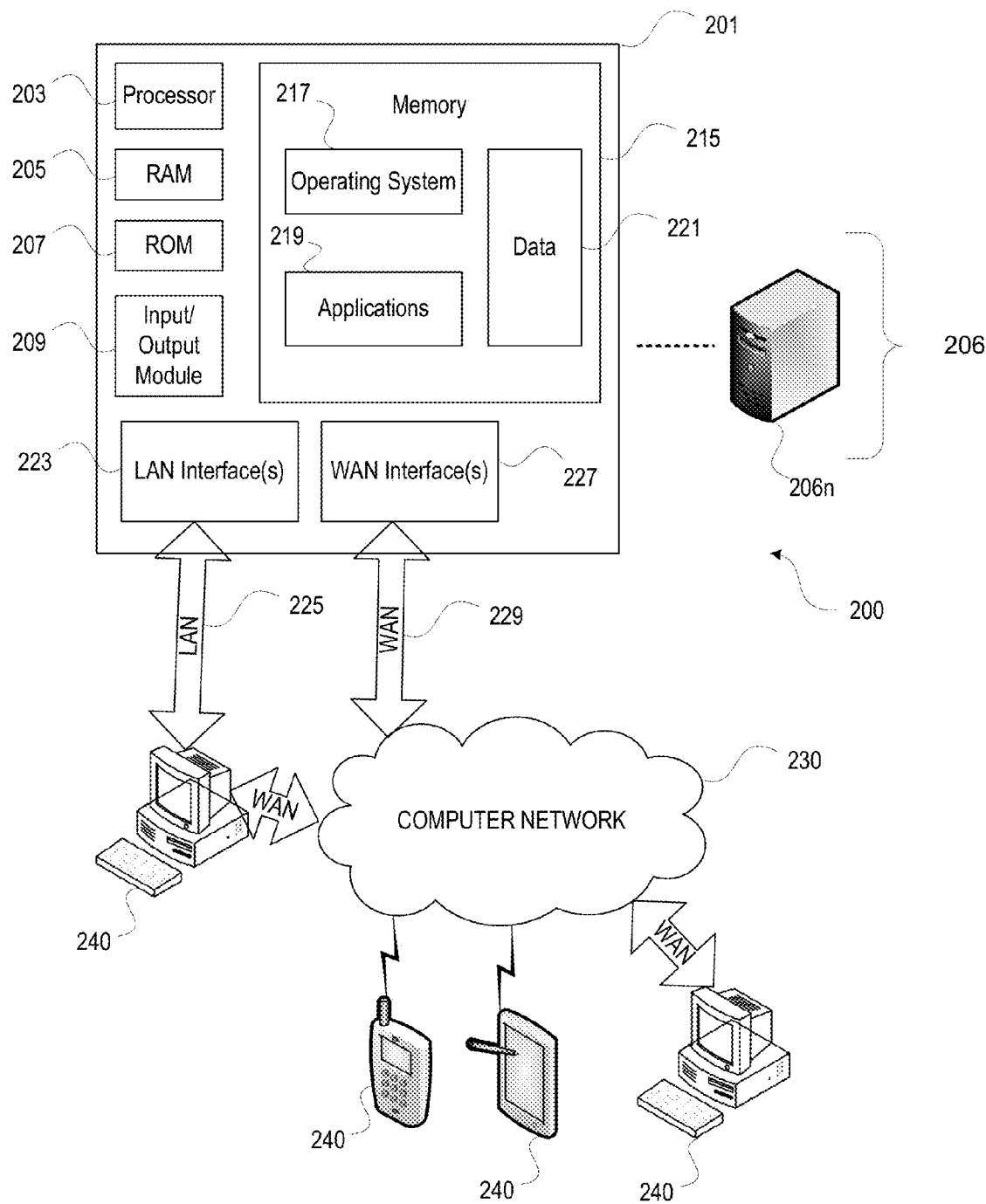
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
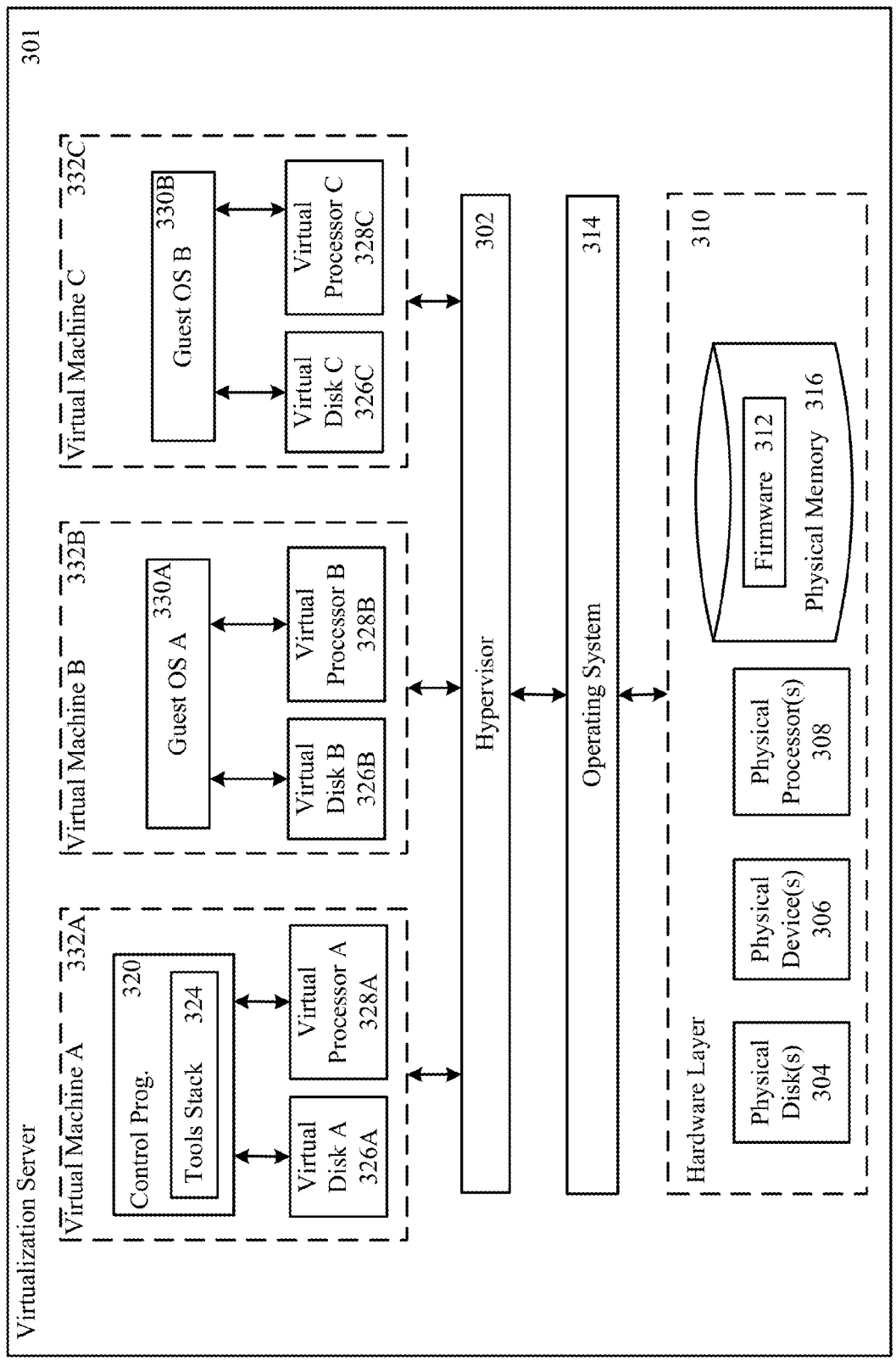
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN® hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
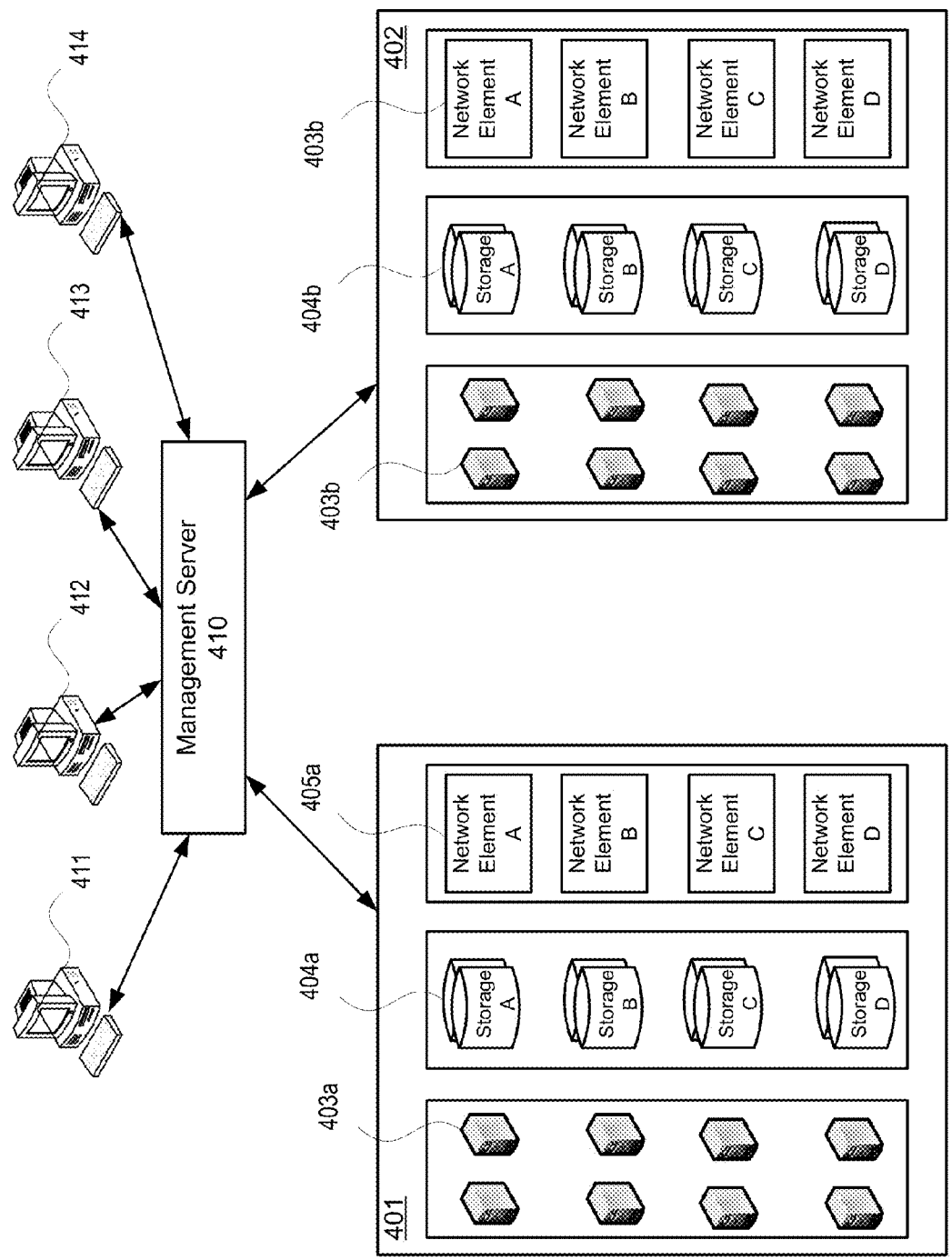
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Orchestration Framework Architecture

Figure 5A:
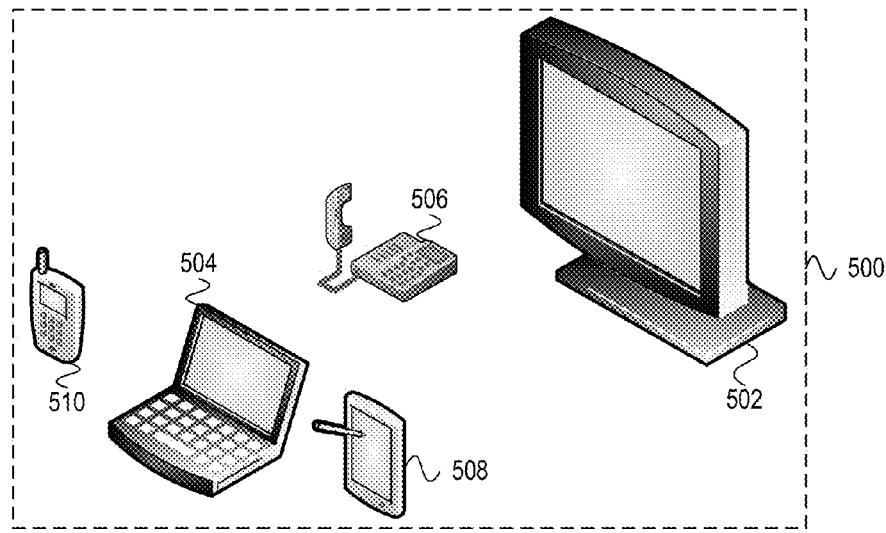
FIGS. 5A-D depict multi-device interaction according to one or more illustrative aspects described herein.

Referring to FIGS. 5A-D, interconnected devices for coordinated operation and multi-device interaction are shown according to various illustrative aspects described herein. In FIG. 5A, a set 500 of interconnected devices is shown. The set of interconnected devices 500 in this example includes a television display device 502, a laptop computing device 504, a public switched telephone network (PSTN) phone 506, a tablet computing device 508, and a cellular mobile phone 510. An orchestration framework may interconnect the devices 502-510 of the set of computing devices 500 in FIG. 5A. The devices 502-510 may thus collaborate and function as a coordinated whole.

Figure 5B:
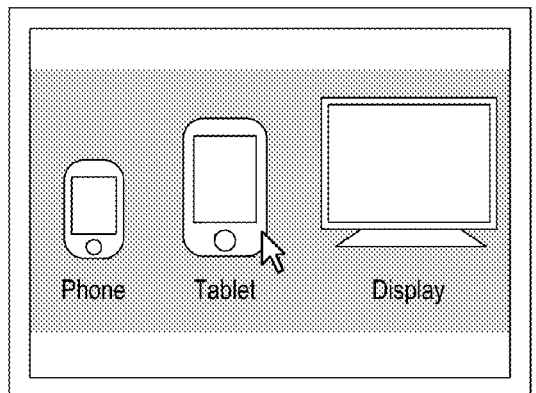
Figure 5C:
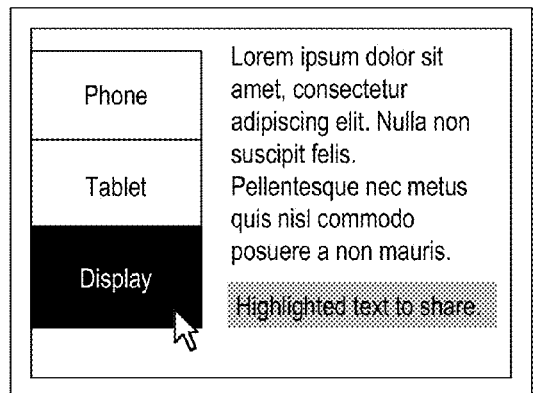
Figure 5D:
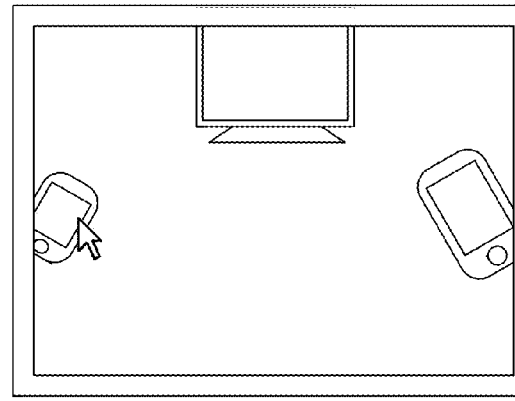

FIGS. 5B-D illustrate various ways that users may trigger cross-device interactions. In FIGS. 5B-D example displays 512-516 of a computing device are shown to illustrate the manner in which a user may select another device for a cross-device interaction. As seen in FIG. 5B, the orchestration framework may present the list of devices available for selection at the display 512 as a horizontal list of selectable icons. As seen in FIG. 5C, the orchestration framework may present the list of devices available for selection at the display 514 as a vertical list of selectable list elements. As seen in FIG. 5D, the orchestration framework may cause icons of the devices available for selection to "peek" in from the edges of the display 516 as selectable targets of a drag-and-drop action. Similar approaches may be employed to select a device for cross-device interaction. The device selected by the user for cross-device interaction is referred to in this disclosure as the destination device. The device from which the user selects the destination device is referred to in this disclosure as the source device.

Moreover, the orchestration framework may dynamically generate the list of devices, user, or user groups available for selection to receive the shared content. The list may be generated the list of devices available for selection to receive the shared content based on, e.g., the devices associated with the source device; the devices associated with the user of the source device; a user role of the user; devices, users, or user groups associated with an online meeting the user is currently participating in; devices or users co-located with the source device in the same physical space; a device role of the source device; received from a scheduling service regarding other meeting participants of online meetings the user is scheduled for; and additional or alternative criteria that will be appreciated with the benefit of this disclosure. Following a selection of a device, user, or user group, the orchestration framework may manage the distribution of one or more devices interconnected with the source device via the orchestration framework.

FIGS. 6A-C depict example sets of devices that may be related according to various criteria. As seen in FIG. 6A, devices may be related to one another through their common association with a user. In FIG. 6A, User 1 is associated with two devices 600a-b, and User 2 is associated with three devices 600c-e. Should both users join the same online meeting, the orchestration framework may interconnect the devices 600a-e such that the devices operate as a cohesive and coordinated whole. As seen in FIG. 6B, devices may additionally or alternatively be related to one another through their proximity to each other when located within the same physical space, e.g., when located within ten to twelve feet of each other in a conference room. In FIG. 6A, one physical space 602a includes one set of devices 604a located in that physical space, and another physical space 602b includes another set of devices 604b located in that other physical space. The set of devices 604a may be associated with a meeting held in the physical space 602a, and the set of devices 604a may be interconnected such that meeting participants may utilize the set of devices 604a in a coordinated fashion during the meeting. The set of devices 604b may likewise be associated with a meeting held in the physical space 602b and interconnected for cross-device coordination during the meeting. As seen in FIG. 6C, the devices may also additional or alternatively be related to one another through an association with the same user group. In FIG. 6C, four users are assigned to User Group 1, and three users are assigned to User Group 2. One of the users is assigned to both User Group 1 and User Group 2. Client devices 606a-d are also respectively associated with the user groups in FIG. 6C. In this example, client devices 606a-b are associated with User Group 1, and client devices 606c-d are associated with User Group 2. Accordingly, the orchestration framework may interconnect clients devices 606a-b when a user from User Group 1 joins an online meeting, and the orchestration framework may interconnect client devices 606c-d when a user from User Group 2 joins an online meeting. The orchestration framework may also interconnect each of client devices 606a-b and client devices 606c-d when a user from User Group 1 and a user from User Group 2 join the same meeting. It will be appreciated that client devices may be related to additional or alternative criteria and interconnected on the basis of such criteria.

Figure 7A:
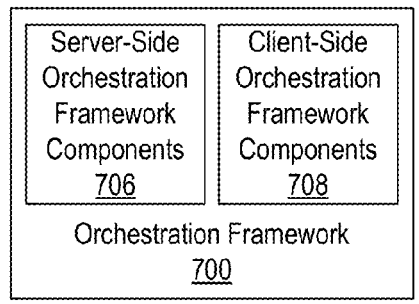
FIG. 7A depicts a block diagram of an orchestration framework according to one or more illustrative aspects described herein.
Figure 7B:
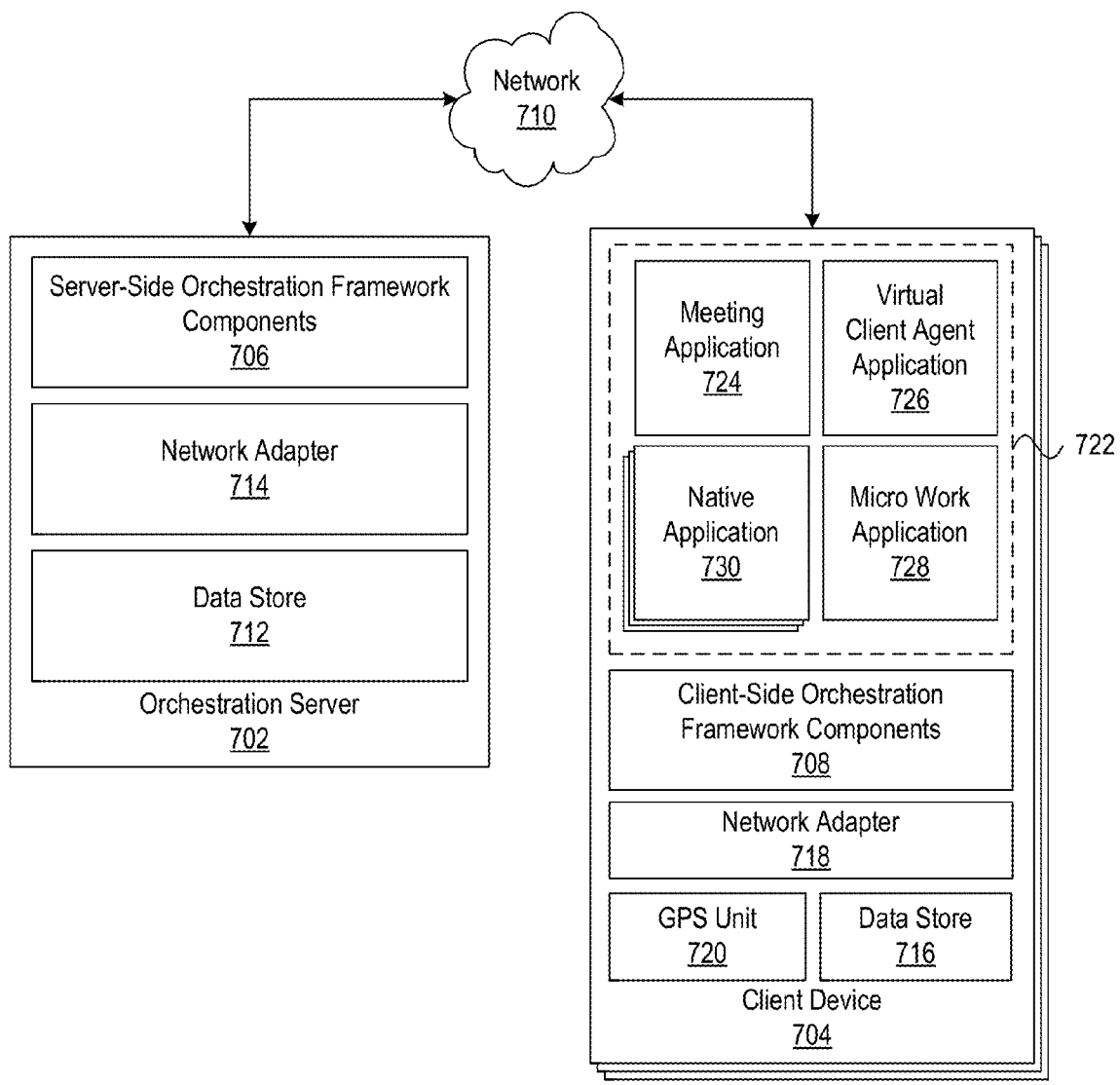
FIG. 7B depicts a block diagram of an orchestration server and client device according to one or more illustrative aspects described herein.
Figure 7C:
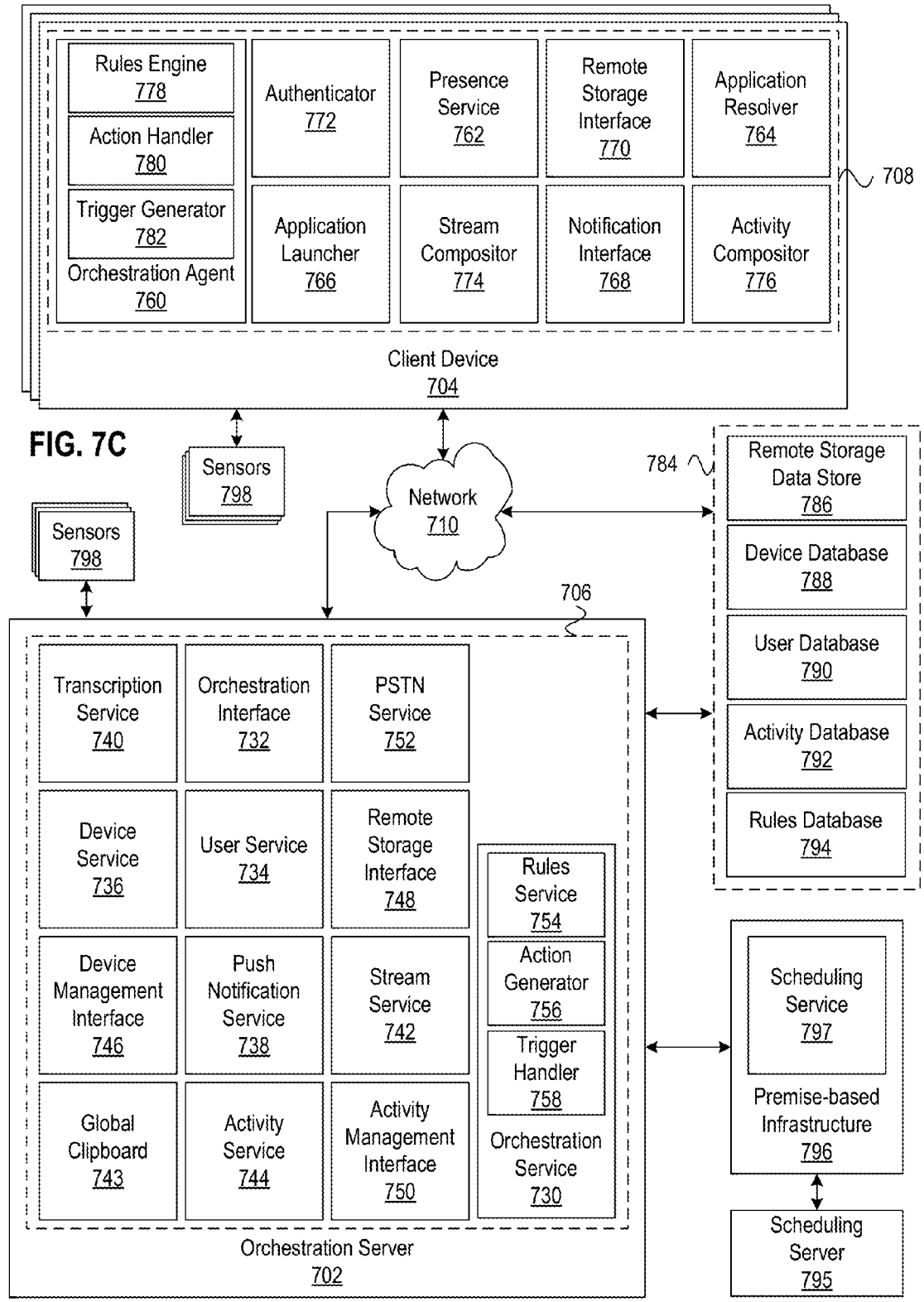
FIG. 7C depicts another block diagram of an orchestration server and client device according to one or more illustrative aspects described herein.

FIGS. 7A-C depict respective block diagrams of an orchestration framework 700, orchestration server 702, and client device 704 according to some illustrative aspects described herein. For clarity, not all of the components of the orchestration framework 700, orchestration server 702, and client device 704 are shown in FIGS. 7A-B. The orchestration framework may include both server-side orchestration framework components 706 that reside at the orchestration server 702 as well as client-side orchestration framework components 708 that reside at the client device 704. Through a network 710, one or more of the client-side orchestration framework components 708 be in communication with one or more the server-side orchestration framework components 706 to facilitate cross-device coordination. The orchestration server 702 may be in communication with multiple client devices 704 through the network 710. Client-side orchestration framework components 708 at one client device 704 may be in communication with client-side orchestration framework components at another client device in order to facilitate cross-device coordination between the devices without the orchestration server 702. The client-side orchestration framework components 708 may be bundled into a singular application that facilitates cross-device interaction, which may be referred to as a multi-device application. The various server-side components 706 and client-side components 708 will be discussed in further detail with reference to FIG. 7C. The orchestration server 702 and client device 704 may include other components. The orchestration server 702 may also include, for example, a data store 712 and network adapter 714 for communicating via the network 710. The client device 704 may likewise include a data store 716 and a network adapter 718 for communicating via the network 710. The client device may also include, in some examples, a Global Position System (GPS) unit 720 that provides information indicating a geographic location of the client device (e.g., latitude and longitude coordinates).

The orchestration server 702 provides the back-end services that facilitate cross-device coordination of the client devices 704. The orchestration server 702 facilitates cross-device coordination through the server-side orchestration framework components 706. Because the orchestration server 702 is located remotely relative to the client devices 704, the orchestration server may also be referred to as a cloud service. In some examples, the orchestration server 702 may be implemented using ASP.NET MVC running in Windows Azure. Other platforms may be selectively employed to implement the orchestration server 704.

Various types of client devices may be interconnected to function as a cohesive and collaborative whole. Client devices may include, for example, desktop computing devices, laptop computing devices, tablet computing devices, palmtop computing devices, mobile cellular telephones, conference telephones, display screens, and other types of devices suitable for use during an online meeting. Accordingly, the client devices may provide various types of platforms on which the client-side orchestration framework components 708 operate. Platforms provided by respective client devices 704 may include, e.g., a Windows platform, a Mac platform, an iOS platform, an Android platform, a "smart television" platform, and other types of platforms. Various client devices 704 may include some or all of the components described below, and the components may be adapted based on the capabilities of the client device on which they operate. Accordingly, client devices 704 may each include similar types of components, but the implementation of those components may vary according to the underlying platform of the client device on which they operate.

As seen in FIG. 7B, the client device 704 also includes a set of applications 720. The set of applications 722 may include a meeting application 724, a virtual client application 726, a micro work application 728, and one or more native applications 730. The meeting application 724 may be configured to conduct online meetings and interact with the client-side orchestration framework components 708 to facilitate cross-device coordination during the online meeting. One example of a meeting application is GoToMeeting available from Citrix Systems, Inc. of Ft. Lauderdale, Fla. The virtual client application 726 may be configured to provide virtual environments in which virtual applications may be launched at the client device 706. The virtual client application may also provide remote access to applications, desktops, data, and other resources. The micro work application 728 aggregates information and resources needed to perform micro work, establishes a micro work context, and provides an activity-based interface for conducting the micro work. Micro work and the micro work application 728 will be discussed in further detail below. The native applications 730 may be applications designed and configured to run natively on the client device. It will be appreciated that the meeting application 724, the virtual client application 726, and the micro work application may be designed and configured to also run natively on the client device.

Referring now to FIG. 7C, another block diagram depicting the orchestration server 702 and client device 704 is shown. For clarity, some of the components of the orchestration server 702 and client device 704 have been omitted in FIG. 7C. Various components of the server-side orchestration framework components 706 and of the client-side orchestration framework components 708 are shown in FIG. 7C. It will be appreciated that the orchestration server 702 and client device 704 depicted in FIG. 7C are by way of example only, and various implementations may selectively include various combinations of the components described below.

The server-side orchestration framework components 706 of the orchestration server 702, in this example, include: an orchestration service 730; an orchestration interface 732; a user service 734; a device service 736; a push notification service 738; a transcription service 740; a stream service 742; an activity service 744; a device management interface 746; a remote storage interface 748; an activity management interface 750; a PSTN service 752; and a global clipboard 753. The orchestration service 730, in this example, includes: a rules service 754; an action generator 756; and a trigger handler 758.

The client-side orchestration framework components 708 of a client device 704, may, include: an orchestration agent 760; presence service 762; application resolver 764; application launcher 766; notification interface 768; remote storage interface 770; authenticator 772; stream compositor 774; and activity compositor 776. The orchestration agent 760 may also include a rules engine 778; action handler 780; and trigger generator 782.

The orchestration server 702 and the client devices 704 are in communication with a set of data stores 784. The set of data stores 784 may include, for example, a remote storage data store 786, a device database 788, a user database 790, an activity database 792, and a rules database 794. A client device 704 may be in communication with the remote storage data store 786 via the network 710 the remote storage interface 770. The orchestration server 702 may similarly be in communication with the remote storage data store 786 via the network 710 and through the remote storage interface 748. The orchestration server 702 may be in direct communication with the device database 788 via the device service 736, with the user database 790 via the user service 734, with the activity database 792 via the activity service 744, and with the rules database 794 via the rules service 754. The orchestration server 702 may also in communication with a scheduling server 795 via premise-based infrastructure 796 that includes a scheduling service 797. The orchestration server 702 and the client device 704 may additionally be in communication with one or more sensors 798.

Regarding the server-side orchestration framework components 706, the orchestration service 730 is responsible for coordinating the different actions between interconnected client devices 704. The orchestration service 730 is the central point of the server-side orchestration framework components 706 and issues instructions to the other components. The orchestration service 730 also coordinates actions triggered in response to events occurring at the orchestration server 702 or the client devices 704. The rules service 754 of the orchestration service 730 determines which action or set of actions to perform in response to the occurrence of an event that satisfies a rule trigger. The action generator 756 of the orchestration service 730 translates an action or a set of actions into a sequence of instructions that, when executed, perform the action or set of actions of the rule. The trigger handler 758 of the orchestration service 730 receives input from external sources corresponding to an event and determines whether the event satisfies the trigger. If the trigger is satisfied, then the trigger handler 758 may notify the rules service 754. The trigger handler 758 may receive input from, e.g., the scheduling server 795, the client devices 704, or the sensors 798. The orchestration service 730 may communicate with the rules database 794 to retrieve rules defined for the orchestration framework and stored at the orchestration database.

The trigger for a rule may be the occurrence of an event at the orchestration server or a client device. Examples of triggers include notification of an upcoming meeting, receipt of a request to share content across interconnected devices, arrival of a new meeting participant in an online meeting, occurrence of a particular date, occurrence of a particular time, and other triggers that will be appreciated with the benefit of this disclosure. A rule may or may not specify contextual conditions. If a rule does not specify contextual conditions, the action or set of actions specified for the rule may be performed in response to the trigger. When a rule specifies contextual conditions, the contextual conditions may be assessed before the action is performed. If the contextual conditions are satisfied, then the action or set of actions for the rule may be performed. If the contextual conditions are not satisfied, then the action or set of actions for the rule may not be performed. Contextual conditions may be temporal, geospatial, or situational. Temporal contextual conditions may relate to the date or time an event occurs. Geospatial conditions may relate to a geographic location at which an event occurs, e.g., the location of a user or the location of a client device when the event occurs. Situational conditions may relate to the context in which an event occurs, e.g., the status or state of a client device or user when an event occurs. Other types and examples of contextual conditions will be appreciated with the benefit of this disclosure.

A rule may also specify one or more actions to perform when a trigger event occurs (or when a trigger event occurs and contextual conditions are satisfied). Actions may involve one or more client devices as well interconnected applications residing at interconnected client device. In some examples, actions may involve operation of interconnected client devices in a coordinated fashion with various client device performing steps of an action or set of actions. Actions may be relatively simple, e.g., setting a particular volume level of a speaker at a client device, muting a microphone of a client device, or activating a particular application mode of an application residing at a client device. Actions may also be relatively complex, e.g., determining which client device of a user is active and forwarding a meeting notification to that client device in order to automatically connect a user to an ongoing meeting. Other types and examples of actions will be appreciated with the benefit of this disclosure.

The orchestration interface 732 may enable a user to define rules in a variety of ways. In various implementations, users may define rules via a scripting approach, via a question-and-answer approach, via an if-then-else approach, and other approaches suitable for defining rules and their corresponding triggers, contextual conditions, and actions. The orchestration framework may be configured to learn how users respond to various events and replicate those responses when the same type of event subsequently occurs. As an example, the orchestration framework may track how a user behaves in response to a meeting notification, automatically define a rule for that user setting meeting notifications as the trigger, and set the action for the rule to the observed user behavior. Additionally, the orchestration framework may also be configured to learn how a user utilizes the orchestration framework to engage in cross-device coordination and automatically create rules in response to observed behaviors. As an example, the orchestration framework may observe that a user sends habitually sends a daily news web link from a desktop device to a phone device of the user every morning around 6:00 AM. In response to this observed behavior, the orchestration framework may create a rule that specifies the start of a new day as the trigger, specifies a time of 6:00 AM as a contextual condition, and specifies the transmission of the daily news web link to the phone of the user as the action. In view of the above, it will be appreciated that the orchestration framework advantageously provides significant flexibility with respect to the type and the complexity of rules that user may define through the orchestration interface 732.

The orchestration interface 732 also enables a user to customize behavior of the orchestration framework components 706 and 708. In particular, the orchestration interface 732 enables a user to customize overall operation of the orchestration framework during cross-device coordination including, e.g., behaviors in response to particular events occurring at the orchestration server 702 or a client device 704. The orchestration interface 732 may be used to define rules for the orchestration framework. Accordingly, the orchestration interface 732 may communicate with the rules database 794 to store rules created through the orchestration interface. The rules database 794 may store records corresponding to defined rules and rule information related to those rules. The rule information stored at the rules database 794 may include, for example: trigger information that indicates an event that triggers an action upon occurring (e.g., the start of an online meeting); contextual condition information that indicates one or more contextual conditions that must be satisfied to perform an action (e.g., whether the client device is located at a physical meeting space, whether the client device is moving); and action information indicating an action or set of actions to perform (e.g., automatically initiate a meeting notification to a particular client device). The orchestration interface 732 may update the rules database 794 when new rule information is received.

The device management interface 746 enables a user to manage the client devices 704 interconnected through the orchestration framework. Through the device management interface 746, a user may assign a device role to a client device 704, dedicate a client device to perform a particular activity, or indicate a particular behavior in response to a particular event occurring at the client device. The device management interface 746 may communicate with the device database 788 to store information relating to the client devices 704 received through the device management interface. The device database 788 may store records corresponding to client devices 704 that may be interconnected through the orchestration framework and device information related to those devices. The device information stored by the device database 788 may include, for example: information indicating a device type of a client device; information indicating a device status of a client device (e.g., active and connected, inactive and disconnected); information indicating the user or user group a client device is associated with; information indicating a device role for a client device; information indicating a device state of a client device (e.g., a geographic location of the client device, whether the client device is moving); information indicating the capabilities of a client device (e.g., applications capable of running at the client device); information indicting the peripherals available at a client device (e.g., a camera, speaker, microphone); and other types of information related to a client device that will be appreciated with the benefit of this disclosure. The device service 736 may maintain and retrieve device information for the client devices 704 at the device database 788. Accordingly, the device service 736 may update the device database 788 when new device information is received. The device service 736 may also query the device database 788 on behalf of other components to retrieve device information and provide the device information to such components.

The user service 734 maintains and retrieves user information at the user database 790 for users of the orchestration framework. The user database 790 may store records corresponding to users of the orchestration framework and user information related to those users. The user information stored at the user database 790 may include, for example: information indicating the identity of a user (e.g., the first and last name of the user, a unique user identifier); information indicating access credentials for a user (e.g., username and password); information indicating a status of a user (e.g., geographic location); information indicating a user role for a user (e.g., meeting presenter, meeting observer); information indicating user groups a user is assigned to; and other types of information related to a user that will be appreciated with the benefit of this disclosure. The user service 734 may update the user database 790 when new user information is received. The user service 734 may also query the user database 790 on behalf of other components to retrieve user information and provide the user information to such components. The orchestration server 702 may, for example, utilize the user information for identity management.

The push notification service 738 is responsible for notifying client devices 704 of actions to perform. The orchestration service 730 may instruct the push notification service 738 to notify a client device 704, and the push notification service may push a notification to the client device in response. The push notification service 738 may include in the notification instructions for the client device indicating the action to perform as well as information needed to perform the action. Notifications from the push notification service will be discussed in further detail below. The push notification service 738 may leverage push notification frameworks provided by the respective platforms of the client devices 704.

The remote storage interface 748 is responsible for communicating with the remote storage data store 786. The remote storage interface 748 may upload content to and download content from the remote storage data store 786. The remote storage data store may be any cloud-based storage service such as, for example, ShareFile®, DropBox, GoogleDocs, Box, and other cloud-based storage services suitable for uploading and downloading content remotely.

The stream service 742 is responsible for creating a meeting stream that includes an outline and a timeline of the online meeting supported with content shared during the online meeting. The stream service may associate the content shared during the online meeting with the meeting stream and store the meeting stream in a data store. Users may then access the meeting stream and its associated content during a subsequent review of the meeting. Content associated with a meeting stream may include a transcription of audio recorded for the meeting, files shared during the meeting (e.g., presentations, photos, documents), streaming media shared during the meeting (e.g., streaming audio, streaming video), and web links shared during the meeting. The transcription service 740 is responsible for receiving audio of the online meeting and transcribing the audio into text to obtain the meeting transcription. The stream service 742 may thus associate the meeting transcription provided by the transcription service with the meeting stream of the meeting.

The PSTN service 752 enables the orchestration server 702 to initiate phone calls to phone devices associated with users. In this way, the orchestration server 702 may proactively contact a meeting participant when a meeting is about to begin and enable the meeting participant to join the meeting via phone.

The global clipboard 753 is a location at the orchestration server 702 that is accessible to each of the client devices 704 interconnected through the orchestration framework 700. A user may select content at a client device 704 and copy the content via the copy-to-clipboard command. The orchestration agent 760 may detect copy-to-clipboard command at the client device 704 and upload the selected content to the orchestration server 702. In response to receipt of the copied content, the orchestration service 730 may store the copied content at the global clipboard 753. The orchestration service 730 may then initiate notification to the other client devices 704 that content has been copied to the global clipboard 753. A user at one of the client devices 704 may execute a paste-from-clipboard command, and the orchestration agent 760 at that client device may detect the paste-from clipboard command and submit a request to the orchestration server 702 requesting the content of the global clipboard 753. In response to receipt of the request, the orchestration service 730 may initiate sending of the content of the global clipboard 753 to the requesting client device 704. Having received the content from the global clipboard 753, the user may paste the content into an application at the client device 704.

The activity management interface 750 enables a user to define activities and associate applications, content, and other resources with an activity. When a user subsequently accesses a defined activity (e.g., to perform micro work), the defined activity provides the work context and the resources necessary to perform the activity at a singular location. The activity management interface 750 may be implemented, for example, as a web-based interface. The activity service 744 manages the activities defined by a user including, e.g., retrieving defined activities from the activity database 792, sorting and filtering defined activities, and searching for defined activities in the activity database 792. Accordingly, the activity service 744 may communicate with the micro work application 728 as well as the activity database 792. The activity service 744 may store and retrieve activity information at the activity database 792. The activity database 792 may store records corresponding to activities defined by a user and activity information associated with those activities. Activity information may include, for example: information indicating a user that created the activity; information indicating computer resources needed to perform the activity (e.g., accounting systems, timekeeping systems); information indicating files needed to perform the activity (e.g., documents); and other types of activity information that will be appreciated with the benefit of this disclosure.

Regarding the client-side orchestration framework components 708, the orchestration agent 760 is responsible for managing cross-device coordination at the client device 704. The orchestration agent 760 provides instructions to other components at the client device 704 in response to input received from a user and in response to notifications received at the client device from the orchestration server. The orchestration agent 760 may, for example, be responsible for configuring the client device for an online meeting in response to receipt of a notification from the orchestration server 704 that the online meeting is about to start. The orchestration agent may also be responsible for coordinating the components of the client-side orchestration framework components 708 during the meeting such that the client device 704 can operate cohesively with other client devices in a coordinated fashion. Furthermore, the orchestration agent may facilitate micro work performed by the user. The rules engine 778 of the orchestration agent 760 is responsible for retrieving rules defined by the user via the rules service 754 at the orchestration server 702 and determining what actions or set of actions to take in response to the occurrence of an event that satisfies a rule trigger. The action handler 780 of the orchestration agent 760 similarly translates an action or a set of actions into a sequence of instructions that, when executed by a client device 704, perform the actions or set of actions of the rule. The trigger generator 782 of the orchestration agent 760 received input from internal or external sources corresponding to an event and determines whether the event satisfies the trigger. If the trigger is satisfied, then the trigger generator 782 may notify the rules engine 778. The trigger generator 782 may similarly receive input from, e.g., other client devices or sensors 798.

The presence service 762 is responsible for communicating with the orchestration server 702 to indicate that the client device 704 is online and available to join an online meeting. In other words, the presence service 762 may announce to the orchestration server 702 the availability of the client device 704. A client device 704 that has announced its availability through the presence service 762 is available to join an online meeting. The presence service 762 may also be configured to obtain location information or movement information from the GPS unit 720 and to obtain NFC (near-field communication) information from other nearby client devices. The presence service 762 may include the location information, movement information, or NFC information in presence updates to the orchestration server 702. In this way, the orchestration server 702 may determine the device status of the client device 704 (e.g., available or unavailable), the geographic location of the client device, a device state of the client device (e.g., moving or stationary), and whether the device is co-located with other client devices.

The notification interface 768 is responsible for handling notifications that are received from the orchestration server 702 or from other client devices. The notification interface 768 may pass notifications received to the orchestration agent 760 for handling.

The authenticator 772 is responsible for ensuring that the user or the client device 704 is authorized and authenticated to access the orchestration server 702 and engage in coordinated cross-device behaviors. Accordingly, the authenticator 772 may engage in an authentication procedure to authenticate and authorize the user or the client device 704. The authenticator 772 may also automatically and transparently authenticate a user or client device 704 when accessing other computing resources or computing systems from the client device, e.g., when performing micro work. The authenticator 772 may be configured to authenticate a user via access credentials (e.g., username and password) or biometrically through facial recognition, voice recognition, fingerprint recognition, or other biometric features of the user.

The application resolver 764 is responsible for determining how to respond to a request that involves launching an application. The application resolver 764 may determine which application to launch in response to the request. For example, if the request involves joining an online meeting, the application resolver 764 may determine to launch the meeting application 724 residing at the client device 704; if the request involves opening a file, the application resolver may identify an application residing at the client device capable of opening the file; and if the request involves navigating to a web link, the application resolver may determine to launch a web browser residing at the client device. The application resolver 764 may also determine the platform on which to launch the application. For example, the application resolver 764 may determine whether the application should be launched as a native application 730 residing at the client device 704, as a virtual application through the virtual client application 726 at the client device, or as a web-based application through a web browser residing at the client device. The application resolver 764 may further determine appropriate application parameters for an application based on the request. For example, if a user requests that video output of an online meeting be presented at a tablet computing device, the application resolver 764 may determine that the meeting application should be launched at the tablet computing device in a video output mode. The application launcher 766 is responsible for launching the application at the client device 704. The application resolver 764 may indicate which application the application launcher should launch and any corresponding application parameters for the application.

The remote storage interface 770 is responsible for communicating with the remote storage data store 786. The remote storage interface 770 may upload content to and download content from the remote storage data store 786. The stream compositor 774 is responsible for managing the meeting stream of an online meeting at the client device 704. The stream compositor 774 may manage the process of uploading content to be associated with the meeting stream to the orchestration server 702 from the client device 704. The stream compositor 774 may also manage the process of receiving content associated with the meeting stream from the orchestration server 702 and displaying the meeting stream at the client device 704.

The activity compositor 776 is responsible for managing the process of constructing the work context for an activity defined by the user for presentation at the micro work application 728. The activity compositor 776 may communicate with the orchestration server to retrieve the resources, content, and other activity information associated with an activity such that they may be presented to a user in a singular work context.

As noted above, the orchestration server 702 and client device 704 may include various combinations of the components described above. It will also be appreciated that the orchestration server 702 or client device may include additional or alternative components that facilitate cross-device coordination among interconnected devices.

As also noted above, the orchestration server 702 may be in communication with a scheduling server 795 via a premise-based infrastructure 796 that includes a scheduling service 797. The scheduling server 795 may maintain calendars for multiple individuals, and the calendars may include schedule-related items such as appointments and meetings. The premise-based infrastructure 796 may handle communication with the scheduling server 795 to obtain calendar information for individuals. The calendar information may include online meetings a user is scheduled for (e.g., date, time, location) as well as information identifying the other meeting participants. The orchestration service 730 may thus derive a list of users or user groups available for selection to receive shared content based on the calendar information received from the scheduling server. The presence-based infrastructure 796 may include a scheduling service 797 that proactively monitors the calendars maintained at the scheduling server 795. In this way, the scheduling service 797 may determine when individuals have upcoming meetings. When meetings are due to occur, the scheduling service 797 may communicate with the orchestration server 702 to indicate that a meeting is about to start. In some example implementations, a Microsoft Exchange server and Microsoft Exchange service may be employed as the scheduling server 795 and scheduling service 797 respectively. Other types of scheduling servers or scheduling services may be selectively employed.

The sensors 798 in communication with the orchestration server 702 or the client device 704 may include various types of sensors. Example types of sensors include motion sensors, light sensors, temperature sensors, and other sensors suitable for coordinating operation of interconnected devices.

Figure 7D:
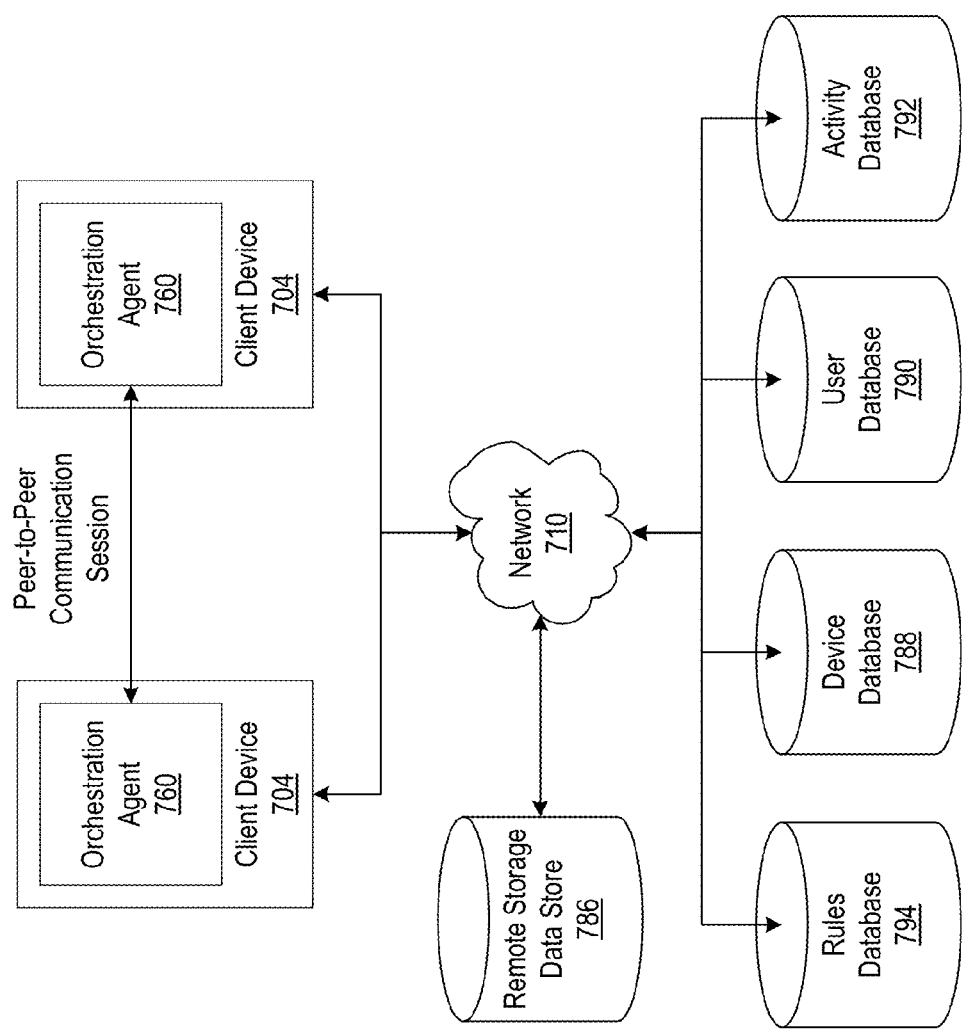
FIG. 7D depicts a block diagram of client devices interconnected through a peer-to-peer session according to one or more illustrative aspects described herein.

As noted above, the orchestration framework may also interconnect client devices 704 to operate as a coordinated whole via a peer-to-peer communication session. FIG. 7D depicts a block diagram of client devices 704 interconnected via a peer-to-peer session. In FIG. 7D, the client devices 704 are interconnected through respective orchestration agents 760 rather than an orchestration server. The client devices 704 in FIG. 7D may thus engage in cross-device coordination through a peer-to-peer communication session between the orchestration agents 760. In this example implementation, the orchestration agents 760 may access the data stores—e.g., the remote storage data store 786, the rules database 794, the device database 788, or the user database 790—via the network 710. It will be appreciated that aspects of the orchestration framework and cross-device coordination are applicable in the peer-to-peer context as well as the client-server context.

The sections below describe how the orchestration framework may be used to coordinate operation of interconnected devices such that the devices function as a cohesive and coordinated whole. In particular, the sections below describe how the orchestration framework may be utilized to conduct online meetings with devices engaged in cross-device coordination, share computing activities and content across interconnected devices, customize behavior of the orchestration framework, and create and access activities for micro work.

Online Meetings Devices Engaged in Cross-Device Coordination

Aspects of the orchestration framework described in this section are directed towards joining online meetings at a client device, transferring an online meeting from one client device to another client device, and compiling a meeting stream for an online meeting.

Figure 8:
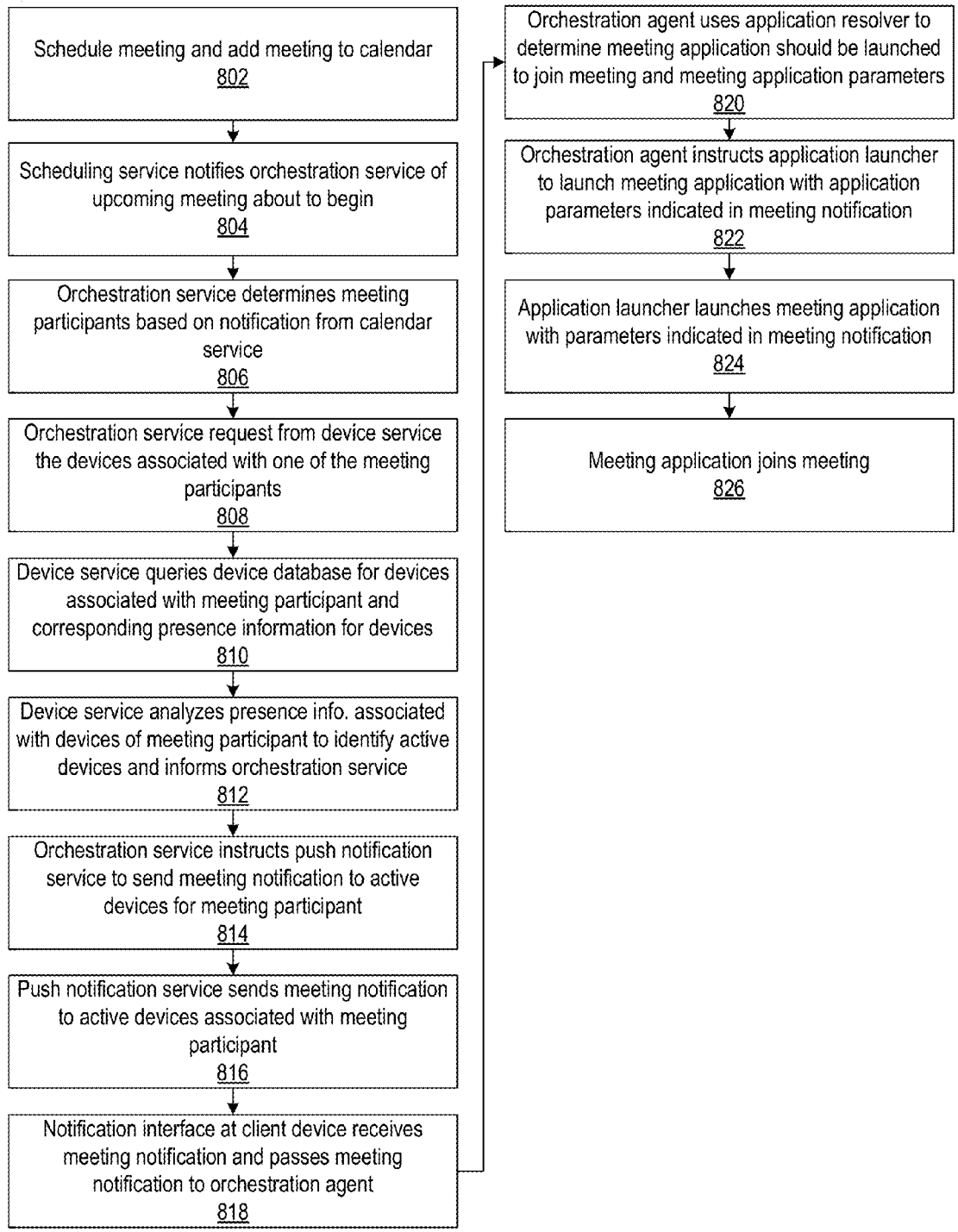
FIG. 8 is a flowchart of example method steps for joining an online meeting.

In FIG. 8, a flowchart 800 of example method steps for joining an online meeting is shown. As seen in FIG. 8, a meeting may be scheduled and added to the calendar of an individual (block 802). When the meeting is about to begin, the scheduling service may notify the orchestration service (block 804). In response, the orchestration service may determine the meeting participants based on the notification (block 806). The orchestration service may request from the device service the devices associated with one of the meeting participants (block 808). The device service may in turn query the device database for the devices associated with the meeting participant (block 810). The device service may analyze the presence information for the devices of the meeting participant, determine which devices are active based on the presence information, and inform the orchestration service of the active devices of the meeting participant (block 812). The orchestration service may then instruct the push notification service to send a meeting notification to the active devices of the meeting participant (block 814), and the push notification service may send the meeting notifications to the active devices of the meeting participant in response (block 816). The notification interface at one of the client devices may receive the meeting notification and pass the meeting notification to the orchestration agent at the client device (block 818). The orchestration agent may use the application resolver to determine the meeting application should be launched to join the meeting as well as any parameters to launch the meeting application with (block 820). The application resolver may determine application parameters based on information included in the meeting notification. The orchestration agent may then instruct the application launcher to launch the meeting application with any determined parameters (block 822), and the application launcher may launch the application with the parameters indicated (block 824). After launch, the meeting application may join the meeting based on meeting information also included in the meeting notification (block 826).

Figure 9:
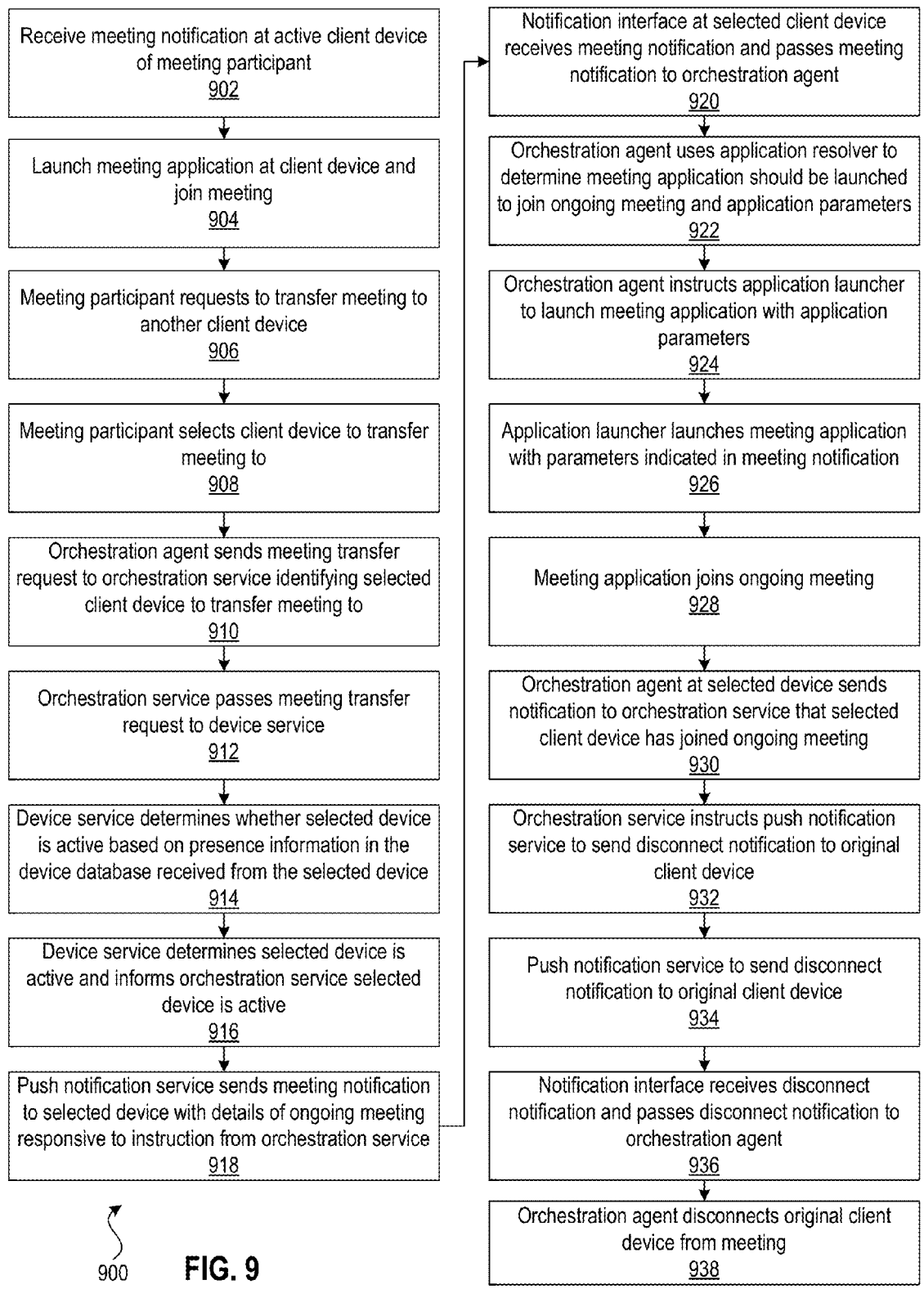
FIG. 9 is a flowchart of example method steps for transferring an online meeting from one client device to another client device

In FIG. 9, a flowchart 900 of example method steps for transferring an online meeting from one client device to another client device is shown. As seen in FIG. 9, an active client device of a meeting participant may receive a meeting notification (block 902). The orchestration agent may manage the launch of the meeting application at the client device and join the meeting (block 904). At some point during the meeting, the meeting participant may request to transfer the meeting to another client device (block 906), and select the client device to transfer the meeting to (block 908). The orchestration agent at the original client device may send a meeting transfer request to the orchestration service (block 910). The meeting transfer request may identify the client device the meeting participant has selected to transfer the meeting to. The orchestration service may pass the meeting transfer request to the device service (block 912), and the device service may determine whether the selected client device is active based on presence information received from the selected client device and stored for in the device database (block 914). In this example, the device service determines the selected client device is active and informs the orchestration service (block 916). The push notification service may send a meeting notification to the selected client device in response to an instruction from the orchestration service (block 918). The meeting notification sent to the selected client device may include meeting information that identifies the ongoing meeting.

The notification interface at the selected client device may receive the meeting notification and pass the meeting notification to the orchestration agent at the selected client device (block 920). As described above, the orchestration agent may use the application resolver to determine the meeting application should be launched at the selected client device in order to join the ongoing meeting at the selected client device (block 922). As also described above, the orchestration agent may use the application resolver to determine application parameters for the meeting application based on the meeting notification. The orchestration agent may instruct the application launcher to launch the meeting application with any determined parameters (block 924), and the application launcher may launch the meeting application with the parameters indicated (block 926). The meeting application at the selected client device may thus join the ongoing meeting (block 928).

The orchestration agent at the selected device may then send a notification to the orchestration service that the selected client device has joined the ongoing meeting (block 930). Upon receipt of this notification, the orchestration service may instruct the push notification service to send a disconnect notification to the original client device (block 932), and the push notification may send the disconnect notification to the original client device (block 934) in response. The notification interface at the original client device may receive the disconnect notification and pass the disconnect notification to the orchestration agent (block 936). The orchestration agent may then disconnect the original client device from the ongoing meeting (block 938), e.g., by closing the meeting application. The meeting participant may thus continue participation in the ongoing meeting at the selected client device.

Aspects of the orchestration framework enable a meeting participant to easily join or transfer a meeting. In some situations, the orchestration framework may automatically connect the client device of a meeting participant to a meeting. In other situations, the orchestration framework may prompt the meeting participant to confirm whether the client device should join the meeting. Although the orchestration framework may prompt for user input indicting whether or not to join a meeting, the orchestration framework handles activation and configuration of the meeting application once the meeting participant provides confirmation. In this way, a meeting participant need not be concerned or familiar with the technical details of how to join an online meeting since such technical details are handled by the orchestration framework.

In view of this capability of the orchestration framework, FIG. 10 depicts another flowchart 1000 of example method steps for joining an online meeting. The client device of a meeting participant may receive a meeting notification of an upcoming meeting (block 1002). If the meeting participant has configured the orchestration framework to automatically join client devices to online meetings (block 1004:Y), then the orchestration agent at the client device may launch the meeting application, configure the meeting application, and join the online meeting (block 1006) automatically without confirmation from the meeting participant. If the participant has not configured the orchestration framework to automatically join client devices to online meetings (block 1004:N), then the orchestration agent may display the meeting notification to the meeting participant at the display device and prompt the meeting participant to provide input indicating whether or not to join the meeting (block 1008). In this example, the meeting participant provides input at the client device confirming the orchestration agent should join the client device to the meeting (block 1010). In response to confirmation from the meeting participant, the orchestration agent may launch and configure the meeting application and join the meeting (block 1006).

Aspects of the orchestration framework also enable a meeting participant to provide confirmation input via natural interfaces such as speech ("no-touch") or via a single click at the client device ("one-touch"). The orchestration framework may also enable a meeting participant to transfer an ongoing online meeting to another client device via no-touch input or one touch input. Other types of natural interfaces that may be selectively employed include hand gestures and determining where the gaze of the user is focused. FIG. 11A depicts an example of a client device 1100 that prompts a meeting participant to provide confirmation input via no-touch input or one-touch input. FIG. 11B, depicts an example of another client device 1102 that prompts a meeting participant to select client device to transfer a meeting to via one-touch input. A meeting participant may employ natural interfaces such as speech, hand gestures, and gaze in order to join an online meeting at a client device, interact the orchestration framework during the online meeting, or to transfer an online meeting to another client device.

Figure 12:
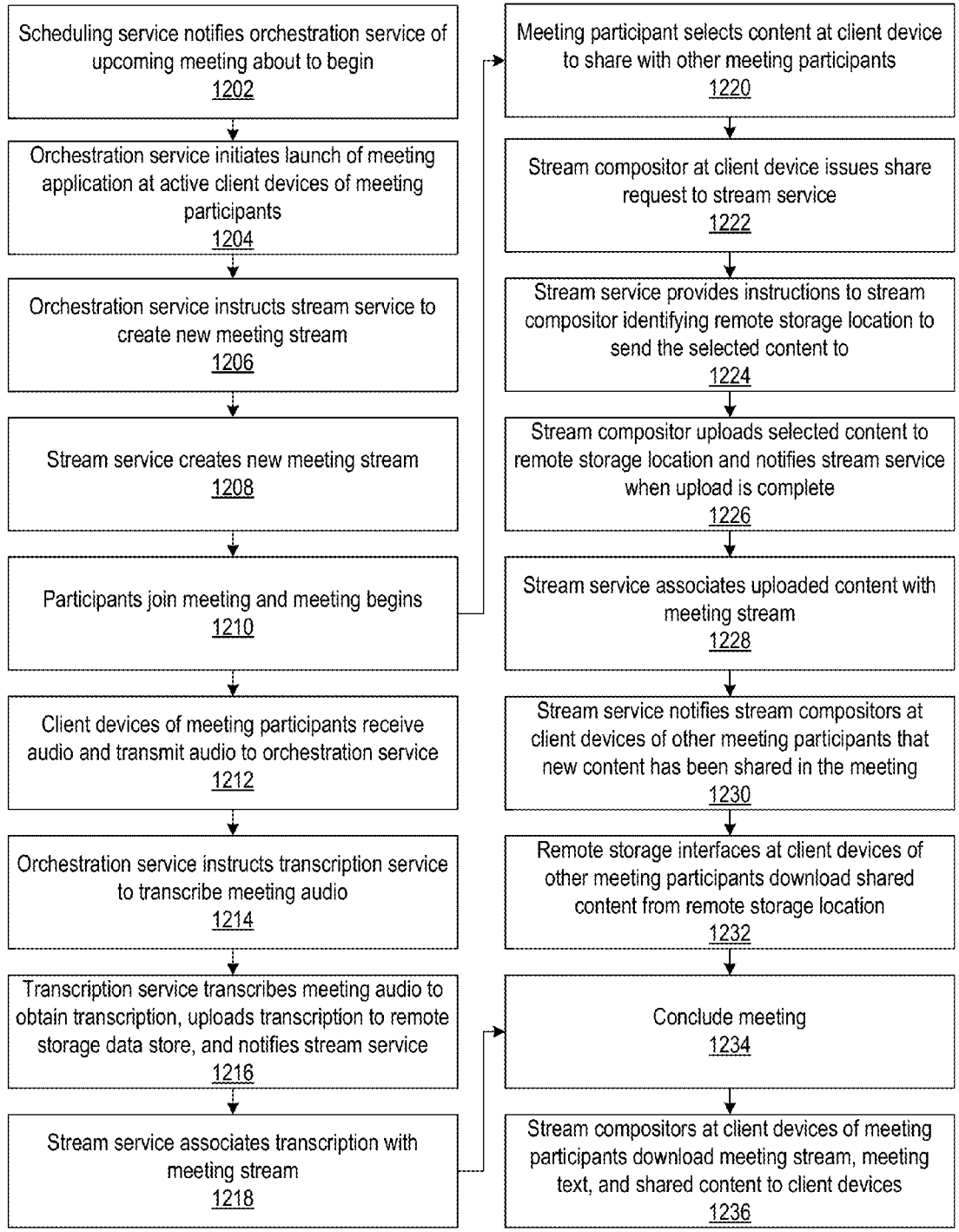
FIG. 12 is a flowchart of example method steps for compiling a meeting stream during an online meeting.

As described above, the orchestration framework may compile a meeting stream during the duration of an online meeting. In FIG. 12, a flowchart 1200 of example method steps for compiling a meeting stream during an online meeting is shown. As seen in FIG. 12, the scheduling service may notify the orchestration service that a meeting is about to begin (block 1202), and the orchestration service may initiate the launch of the meeting application at the client devices of meeting participants (block 1204). The orchestration service may also instruct the stream service to create a new meeting stream (block 1206), and the stream service may create a new meeting stream (block 1208) in response. The meeting participants may join the meeting via the meeting application at their client devices to begin the meeting (block 1210).

For the duration of the meeting, various collaboration activities may occur simultaneously. As seen in FIG. 12, for example, the client devices of the meeting participants may receive audio from the meeting participants and transmit the audio to the orchestration service (block 1212). The transcription service at the orchestration server may receive the audio, and the orchestration service may instruct the transcription service to transcribe the audio received (block 1214). The transcription service may transcribe the received audio to obtain a transcription of the meeting, uploads the transcription to the remote storage data store, and notifies the stream service of the remote storage location of the transcription (block 1216). In some example implementations, the transcription service may upload a full transcription of the meeting to the remote storage data store once the meeting has ended. The stream service may thus associate the transcription of the meeting with the meeting stream (block 1218).

As also seen in FIG. 12, a meeting participant may select content at a client device (e.g., files, streaming media, web links) to share with other meeting participants (block 1220). The stream compositor at a client device may issue a share request to the stream service at the orchestration server (block 1222), and the stream service may provide instructions to the stream compositor identifying a remote storage location the stream compositor should send the selected content to (block 1224). The stream compositor may upload the selected content to the remote storage location and notify the stream service when the upload is complete (block 1226). The stream service may associate the uploaded content with the meeting stream (block 1228) and notify the stream compositors at the client devices of the other meeting participants that newly shared content is available (block 1230). The notification from the stream service may indicate the remote location where the shared content is stored at the remote storage data store. The remote storage interfaces at the client devices of the other meeting participants may thus download the shared content from the remote content data store (block 1232). The remote storage interfaces may download the shared content in response to receipt of input from a meeting participant or automatically in response to an instruction from the orchestration agent. Once the meeting has concluded (block 1234), the stream compositors at the client devices may initiate download of the meeting stream, the transcription associated with meeting stream, and any content shared during the meeting (block 1236). In this way, meeting participants that were not present for some or all of the meeting may advantageously review the portions of the meeting that were missed.

Sharing Computing Activities and Content Across Interconnected Devices

Aspects of the orchestration framework described in this section are directed towards customizing the behavior of the orchestration framework by associated client devices with physical spaces or user groups, assigning roles to client devices or users, and creating and applying rules.

Figure 13:
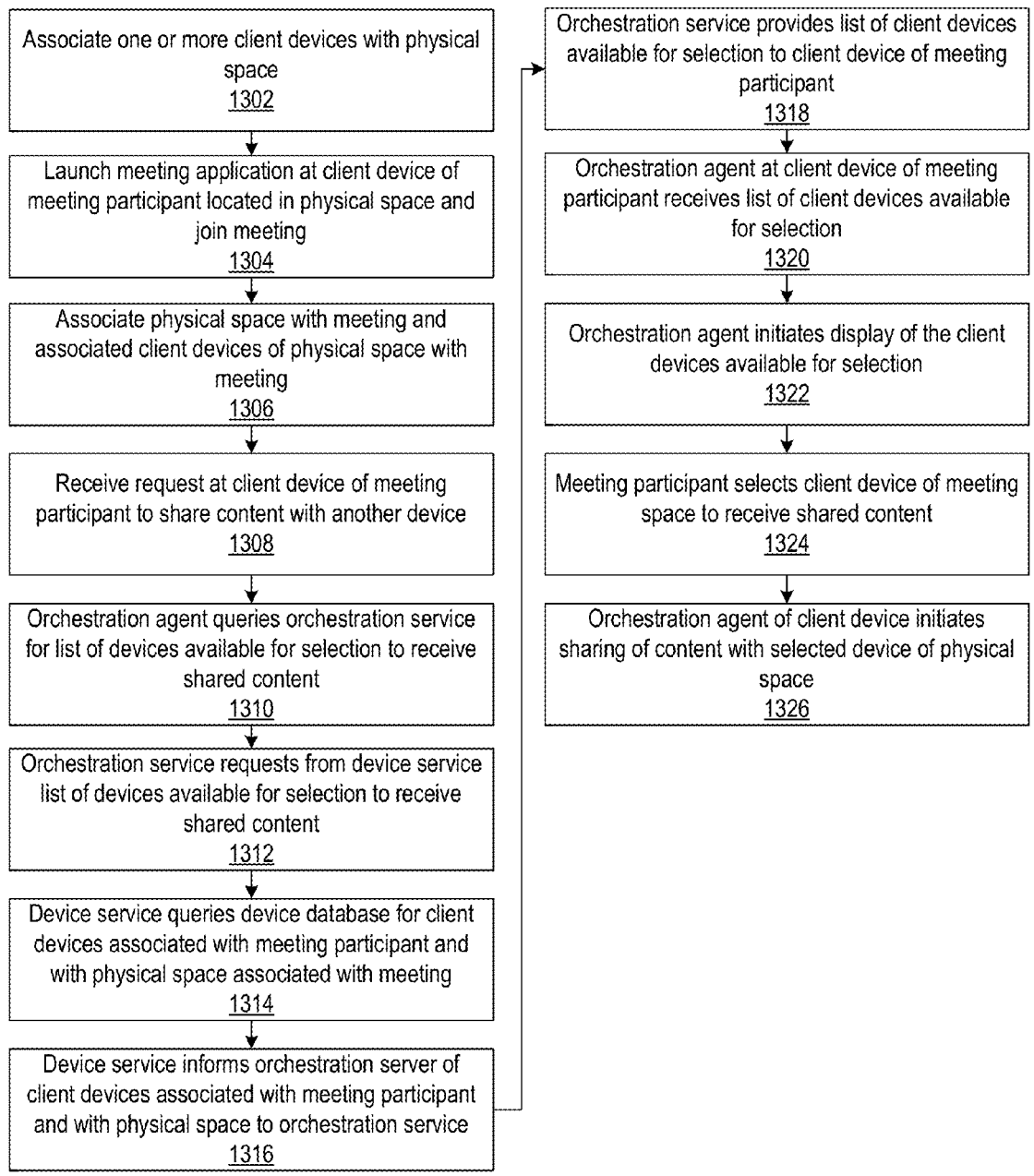
FIG. 13 is a flowchart of example method steps for associating client devices with a physical space.

In FIG. 13, a flowchart 1300 of example method steps for associating client devices with a physical space is shown. As seen in FIG. 13, one or more client devices may be associated with a physical space (block 1302), e.g., a conference room. A user may manually define the physical space and manually associate the client devices with the physical space. Information related to the physical space and the devices associated with the physical space may be stored in the device database. The client devices may also be automatically associated with a physical space through NFC information provided by the client devices that indicate the client devices are co-located. A meeting participant may launch a meeting application at a client device located within the physical space and join an online meeting (block 1304). The physical space may be associated with the online meeting such that the client devices associated with the physical space are also associated with the online meeting (block 1306). The client devices associated with the meeting may be interconnected through the orchestration framework as described above.

During an online meeting, a meeting participant may request to share content residing at one client device with another client device (block 1308). The orchestration agent at the client device may query the orchestration service at the orchestration server for a list of client devices available for selection to receive the selected content (block 1310). In turn, the orchestration service may request from the device service a list of client devices available to receive the shared content (block 1312). The device service may query the device database for client devices that are associated with the meeting participant as well as devices that are associated with the physical space (block 1314) and informs the orchestration service of the devices that are associated with the meeting participant and with the physical space (block 1316). The orchestration service may provide the list of client devices available for selection to the client device of the meeting participant (block 1318), and the orchestration agent at the client device may receive the list of client devices available for selection to receive the selected content (block 1320). The orchestration agent may initiate display of the client devices available for selection (block 1322). In this example, the meeting participant may select one of the client devices associated with the physical space to receive the selected content (block 1324). In response to the selection, the orchestration agent may initiate the sharing of the selected content with the selected client device of the physical space (block 1326) as described above. It will be appreciated that the various steps described above may also be employed to distribute a computing activity across interconnected devices that are associated with a common physical space.

Figure 14:
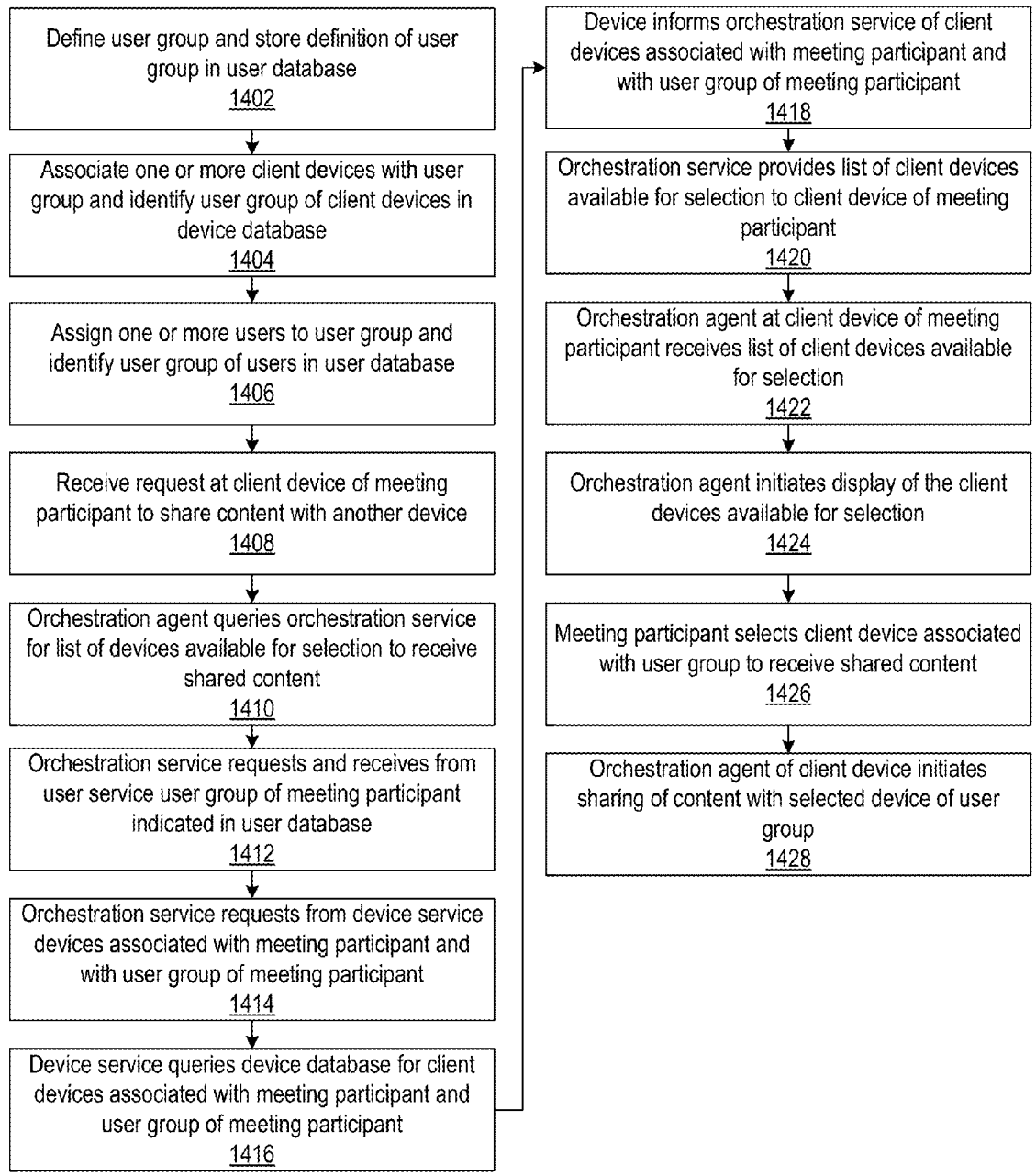
FIG. 14 is a flowchart of example method steps for associating client devices with a user group.

In FIG. 14, a flowchart 1400 of example method steps for associating client devices with a user group is shown. As seen in FIG. 14, a user group may be defined and the user group definition may be stored in the user database (block 1402). A user group may be manually defined and the client devices associated with that user group may be manually selected. User groups may also be automatically defined by determining multiple users are co-located with one another through NFC information provided by the client devices respectively associated with the co-located users. One or more client devices may be associated with the user group, and the device database may be updated with device information that indicates the user group assignments for the client devices (block 1404). One or more users may also be assigned to the user group, and the user database may be updated with user information that indicates the user group assignments for the users (block 1406).

During an online meeting, a meeting participant may request to share content residing at one client device with another client device (block 1408). The orchestration agent at the client device may query the orchestration service at the orchestration server for a list of client devices available for selection to receive the selected content (block 1410). In turn, the orchestration service may request from the user service the user group of the meeting participant, the user service may query the user database for the user group of the meeting participant, and inform the orchestration service of the user group of the meeting participant (block 1412). The orchestration service may then request from the device service the client devices associated with the meeting participant and with the user group the meeting participant is assigned to (block 1414). The device service may query the device database for client devices that are associated with the meeting participant as well as devices that are associated with the user group of the meeting participant (block 1416) and informs the orchestration service of the devices that are associated with the meeting participant and with the user group of the meeting participant (block 1418). The orchestration service may provide the list of client devices available for selection to the client device of the meeting participant (block 1420), and the orchestration agent at the client device may receive the list of client devices available for selection to receive the selected content (block 1422). The orchestration agent may initiate display of the client devices available for selection (block 1424). In this example, the meeting participant may select one of the client devices associated with the user group to receive the selected content (block 1426). In response to the selection, the orchestration agent may initiate the sharing of the selected content with the selected device of the user group (block 1428) as described above. It will be appreciated that various steps described above may also be employed to distribute a computing activity across interconnected devices that are associated with a user group.

Figure 15:
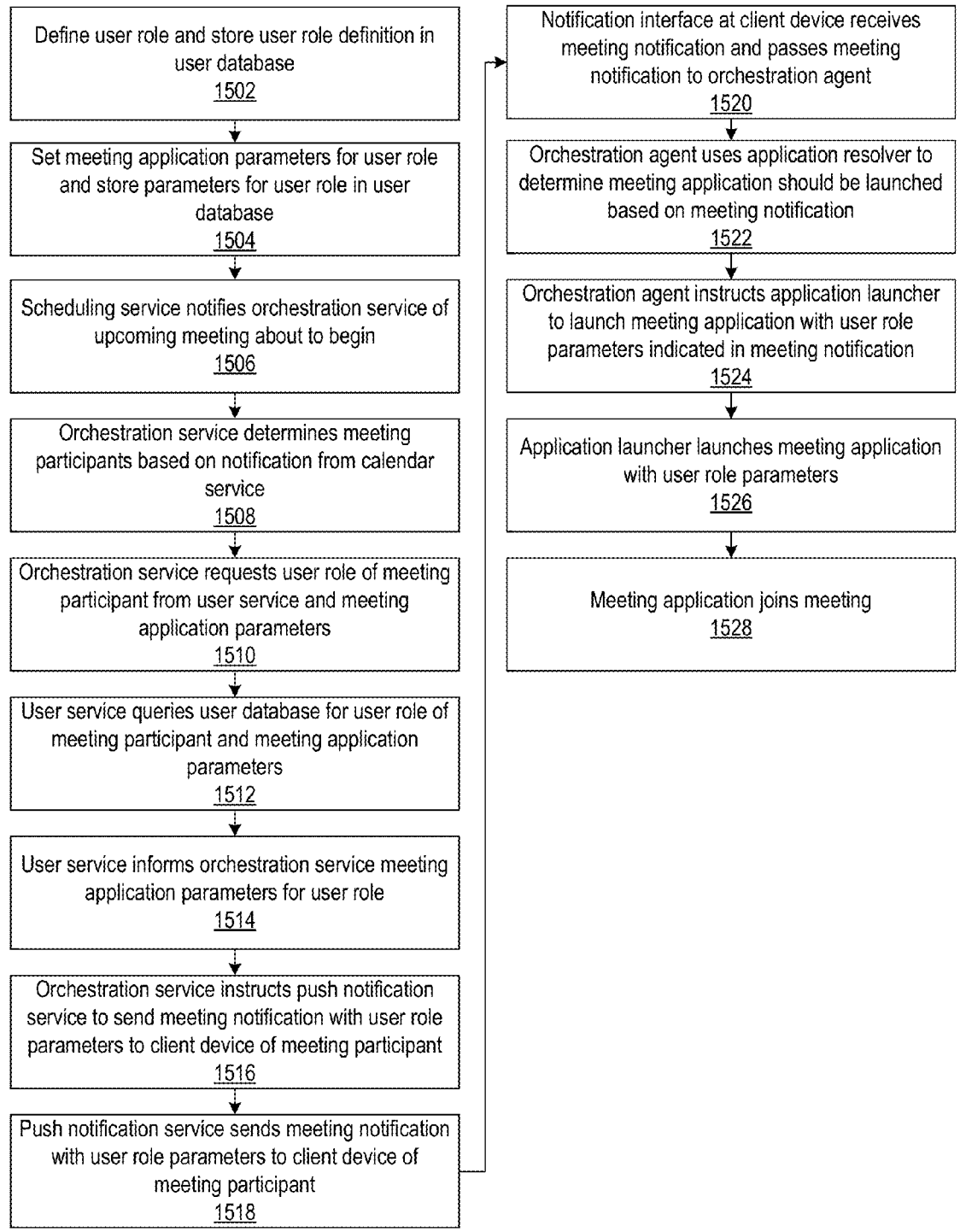
FIG. 15 is a flowchart of example method steps for customizing a coordinated online meeting based on a user role.

In FIG. 15, a flowchart 1500 of example method steps for customizing a coordinated online meeting based on a user role is shown. As seen in FIG. 15, a user role may be defined and the user role definition may be stored in the user database (block 1502). Meeting application parameters may be selected for the user role, and the meeting application parameters may also be stored in the user database with the user role definition (block 1504). Users may be assigned user roles to enable or disable certain functionality provided by the orchestration framework with respect to cross-device coordination. Examples of user roles may be a meeting presenter role, a meeting observer role, and other types of user roles that will be appreciated with the benefit of this disclosure. Parameters for a meeting presenter may be selected such that a meeting presenter can share audio, video, and selected content with other meeting participants. Parameters for a meeting observer may be selected such that the microphone at a client device of a meeting observer is muted during the meeting. Parameters for other applications may also be selected based on the user role. Additional and alternative parameters based on the user role will also be appreciated with the benefit of this disclosure.

The scheduling service may notify the orchestration service of an upcoming meeting (block 1506), and the orchestration service may identify the meeting participants based on the notification received from the scheduling service (block 1508). The orchestration service may request from the user service the user role of a meeting participant and the meeting application parameters associated with the user role (block 1510). The user service may query the user database for the user role of the meeting participant and the meeting application parameters associated with the user role (block 1512). The user service may then inform the orchestration service of the meeting application parameters associated with the user role (block 1514). The orchestration service may then instruct the push notification service to send a meeting notification to the client device of the meeting participant and provide the meeting application parameters to the push notification service (block 1516). The push notification service may then transmit a meeting notification to the client device that includes the meeting parameters associated with the user role of the meeting participant (block 1518). The notification interface at the client device may receive the meeting notification and pass the meeting notification to the orchestration agent (block 1520). In this example, the orchestration agent may use the application resolver to determine the meeting application should be launched (block 1522), and the orchestration agent may instruct the application launcher to launch the meeting application with the user role parameters included in the meeting notification (block 1524). The application launcher may launch the meeting application with the user role parameters (block 1526), and the meeting application may join the meeting (block 1528). Depending on the parameters the meeting application was launched with, certain functionality of the client device, the meeting application, or the orchestration framework may be enabled or disabled. It will be appreciated that various steps described above may be selectively employed to launch other types of applications at a client device with parameters that are based on a user role of a user of the client device.

Figure 16:
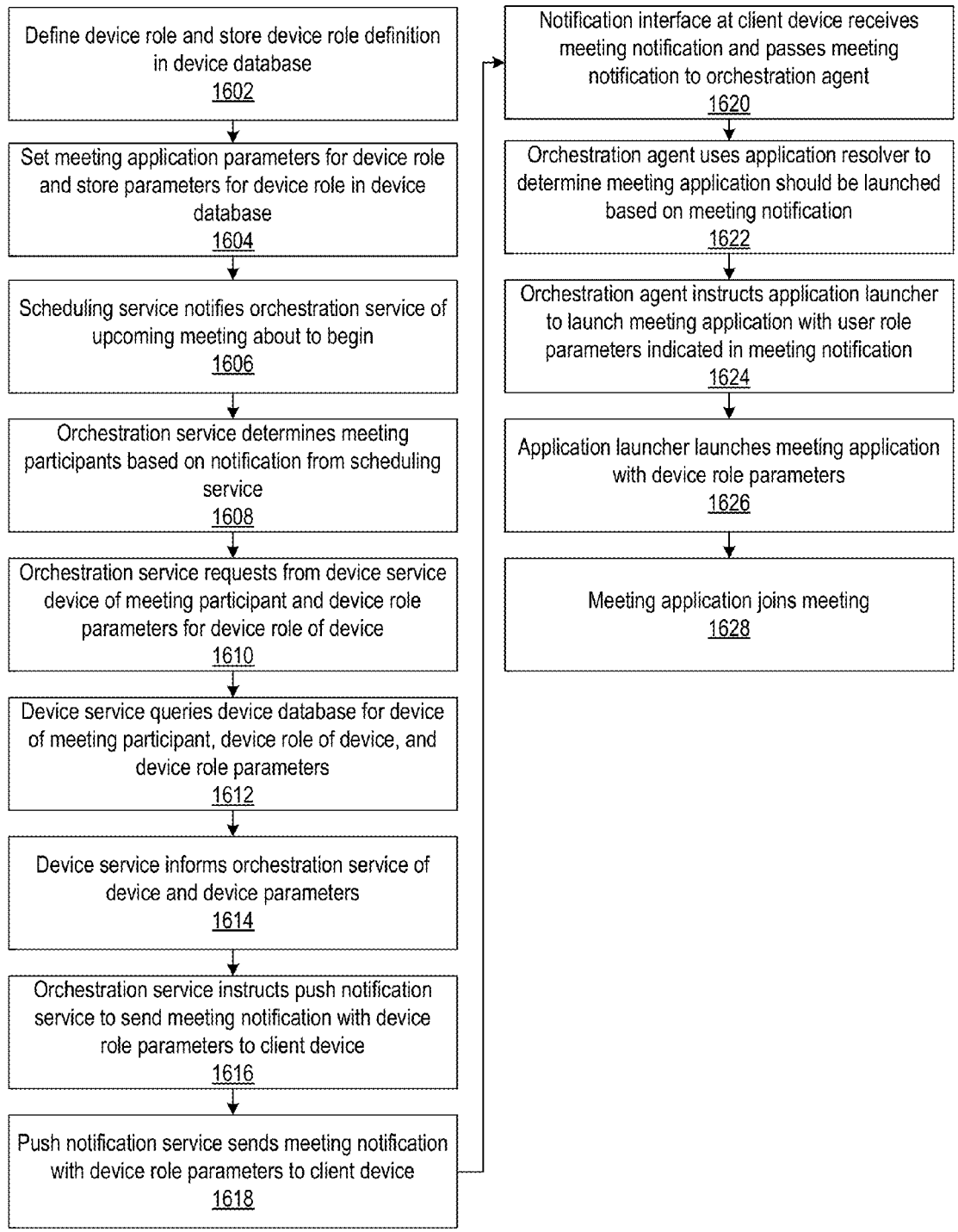
FIG. 16 is a flowchart of example method steps for customizing a coordinated online meeting based on a device role.

In FIG. 16, a flowchart 1600 of example method steps for customizing a coordinated online meeting based on a device role is shown. As seen in FIG. 16, a device role may be defined and the device role definition may be stored in the device database (block 1602). Meeting application parameters may be selected for the device role, and the meeting application parameters may also be stored in the device database with the device role definition (block 1604). Client devices may be assigned device roles based on the capabilities of a client device (e.g., the peripherals available) or to enable or disable certain functionality of the orchestration framework with respect to cross-device coordination. Examples of device roles include an audio input role, an audio output role, a video input role, a video output role, a web link display role, a document display role, a document edit role, and other types of roles that will be appreciated with the benefit of this disclosure. Parameters for the video output role may be selected such that a client device assigned the video output role launches the meeting application in a video output mode. Parameters for a document display role may be selected such that a client device assigned the document display role opens shared documents in a read-only mode, while parameters for a document edit mode may be selected such that a client device assigned the document edit mode opens shared documents in a read-write mode. Parameters for other device roles and other applications may also be selected based on the user role. Additional and alternative parameters based on the user role will also be appreciated with the benefit of this disclosure.

The scheduling service may notify the orchestration service of an upcoming meeting (block 1606), and the orchestration service may identify the meeting participants based on the notification received from the scheduling service (block 1608). The orchestration service may request from the device service a client device associated with the meeting participant and the application parameters associated with the device role of that device (block 1610). The device service may query the device database for the client devices associated with the meeting participant, the device role of that device, and the meeting application parameters associated with that device role (block 1612). The device service may then inform the orchestration service of the meeting application parameters associated with the device role of the client device (block 1614).

The orchestration service may then instruct the push notification service to send a meeting notification to the client device of the meeting participant and provide the meeting application parameters to the push notification service (block 1616). The push notification service may then transmit a meeting notification to the client device that includes the meeting parameters associated with the device role of the client device (block 1618). The notification interface at the client device may receive the meeting notification and pass the meeting notification to the orchestration agent (block 1620). In this example, the orchestration agent may use the application resolver to determine the meeting application should be launched (block 1622), and the orchestration agent may instruct the application launcher to launch the meeting application with the device role parameters included in the meeting notification (block 1624). The application launcher may launch the meeting application with the device role parameters (block 1626), and the meeting application may join the meeting (block 1628). Depending on the parameters the meeting application was launched with, certain functionality of the client device, the meeting application, or the orchestration framework may be enabled or disabled. It will be appreciated that various steps described above may be selectively employed to launch other types of applications at a client device with parameters that are based on a device role of the client device.

Figure 17:
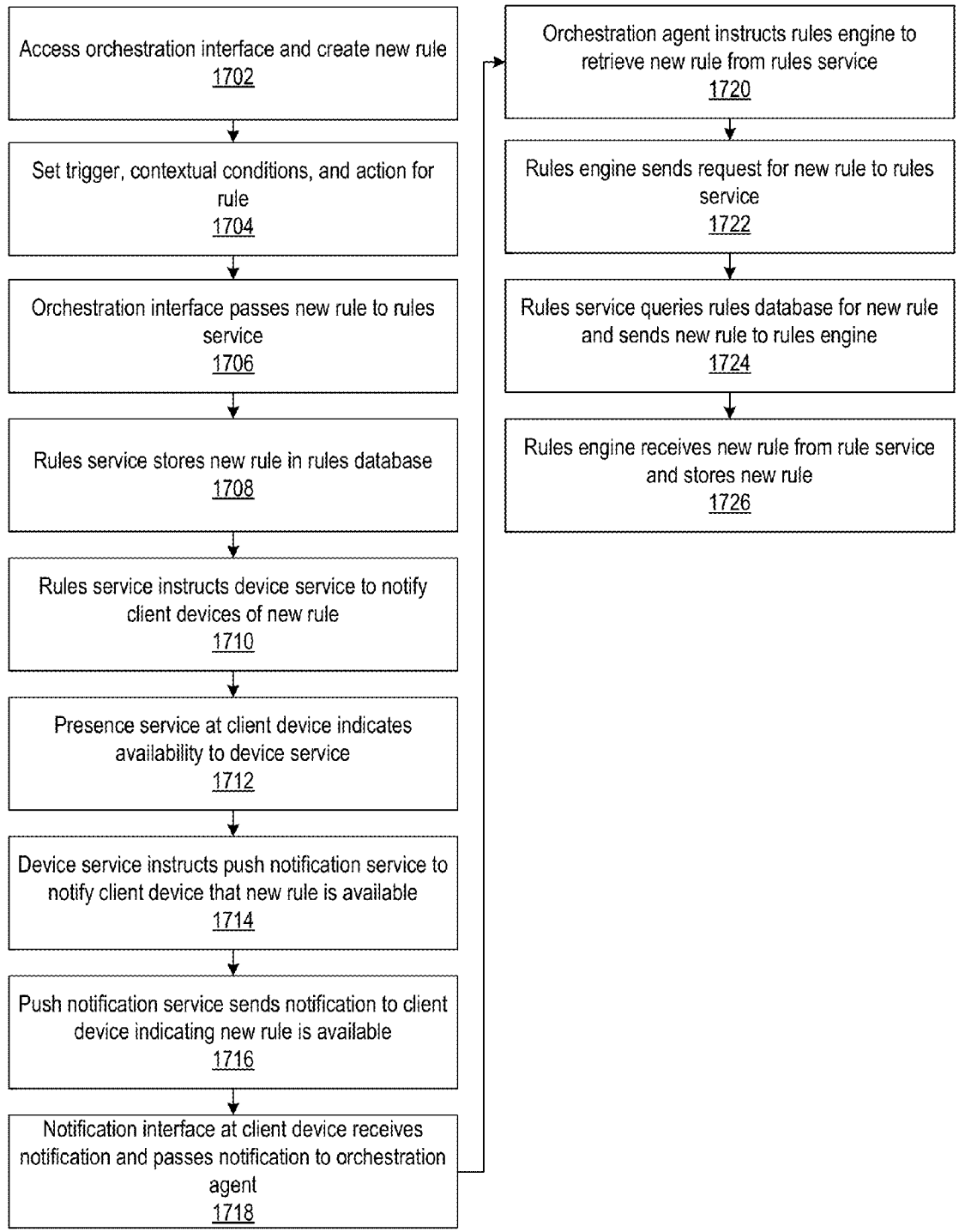
FIG. 17 is a flowchart of example method steps for defining a rule of an orchestration framework.

In FIG. 17, a flowchart 1700 of example method steps for defining a rule of an orchestration framework is shown. As seen in FIG. 17, a user may access the orchestration interface to create a new rule (block 1702). Through the orchestration interface, the user may set the trigger for the rule, contextual conditions for the rule, and one or more actions for the rule (block 1704). The orchestration interface may pass the new rule to the rules service (1706), and the rules service may store the new rule in the rules database (block 1708). The rules service may then instruct the device service to notify a client device that a new rule is available the next time the client device becomes available (block 1710). Accordingly, the presence service of a client device may inform the device service that the client device is available (block 1712), and the device service may instruct the notification service to notify the client device that a new rule is available (block 1714). The push notification service may send a notification to the client device indicating that a new rule is available (block 1716). The notification interface at the client device may receive the notification and pass the notification to the orchestration agent (block 1718). The orchestration agent may instruct the rules engine to retrieve the new rule from the rules service (block 1720) and the rules engine may request the new rule from the rules service (block 1722). The rules service may query the rules database for the new rule and sends the new rule to the rules engine (block 1724). Upon receipt of the new rule from the rules service, the rules engine may store the new rule at the client device (block 1726).

Figure 18:
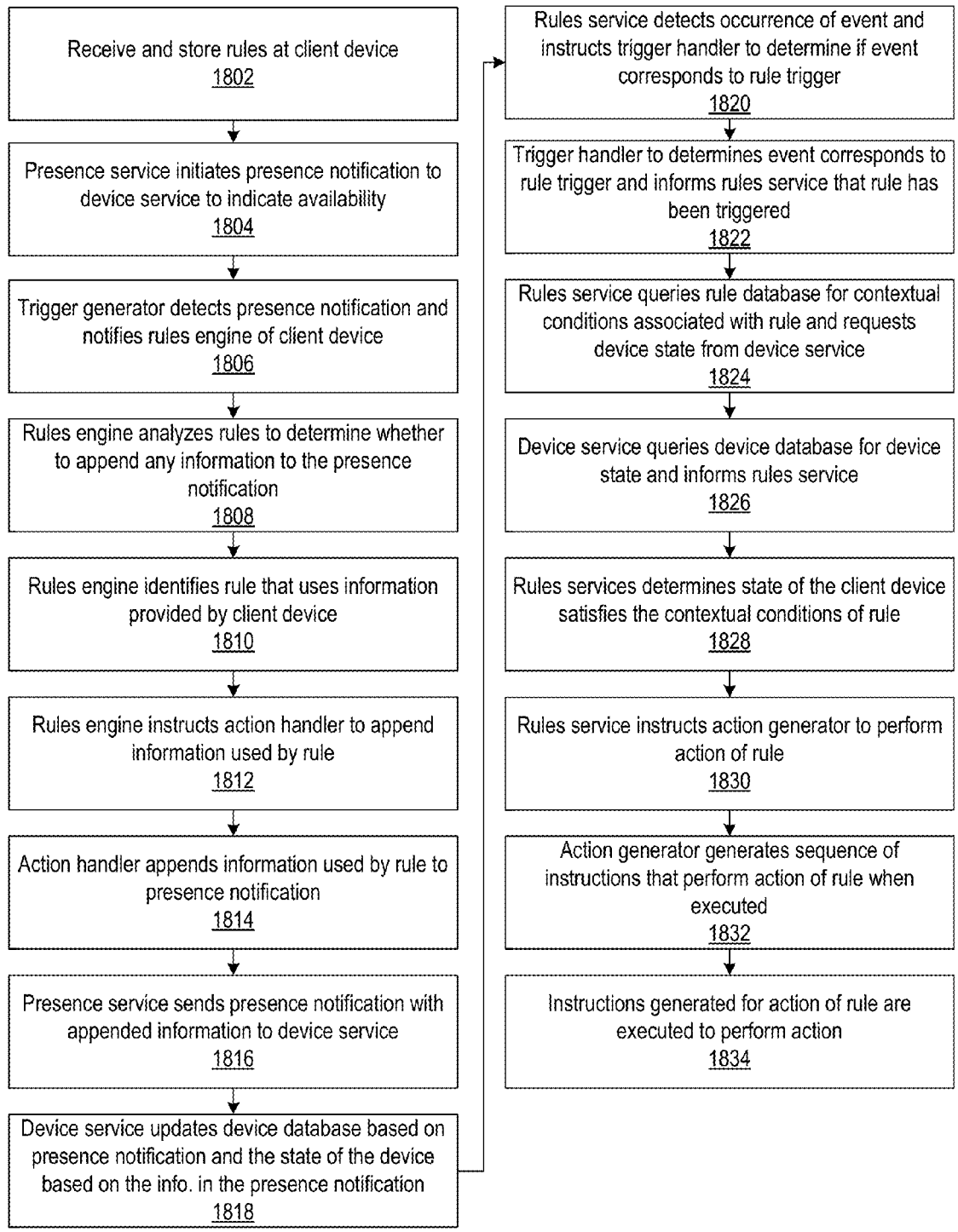
FIG. 18 is a flowchart of example method steps for generally applying a rule of an orchestration framework.

In FIG. 18, a flowchart 1800 of example method steps for generally applying a rule of an orchestration framework is shown. As seen in FIG. 18, a client device may receive and store rules (block 1802). The presence service of the client device may initiate a presence notification to the device service indicating the availability of the device (block 1804). The trigger generator may detect the presence notification and notify the rules engine (block 1806). The rules engine may analyze the rules stored at the client device to determine whether any information should be appended to the presence notification (block 1808). The rules engine may identify one or more rules that rely on information provided by the client device (block 1810) such as, e.g., contextual information relating to the state or status of the client device. The rule engine may thus instruct the action handler to append any necessary information to the presence notification (block 1812), and the action handler may append information used by one or more of the rules to the presence notification (block 1814) in response. For example, a rule may utilize the geographic location of a client device to determine whether contextual conditions of the rule are satisfied. In this example, the action handle may query the GPS unit of a client device for location information and append the location information to the presence notification. As another example, a GPS unit of a client device may provide information indicating that the client device is in motion, e.g., as a user is traveling in a vehicle. Other examples of information the action handler may append to the presence notification will be appreciated with the benefit of this disclosure. With the information appended to the presence notification, the presence service may send the presence notification to the device service (block 1816). The device service may receive the presence notification, update the device database based on the presence notification, and indicate state or status of the device in the device database based on the information appended to the presence notification.

Subsequently, the rules service at the orchestration server may detect the occurrence of an event and instruct the trigger handler to determine whether the event corresponds to a rule trigger (block 1820). In this example, the trigger handler determines the event corresponds to a rule trigger and informs the rules service that a rule has been triggered (block 1822). Accordingly, the rules service, in this example, queries the rules database for the contextual conditions associated with the rule and requests the state of the device from the device service (block 1824). The device service may query the device database for the state of the client device and inform the rules service of the device state (block 1826). The rules services, in this example, also determines that the device state of the client device satisfy the contextual conditions for the rule (block 1828) and instructs the action generator to perform the action specified by the rule (block 1830). The action generator may then generate a sequence of instructions that, when executed, carry out the action specified by the rule (block 1832). The action generator may then initiate the execution of the instruction sequence in order to perform the action specified by the rule (block 1834).

It will be appreciated that the steps set forth above generally set forth an example of how the orchestration framework may apply a rule. The various steps set forth above may be performed to carry out different types of rules that may be defined by a user or automatically defined by the orchestration framework in response to observed behaviors. A specific use case of how a rule may be applied is shown in FIG. 19.

Figure 19:
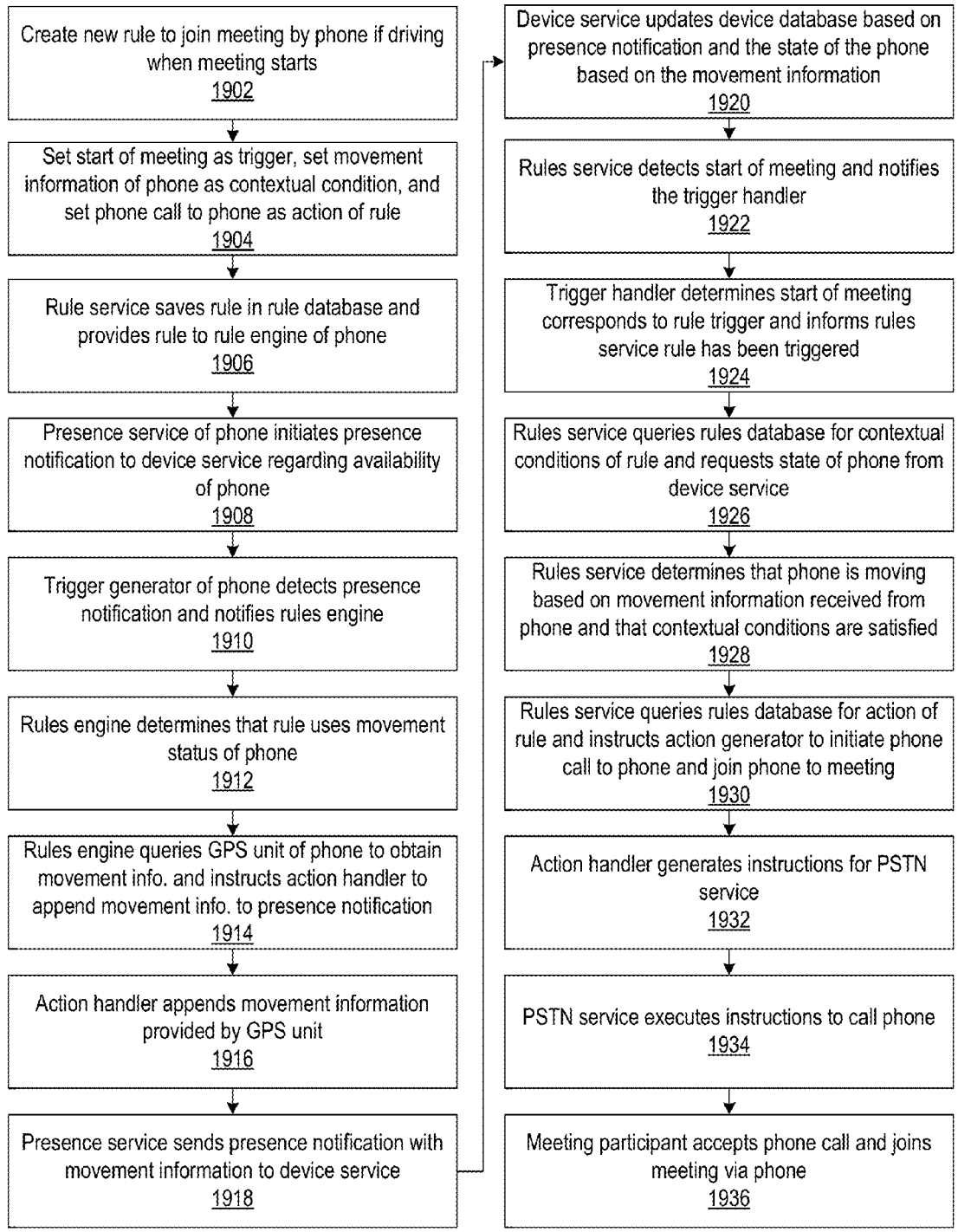
FIG. 19 is a flowchart of example method steps for applying a rule that forwards an online meeting to the phone of a meeting participant.

In FIG. 19, a flowchart 1900 of example method steps for applying a rule that forwards an online meeting to the phone of a meeting participant is shown. As seen in FIG. 19, a user may create a rule to join an online meeting by phone if the meeting starts while the user is driving (block 1902). The user may specify the start of an online meeting as the trigger of the rule, may specify movement of the phone above 5 miles per hour (mph) as a contextual condition for the rule, and specify initiation of a phone call to the phone of the user as the action for the rule (block 1904). The rules service may save the rule to the rules database and provide the rule to the rules engine of the phone (block 1906). Subsequently while the user is driving, the presence service of the phone may initiate a presence notification to the device service in order to indicate the availability of the phone (block 1908). The trigger generator of the phone may detect the presence notification and notify the rules engine (1910). The rules engine may determine that the rule stored at the phone uses the movement status of the phone (block 1912). The rules engine may thus query the GPS unit of the phone for movement information and instruct the action handler to append movement information received from the GPS unit to the presence notification (block 1914). The action handler may append movement information received from the GPS unit to the presence notification (block 1916) in response. The presence service may send the presence notification that includes the movement information to the device service (block 1918).

The device service may update the device database based on the presence notification and update the state of the phone based on the movement information in the presence notification (block 1920). Subsequently, the rules service may detect the start of an online meeting and notifies the trigger handler (block 1922). The trigger handler may determine that the start of an online meeting corresponds to a rule trigger and inform the rules service that a rule has been triggered (block 1924). The rules service may query the rules database for contextual conditions specified for the rule and requests the state of the phone from the device service (block 1926). The rules service may determine that the phone is moving based on the state of the phone received from the device service and that the contextual conditions of the rule are satisfied (block 1928). In response, the rules service may query the rules database for the actions of the rule and instruct the action generator to initiate a phone call to the phone of the user in order to allow the user to join the online meeting via the phone (block 1930). The action handler may generate instructions for the PTSN service (block 1932), and the PTSN service may execute the instructions in order to initiate a phone call to the phone of the user (block 1934). The user may thus accept the phone call at the phone in order to join the meeting (block 1936). Steps similar to those described above may be performed to apply other types of rules and perform other types of actions.

Customizing Behavior of the Orchestration Framework

Aspects of the orchestration framework described in this section are directed towards distributing a computing activity across multiple interconnected devices and accessing content shared across interconnected devices.

Figure 20:
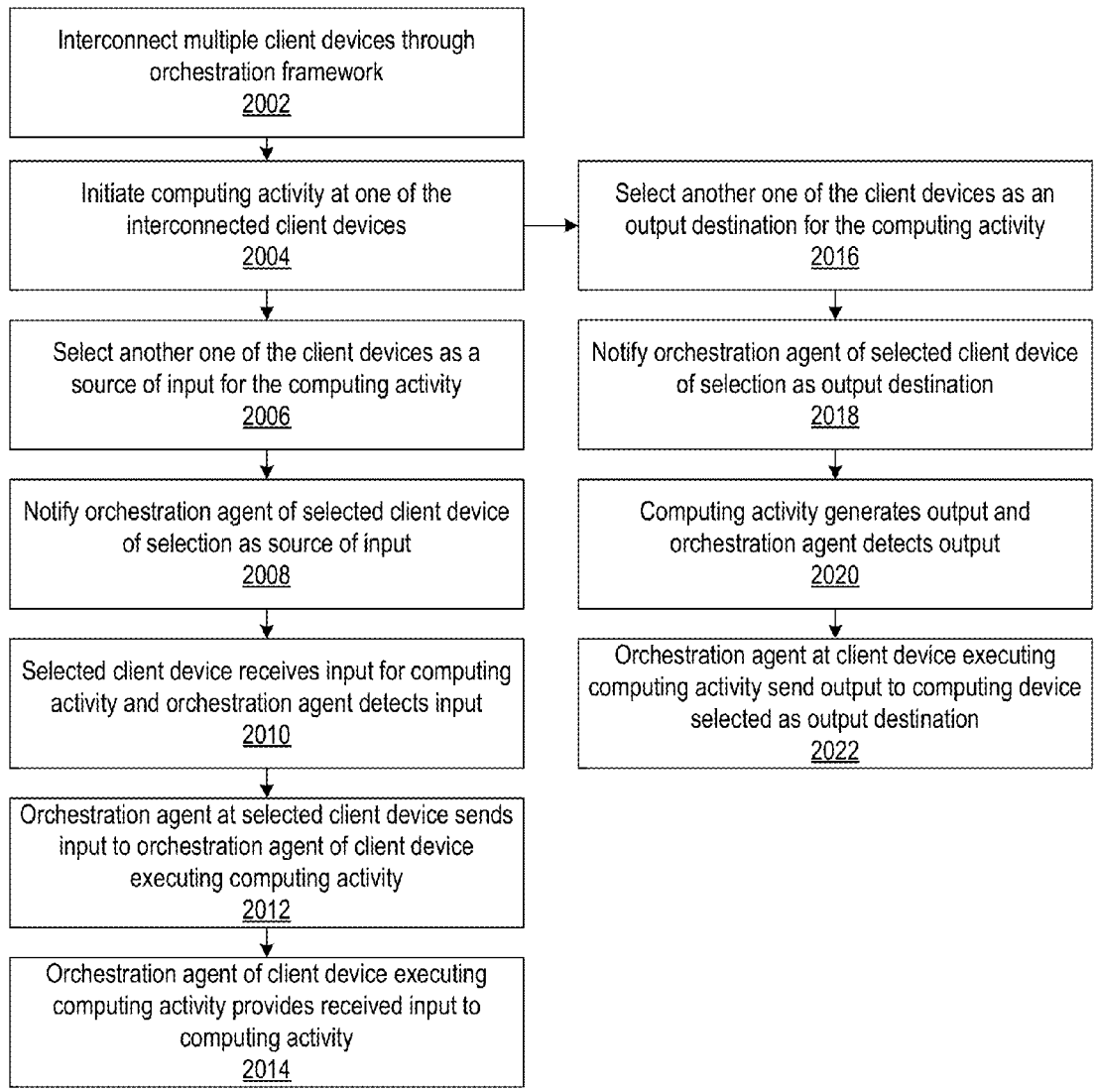
FIG. 20 is a flowchart of example method steps for distributing a computing activity across multiple interconnected devices.

In FIG. 20, a flowchart 2000 of example method steps for distributing a computing activity across multiple interconnected devices is shown. As seen in FIG. 20, multiple client devices may be interconnected though an orchestration framework (block 2002), and a computing activity may be initiated at one of the interconnected client devices (block 2004). Another one of the client devices may be selected as a source of input for the computing activity (block 2006), and the orchestration agent of the selected client device may receive notification of its selection as a source of input for the computing activity (block 2008). When the selected client device subsequently receives input, the orchestration agent of the selected computing device may detect the input (block 2010). The orchestration agent at the selected computing device may thus send the input received to the orchestration agent of the computing device executing the computing activity (block 2012). The orchestration of the computing device executing the computing activity may receive the input and provide the input to the computing activity (block 2014). The computing activity may thus respond as if the input had been received directly at the device executing the computing activity. Additionally, multiple interconnected client devices may be selected as sources of input for a computing activity executing at another client device. The client devices selected as sources of input for a computing activity may be selected manually or automatically, e.g., in response to interconnecting the client devices. Furthermore, client devices may be selected as sources of input based on the capabilities of the respective client devices, e.g., the types of input the client devices are capable of receiving.

Another one of the interconnected client devices may be selected as an output destination for output generated by the computing activity (block 2016). The orchestration agent at the client device may likewise be notified of its selection as an output destination for the computing activity (block 2018). The orchestration agent of the client device executing the computing activity may detect output generated by the computing activity (block 2020), and send the output to the orchestration agent of the client device selected as an output destination (block 2022). Similar to input received from the computing activity, the client device selected as an output destination may present the output as if the computing activity were executing at the selected client device. In addition, multiple interconnected client devices may be selected as output destinations for a computing activity executing at another client device. The client devices selected as output destinations for a computing activity may likewise be selected manually or automatically, e.g., in response to interconnecting the client devices. Moreover, client devices may be selected as output destinations based on the capabilities of the respective client devices, e.g., the types of output the client devices are capable of presenting.

Various steps described above may be performed in implementations where interconnected devices are coordinated through the orchestration server and communicate with the orchestration server via client server-communication sessions. Various steps described above may also be performed in implementations where interconnected devices are coordinated through their respective orchestration agents in a peer-to-peer communication session as described above. Additionally, client devices may be selected to provide certain types of input (e.g., audible, visual, textual) to a computing device executing at another client, and client devices may be selected to provide certain types of output (e.g., audible, visual) received from another computing device executing a computing activity.

The following example use cases illustrate how computing activities may be distributed across interconnected client devices. In one example, the orchestration framework may distribute operation of a word processing application (e.g., Microsoft Word) across multiple interconnected devices. In this example, a desktop computing device may initiate the word processing application and request that a television display device present the output from the application, e.g., a document being edited. The orchestration framework may distribute the application across other interconnected computing devices such that input for the word processing application may be received from the other computing devices interconnected with the desktop application. For example, a user at a laptop device may provide input at the laptop keyboard in order to edit the document, and another user at a tablet device may provide input at the touchscreen keyboard in order to edit the document. In this way, a user may share a document with other devices while accessing the document at a first device.

In another example, interconnected devices may coordinate with each other if one of the devices does not have the hardware or software needed to carry out a computing activity. Online meetings are provided in this disclosure as one example in which computing devices may be interconnected via an orchestration framework that coordinates operation of a computing activity across the computing devices. In some situations, a user may only have access to a cellular telephone and a television display device when joining the meeting. In this example, the television display device may not have an audio input device, and the cellular telephone may not have an adequate video output device. Accordingly, the orchestration framework may coordinate the operation of the cellular telephone and the television display device to enable the user to join the online meeting. Respective orchestration agents at the cellular telephone device and the television display device may connect the devices via the orchestration framework. During the online meeting, the orchestration framework may thus cause video of the online meeting to be presented at the television display device and cause audio from the user to be received for the online meeting from the microphone of the cellular telephone device. Additional and alternative examples will be appreciated.

Figure 21:
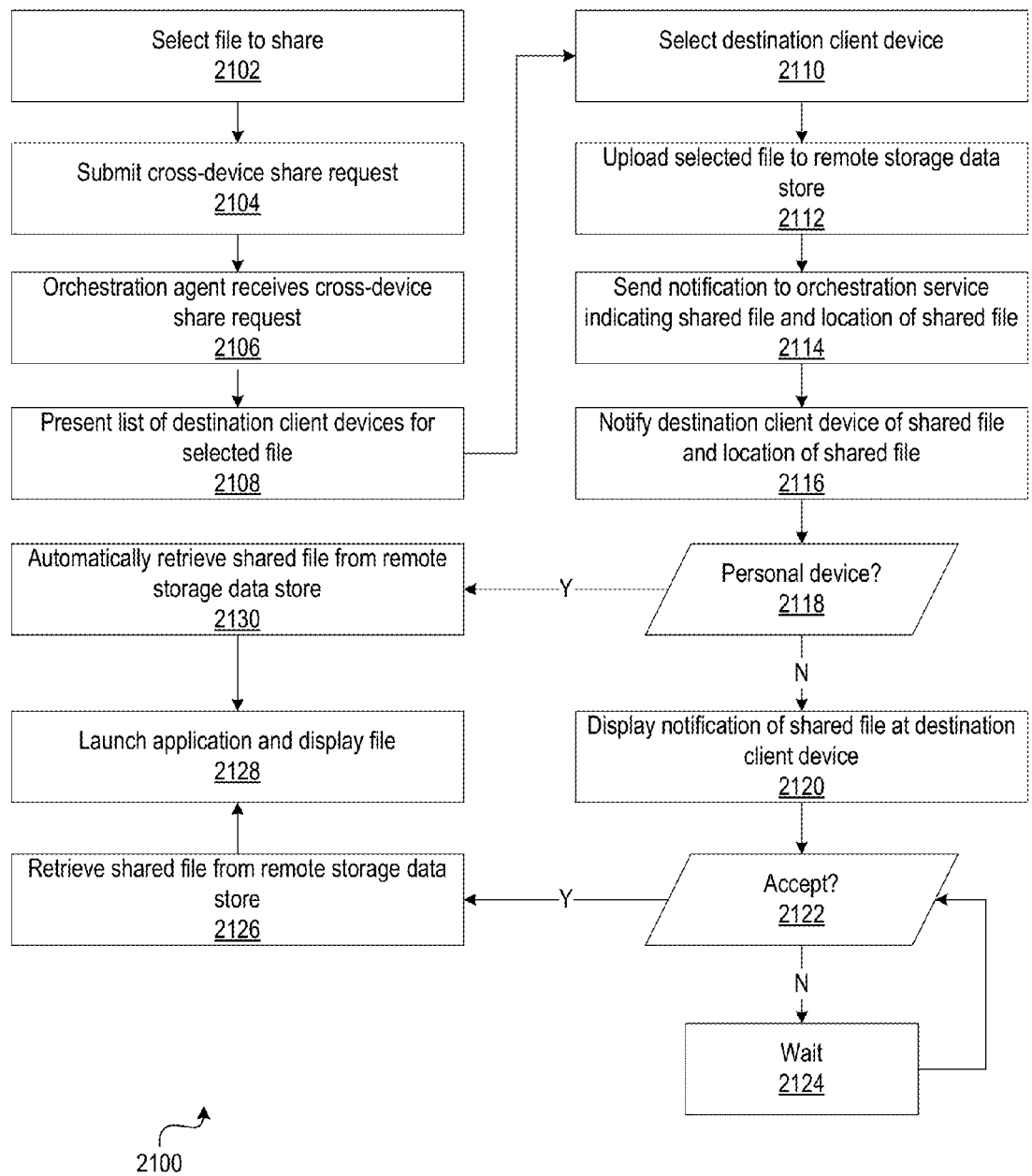
FIG. 21 is a flowchart of example method steps for sharing content across multiple interconnected devices.

In FIG. 21, a flowchart 2100 of example method steps for sharing content across multiple interconnected devices is shown. A user may operate a client device at which various files reside. The user may select one of the files to share with other devices interconnected with the device through the orchestration framework (block 2102). With the file selected, the user may submit a cross-device share request (block 2104). The user may submit the cross-device share request via, e.g., a keyboard shortcut, menu selection, and the like. The orchestration agent may receive the cross-device share request (block 2106), and present a list of destination client devices the user may share the selected file with (block 2108). The list of destination client devices may include line items corresponding to client devices associated with the user as well as line items corresponding to individuals. The user may select a personal device associated with that user or an individual to share the selected file with. The list of line items may include the devices associated with the listed individuals, and the user may select a particular client device of a particular individual to share the selected file with. If the user selects an individual rather than a client device, the orchestration service may automatically determine which client device of the selected individual to share the selected file with. It will be appreciated that the list of individuals may also include the user, and selection of the user may share the selected file with a different device associated with the user.

The determination of which device to share the selected file with may be based on user selection, user or device context, or defined rules. The user may manually select which device or individual to share the selected file with. Additionally or alternatively, the orchestration service may determine which devices are presently connected to the orchestration service, and automatically select one of those devices to receive the selected file. The orchestration service may also automatically select a device based on the type of file selected. As an example, the orchestration service may select an audio device to receive the selected file when the file is an audio file. As another example, the orchestration service may automatically select a television display device to receive the selected file when the file is a video file. The orchestration service may also employ one or more defined rules to determine which device should receive the selected file. Users may define the rules according to their preferences, and the rules may consider various characteristics of the users (e.g., user role, location), of the client devices (e.g., device type, device role), of the selected file, and combinations of such. This rule-based approach to file sharing may advantageously provide greater flexibility in customizing how the orchestration service automatically shares files across devices.

Moreover, the list of destination client devices may be context-sensitive such that the destination client devices included in the list depend on various factors. In one example implementation, the orchestration agent may dynamically filter the list of destination client devices based on the capabilities of the potential destination client devices. In this regard, the orchestration agent may be aware of the capabilities of the various devices. The device database may store capability information of client devices, which may be available to the orchestration agent. In turn, the orchestration agent may utilize the capability information when constructing the list of destination client devices. If a client device is not capable of opening the selected file, then the orchestration agent may exclude that client device from the list of destination client devices. In this way, the orchestration agent may tailor the list of destination client devices to include only those devices having the capability to open the selected file. The orchestration agent may tailor the list of destination client devices based on additional or alternative criteria. For example, individuals included in the list of destinations may be the attendees of an ongoing meeting that the user is attending or individuals assigned to the same user group of the user. It will be appreciated that the orchestration agent may employ combinations of criteria to construct the list of destination client devices or individuals.

Referring back to FIG. 21, the user may select from the list of destination client devices a client device to share the selected file with (block 2110). Having selected the destination client device, the remote storage interface may upload the selected file to the remote storage data store (block 2112). The orchestration agent may then notify the orchestration service that the selected file is available at the remote storage data store (block 2114). The notification to the orchestration service may include information indicating the remote storage of the uploaded file, (e.g., a URL). The orchestration service may then notify the destination client device that the file is available at the remote storage data store (block 2116). The notification to the destination client device may likewise include the remote storage location of the uploaded file.

The orchestration agent at the destination client device may respond differently depending on whether the device is associated with the user (e.g., as a personal device) or associated with another individual. In particular, the orchestration agent may present an unobtrusive notification at a destination client device when another user shares a file. In this way, the orchestration agent may avoid interrupting users while engaging in other computing activities. As seen in FIG. 21, if the destination client device is not a personal device of the user that shared the file (block 2118:N), then an orchestration agent at the destination client device may display a notification that a new filed has been shared with the destination client device (block 2120). Upon receipt of the notification of the shared file, the orchestration agent at the destination client device may provide the recipient with the option to accept or reject the shared file. If the recipient does not accept the shared file (block 2122:N), then the orchestration agent at the destination client device may wait (block 2124) until the recipient accepts the shared file, e.g., by providing input requesting receipt of the shared file. When the recipient accepts the shared file (block 2122:Y), the orchestration agent at the destination client device may retrieve the file from the remote storage data store (block 2126). Accordingly, the remote storage interface at the destination client device may retrieve the file from the remote storage data store using the URL corresponding to the remote storage location of the uploaded file, and launch the appropriate application at the destination device to open the file (block 2128). The orchestration agent may use the application resolver to determine an application capable of opening the file and use the application launcher to launch that application as described above.

In some example implementations, the orchestration agent may be configured to automatically respond to a notification of a shared file. Accordingly, if the destination client device is a personal device of the user that shared the file (block 2118:Y), then the orchestration agent may instruct the remote storage interface to automatically retrieve the shared file from the remote storage data store (block 2130) upon receipt of the notification of the shared file. When the remote storage interface receives the shared file from the remote storage service, the orchestration agent may also initiate automatic determination and launch of the an application at the destination client device capable of opening the shared file.

It will be appreciated that the example approach described above provides a quick and efficient way to share, e.g., email attachments. Instead of forwarding or creating new emails to share email attachments, users may share email attachments using the cloud service which streamlines the sharing process. The example approach described above also provides a quick and efficient way to share online presentations or meetings with other devices or individuals. Instead of having users launch and log on to join an existing meeting, a user may share the meeting information and details with another individual using the cloud service, and that meeting may automatically launch at a device utilized by the individual. Similarly, the cloud service allows an attendee to transfer an ongoing meeting presented at one device to another device associated with the attendee. As an example, an individual may attended an online meeting using a desktop computing device. If the individual needs to leave the desktop device for any reason, the individual may use the cloud service to transfer the meeting to a mobile device such as a tablet computing device or mobile phone device. In this way, users are not tied to any particular device when attending an online meeting and may advantageously jump between devices while attending the meeting.

Figure 22:
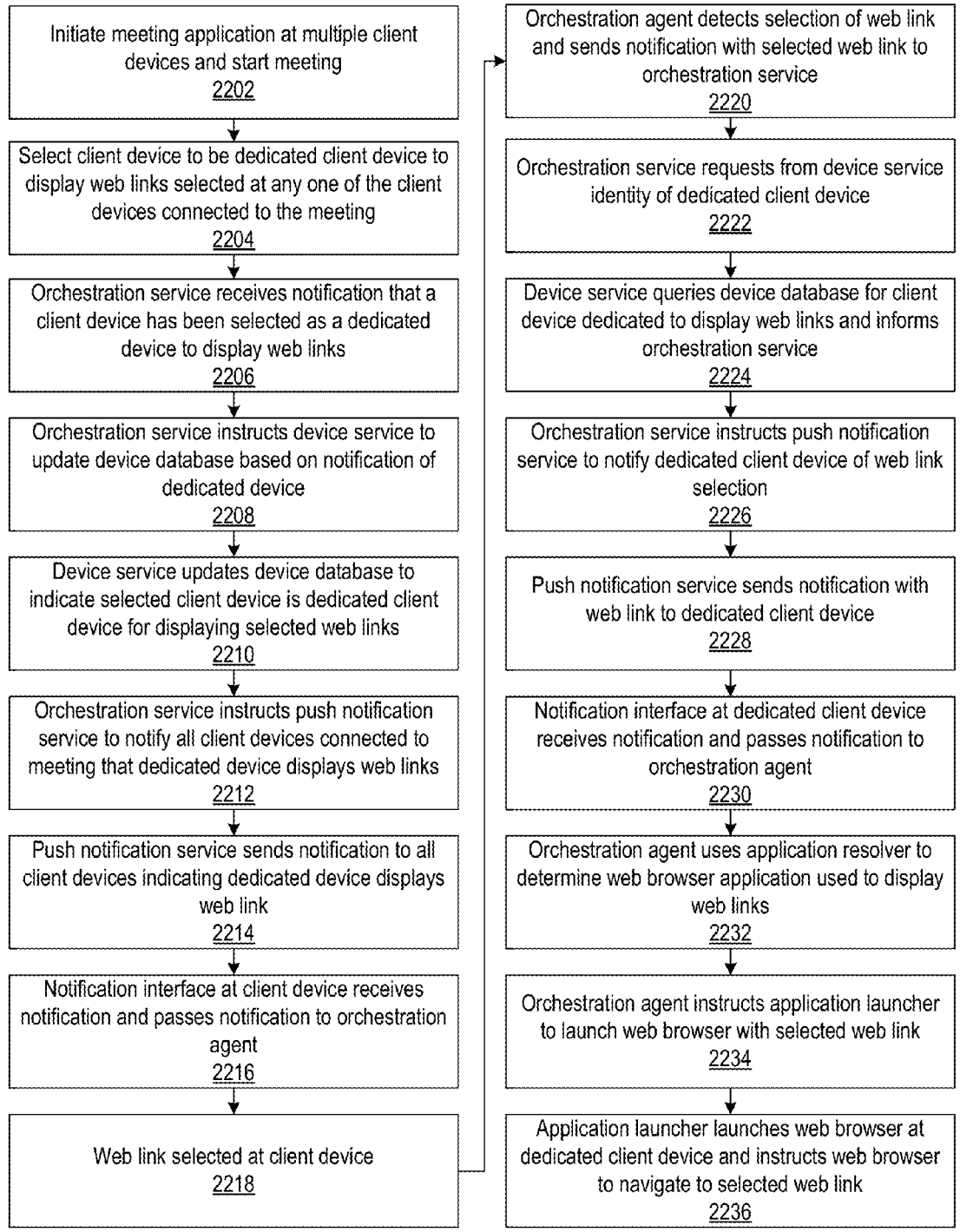
FIG. 22 is a flowchart of example method steps for dedicating a device to display web links.

In FIG. 22, a flowchart 2200 of example method steps for dedicating a device to display web links is shown. As seen in FIG. 22, meeting applications may be initiated at respective client devices when an online meeting starts (block 2202). One of the client devices associated with the meeting may be selected as a dedicated client device for displaying web links selected at any one of the client devices during the meeting (block 2204). The orchestration agent may notify the orchestration service that one of the client devices has been selected as a dedicated client device for displaying web links (block 2206), and the orchestration service may instruct the device service to update the device database based on the notification (block 2208). The device service may update the device database to indicate the client device has been selected as a dedicated client device for displaying web links (block 2210). The orchestration service may then instruct the push notification service to notify the other client devices connected to the meeting of the dedicated client device (block 2212), and the push notification service may send a notification to the other client devices indicating the dedicated client device for displaying web links (block 2214). The notification interfaces at the client devices may receive the notification and pass the notification to the respective orchestration agents (block 2216).

A web link may be subsequently selected at one of the client devices (block 2218). The orchestration agent at that client device may detect the web link selection and send a notification with the selected web link to the orchestration service (block 2220). The orchestration service may then request from the device service the identity of the dedicated client device (block 2222). The device service may query the device database for the identity of the dedicated client device and inform the orchestration service (block 2224). The orchestration service may then instruct the push notification service to notify the dedicated client device of the selected web link (block 2226), and the push notification service may send the dedicated client device a notification with the selected web link (block 2228). The notification interface at the dedicated client device may receive the notification with the selected web link and pass the notification to the orchestration agent (block 2230). The orchestration agent may use the application resolver to determine a web browser should be launched (block 2232) and may instruct the application launcher to launch the web browser with the web link indicated in the notification (block 2234). In response, the application launcher may launch the web browser and instruct the web browser to navigate to the selected web link (block 2236).

Various steps set forth above may also be performed to share web links selected during the meeting with other interconnected client devices that may not be dedicated client devices. Various steps described above may also be performed to share the current web browser session of one client device with another client device such that the other client device navigates to the web links of the web browser session. It will also be appreciated that various steps set forth above may be performed to dedicated other client devices to perform other activities during a meeting, e.g., a dedicated client device for playing streaming video shared during a meeting or streaming audio shared during a meeting. As an example, a large video display device may be dedicated to present streaming video shared from one of the devices during a meeting. As another example, an audio output device may be dedicated to present streaming audio shared from one of the devices during a meeting.

Figure 23:
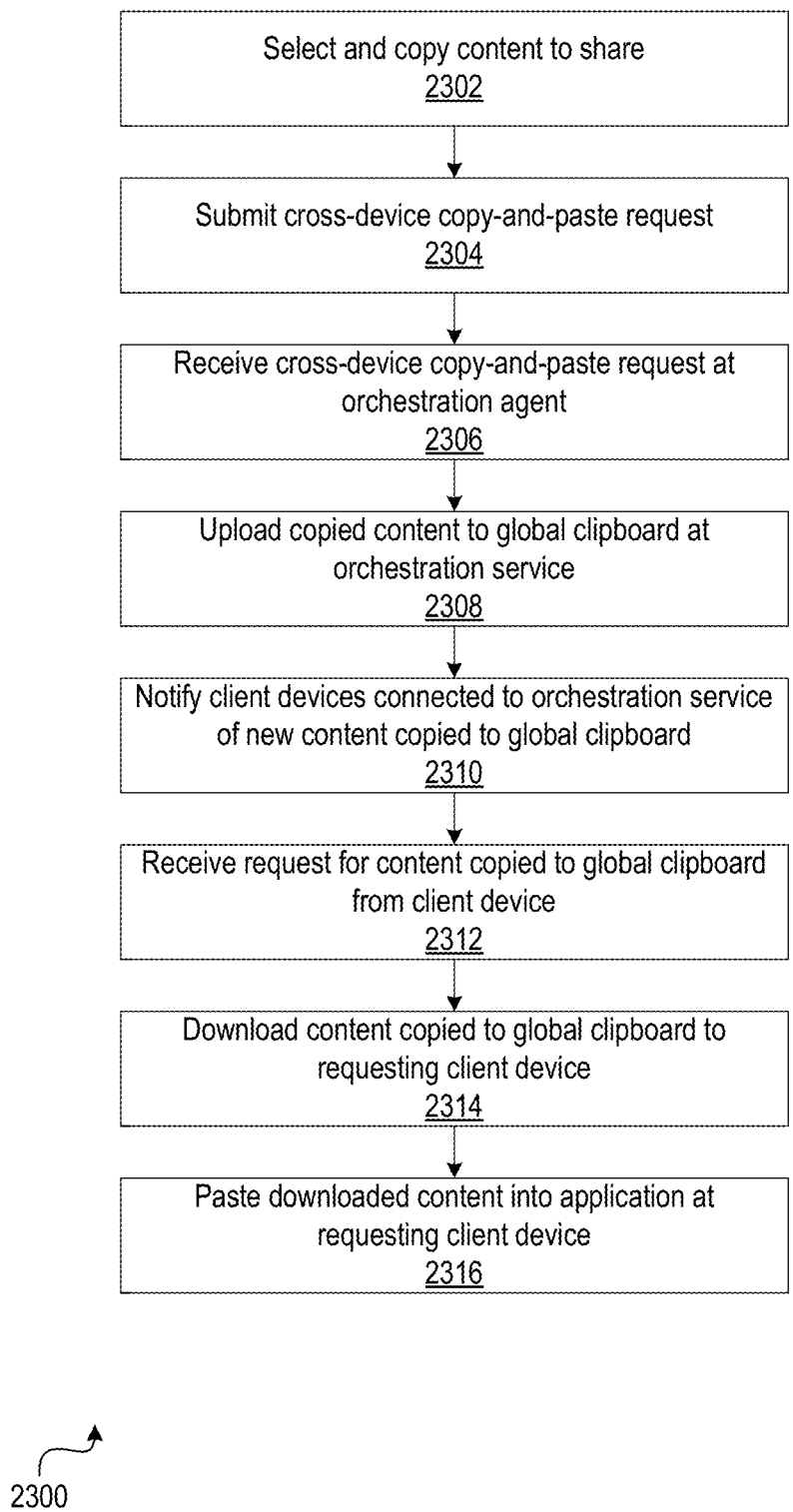
FIG. 23 is a flowchart of example method steps for performing a copy-and-paste command across multiple interconnected devices.

In FIG. 23, a flowchart 2300 of example method steps for performing a copy-and-paste command across multiple interconnected devices is shown. Stated generally, a user may select content at one client device and copy the content to a clipboard at the orchestration service from which other users may paste the content at their own client devices. A user may first select the content to share (block 2302), e.g., by highlighting text or otherwise selecting the content. The user may then submit a cross-device copy-and-paste request as described above (block 2304), and the orchestration agent may receive the cross device copy-and-paste request (block 2306). The orchestration agent may then upload the copied content to a global clipboard of the orchestration service (block 2308). The global clipboard corresponds to a storage location at the orchestration service accessible to at least some of the client devices connected to the orchestration service.

When a user copies content to the global clipboard, the orchestration service may instruct the push notification service to notify one or more of the devices connected to the orchestration service that new clipboard content is available, and the push notification service may send clipboard notifications to the client devices (block 2310). Users may utilize the orchestration agent to paste the content copied to the global clipboard at their respective client devices. The orchestration agent may transmit a request to the orchestration service for the content copied to the global clipboard. When the orchestration service receives the request (block 2312), the orchestration service may download the content copied to the global clipboard to the client device (block 2314). Having received the content copied to the global clipboard from the orchestration service, the user may paste the content into an application at the client device (block 2316).

As set forth above, a client device may not have the capability to open a file shared with that client device. For example, the application used to open the shared file may not be installed at the destination client device. Nevertheless, the orchestration service and orchestration agent may be configured handle situations where a destination client device does not have the capability to open a shared file. As described in more detail below, the orchestration service may automatically launch a virtual environment that has the capability to open the shared file, and the orchestration agent may launch a virtual client application to connect to the virtual environment when a destination client device is not capable of opening a shared file.

Figure 24:
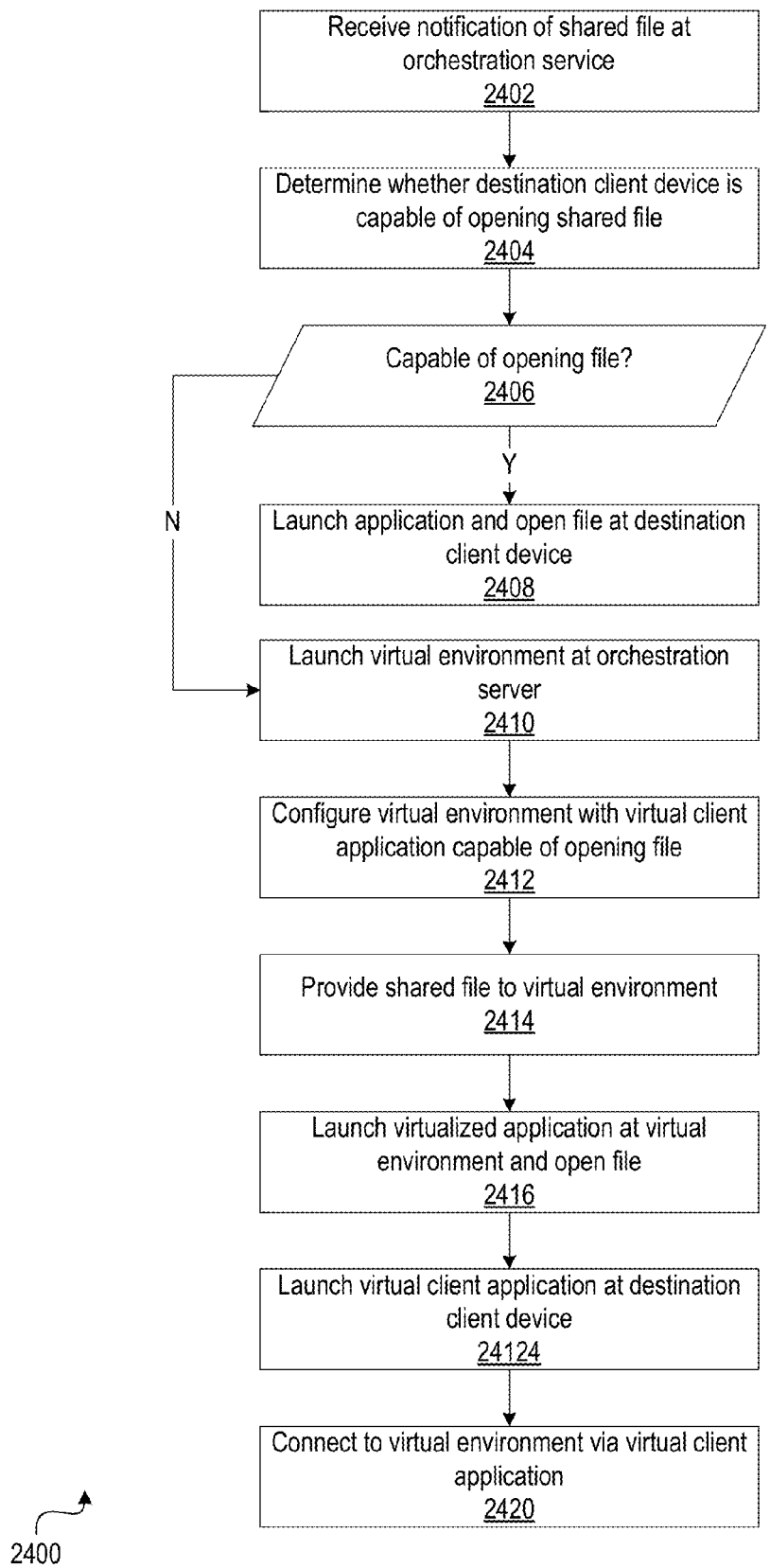
FIG. 24 is a flowchart of example method steps for opening content shared through the orchestration framework.

In FIG. 24, a flowchart 2400 of example method steps for opening content shared through the orchestration framework is shown. The orchestration service may receive notification of a shared file (block 2402) as discussed above. The orchestration service may then determine whether the destination client device is capable of opening the shared file (block 2404). As noted above, the device database may store device capability information and the orchestration service may thus be aware of the capabilities of the devices connected to the orchestration service. Devices may provide the orchestration service with their respective capability information during the negotiation process when connecting to the orchestration service. For example, a client device may inform the orchestration service of the native applications available at the client device, and the device database may store a list of the native applications available at the client device. In this way, the orchestration service may be able to determine whether a client device is capable of opening a shared file (e.g., whether the client device has a native application that is capable of opening the shared file). If the destination device is capable of opening the shared file (block 2406:Y), then the orchestration agent may use the application resolver to determine which application at the client device is capable opening the file and may use the application launcher to launch that application and open the shared file (block 2408). The application launcher may launch the application automatically or in response to receipt of input accepting the shared file as discussed above.

If the destination client device is not capable of opening the shared file (block 2406:N), then the orchestration service may launch a virtual environment in which the shared file may be opened (block 2410). The orchestration service itself may launch and maintain the virtual environment locally or, additionally or alternatively, a virtualization server that is located remotely relative to the orchestration service may launch and maintain the virtual environment. The virtual environment may be configured to include a virtualized application capable of opening the shared file (block 2412). The orchestration service may also provide the shared file to the virtual environment (block 2414) or otherwise make the shared file available to the virtual environment. As an example, the orchestration service may provide the virtual environment with the location of the shared file at the remote storage data store, and a remote storage interface at the virtual environment may retrieve the file from the remote storage data store. In this regard, the virtual environment may also be considered as a destination for the shared file.

Once the virtual environment obtains the shared file, the virtual environment may launch the virtualized application to open the shared file (block 2416). The orchestration agent at the destination client device may launch a virtual client application (block 2418), and the virtual client application may connect to the virtual environment (block 2420). In this way, users may advantageously share files across client devices that may not be equipped to open those files. A more particular example may include a 3D formatted computer file that can only be opened using 3D modeling software. A mobile phone may not be equipped with the necessary software to open the 3D file. Using the orchestration service and the virtualization approach described above, a virtual environment may launch a virtualized instance of the 3D modeling software, and the virtual client application at the mobile phone may connect to the virtual environment to access 3D files shared with the mobile phone device. Other practical uses will be appreciated with the benefit of this disclosure.

Figure 25:
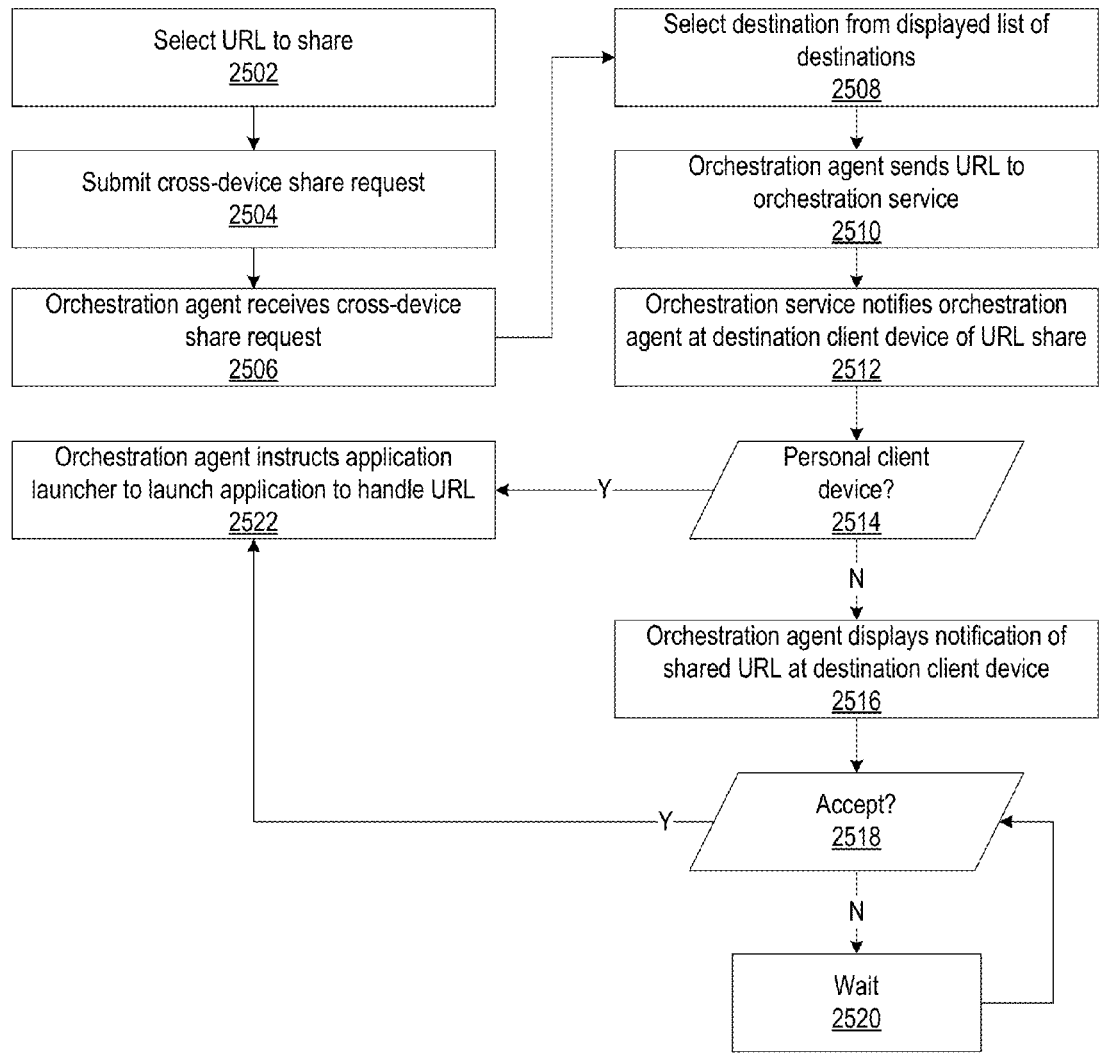
FIG. 25 is a flowchart of example method steps for sharing URLs across devices.

In addition to dedicating a device to display selected web links, users may share various types of links, e.g., URLs (uniform resource locators), across interconnected devices as well. Users may share any type of URL, e.g., http://, https://, tel://, citrixreceiver://, and other links having a URL format. FIG. 25 is a flowchart of example method steps for sharing URLs across interconnected devices. Similar to selecting a file to share, a user may select a URL to share (block 2502), e.g., by highlighting the URL. The user may then submit a cross-device share request as described above (block 2504) and the orchestration agent may receive the cross-device share request (block 2506). The user may select a destination client device from a list of destinations as also described above (block 2508), e.g., a particular client device or an individual. With the destination selected, the orchestration agent may send the URL to the orchestration service (block 2510). The orchestration service may similarly notify the destination client device of the shared URL (block 2512). The notification may include the shared URL. The orchestration agent may also send the URL directly to the orchestration agent at the destination client device when the client devices are interconnected in a peer-to-peer fashion.

As with sharing files, the orchestration agent at the destination client device may respond differently depending on whether the destination client device is associated with the user that shared the URL or another individual. As noted above, if the destination client device is not a personal device of the user that shared the URL (block 2514:N), then the orchestration agent may display a notification indicating the shared URL (block 2516) so as to avoid any interruptions of other computing activities occurring at the destination client device. If the individual does not accept the shared URL (block 2518:N), then the orchestration agent client may wait (block 2520) until input is received indicating acceptance of the shared URL. When the recipient accepts the shared URL (block 2518:Y), the orchestration agent may use the application resolver to determine which application should be launched to handle the shared URL and use the application launcher to launch the application at the destination client device and follow the shared URL (block 2522). If the user shares the URL another personal device (block 2514:Y), then the orchestration agent at the destination client device may automatically initiate launching of the application that handles the URL and automatically handle or follow the shared URL (block 2522).

The orchestration service may be configured to share URLs in a context-sensitive manner. In particular, the orchestration service may recognize URLs for different types of online resources, e.g., a text-based webpage and a video sharing webpage. Accordingly, the orchestration service may automatically select a destination client device based on the URL type. As an example, the orchestration service may recognize that the URL addresses a video sharing website and, in response, select a large display device to share the URL with. In this way, the orchestration service may advantageously share the URL with the client device suitable for presenting the content addressed by the URL. As another example, the orchestration service may recognize that the URL addresses a text-based website and, in response, select a tablet device or desktop device to share the URL with. The orchestration service may also employ rule sets to determine which client device to share the URL with. For example, a URL sharing rule set may list various websites and the devices or types of client devices the orchestration service should select when sharing URLs associated with those websites. Users may configure the rule sets according to their preferences in order to customize the behavior of the orchestration service when sharing URLs. The rule sets may be associated with individual users for use when those users share the URL, and additionally or alternatively, the orchestration service may maintain a global rule set applicable to all users.

Creating And Accessing Activities for Micro Work

Aspects of the orchestration framework described in this section are directed towards creating activities and accessing those activities via the orchestration framework. Such activities may be created, e.g., for performing micro work at various client devices.

Figure 26:
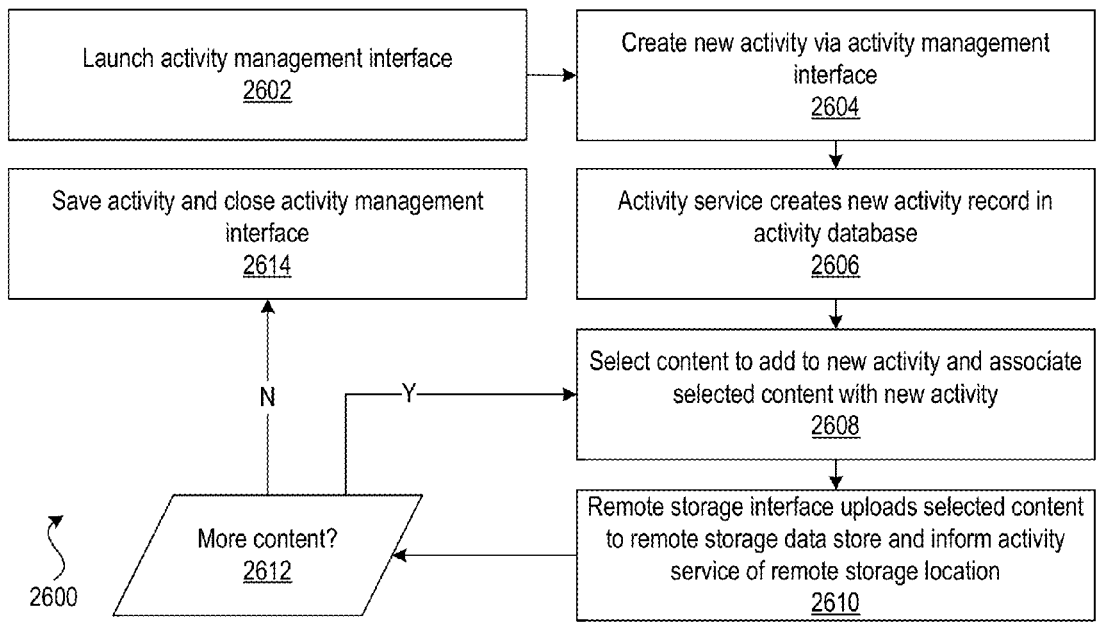
FIG. 26 is a flowchart of example method steps for creating activities via an orchestration framework.

FIG. 26 is a flowchart 2600 of example method steps for creating activities via an orchestration framework. A user may launch or access the activity management interface provided by the orchestration framework (block 2602), and create a new activity (block 2604). The activity service may store save the new activity in the activity database as a new activity record (block 2606). The user may then select content to associate with the activity and the activity service may update the activity database to indicate that the selected content is associated with the activity (block 2608). Content that may be selected to associate with the activity may include, for example, files (e.g., documents, audio files, video files), computing resources (applications, services), web links, and other types of content that will be appreciated with the benefit of this disclosure. The remote storage interface may then upload selected content to the remote storage data store and inform the activity service of the remote storage location of the (block 2610) such that the activity service may indicate the remote storage location in the activity database. The user may continue to content to associate with the activity (block 2612:Y). Once the user is finished selecting content for the activity (block 2614:N), the user may save the activity to the activity database and close the activity management interface (block 2616).

Figure 27:
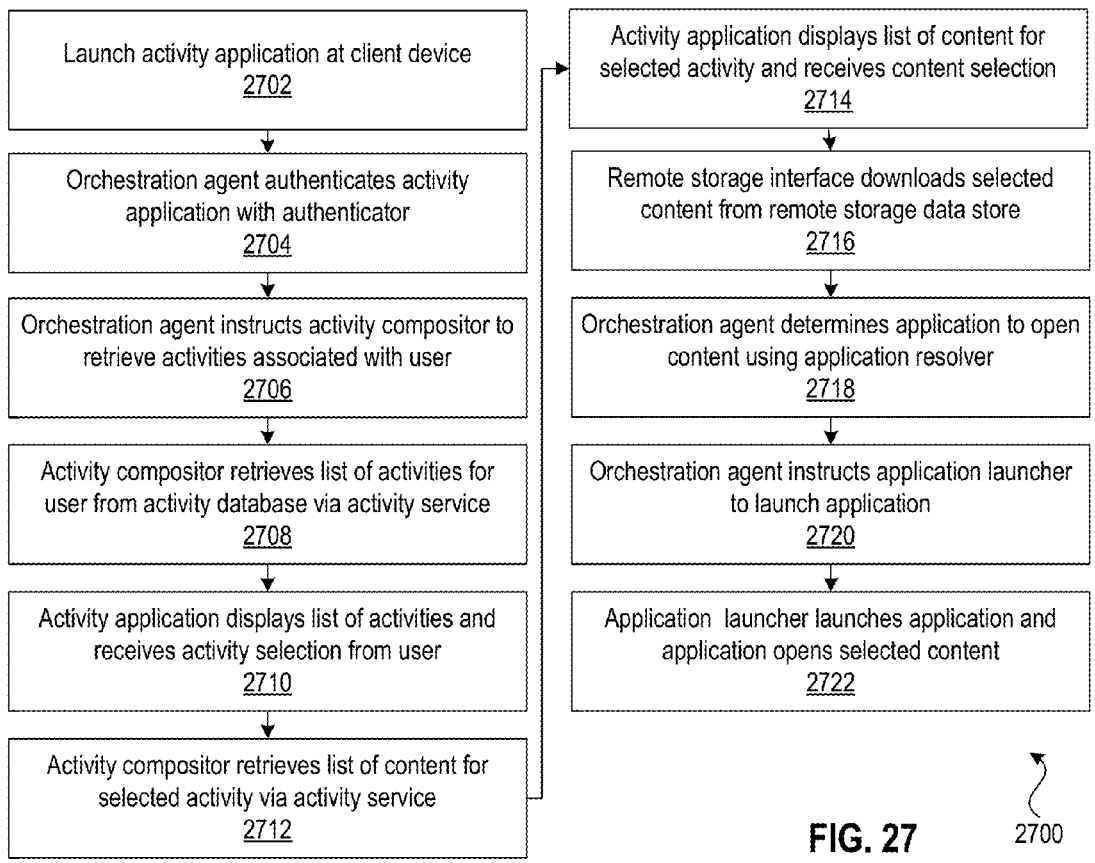
FIG. 27 is a flowchart of example method steps for accessing an activity via the orchestration framework

FIG. 27 is a flowchart 2700 of example method steps for accessing an activity via the orchestration framework. As seen in FIG. 27, a user may launch an activity application (e.g., a micro work application) at a client device (block 2702). The orchestration agent may detect launch of the activity application and may use the authenticator authenticate the activity application (block 2704) as described above. The orchestration agent may instruct the activity compositor to retrieve activities created by or otherwise associated with the user (block 2706). The activity compositor may retrieve the activities for a user from the activity database via the activity service (block 2708). The activity application may display a list of the activities at the client device and receive from the user a selection of one of the activities (block 2710). The activity compositor may retrieve a list of the content associated with the selected activity via the activity service (block 2712). The activity application may display a list of the content items associated with the selected activity and receive from the user a selection of one of the content items (block 2714). The remote storage interface may download the selected content item from the remote storage data store to the client device (2616). The orchestration agent may use the application resolver to determine an application capable of opening the selected content item (block 2718) and instruct the application launcher to launch that application (block 2720) as described above. The application launch may thus launch the application and open the selected content item for presentation to the user (block 2722). It will be appreciated that various steps set forth above may be employed not only for micro work but also more complex type of work. Accordingly, various steps set forth above may also be employed to perform deferred work.

The following use-case scenario describes an example flow of execution outlining how a user consults hotel information related to an upcoming trip, e.g., to Sydney, Australia. Using the activity management interface, the user creates an activity for a trip to Sydney. In this activity, the user adds a presentation, travel documentation, and an expense reporting application. The creation of the activity in the activity management interface causes the activity service to create the new activity in the activity database, and causes the remote storage interface to upload the presentation and travel documentation into the remote storage data store.

While waiting at an airport lounge, the user starts the activity application on a tablet computing device. The orchestration agent on the tablet uses the authenticator to authenticate with the orchestration service, and then instructs the activity compositor to retrieve the activities for the user. The activity compositor then displays the content associated with the activity related to the trip. The user selects the document containing the hotel information, which may be a PDF document. The orchestration agent receives the request to view the PDF document and uses the application resolver to determine how to handle the PDF document. The application resolver determines that the resource being asked for is a PDF document, and that it needs to be viewed using a PDF application. The decision about how to handle PDF documents may be based on information received from the activity database or the device service, which determines how particular types of content are handled on particular client devices. This information is then passed back to the orchestration agent, which determines, based on the results from the application resolver, that the PDF document should be launched using a local PDF viewer. The orchestration agent instructs the remote storage interface to retrieve the PDF document from the remote storage data store and bring it to the local device. Once the document has been retrieved, the orchestration agent instructs the application launcher to launch the local PDF viewer and open the document. The application launches and opens the document, and the user gets the needed information, e.g., the hotel rate information. The user copies the information to the clipboard and closes the PDF. The user is then brought back to the activity view shown of the activity application. Next, the user selects expense reporting application resource listed for the activity. The orchestration agent receives the request to launch the expense reporting application and uses the application resolver to determine how to handle the expense reporting application. The application resolver determines that the expense reporting application has a web interface, and determines that it should be launched via a local web browser. The orchestration agent determines, based on the results from the application resolver, that the expense reporting application should be launched at a web browser. The orchestration agent instructs the application launcher to launch the expense reporting application at a web browser, and the user can enter the hotel information previously retrieved from the PDF document.

Aspects of the activity application overcome the difficulties involved in aggregating information and applications required to complete particular activities. Through the use of an activity-oriented interface, users may establish work contexts quickly, instead of navigating through many disparate frameworks to perform the activity. In the use-case scenario above, all of the content related to a personal concept—travelling to Sydney for business—are aggregated together by the activity application and activity service and made available at a single location. The activity of filing expense reports while sitting in an airport lounge, this is thus performed at a single interface provided by the activity application, which advantageously allows the user to perform the activity quickly.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described and/or illustrated herein may be performed in other than the recited order, and that one or more steps illustrated may be optional in accordance with aspects of the disclosure. Modifications may be made, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the aspects described herein.

What is claimed is:

1. A method comprising:
providing an orchestration framework that interconnects a plurality of devices such that the plurality of devices are available to share content and computing activities, wherein the orchestration framework coordinates interactions between the plurality of devices when the plurality of devices are interconnected through the orchestration framework;
interconnecting the plurality of devices using the orchestration framework;
receiving, from one of the plurality of devices, a request to share a file having a file type; and
managing, using the orchestration framework, sharing of the file with the plurality of devices, wherein the managing comprises:
determining, based on the file type, which of the plurality of devices include a native application capable of opening the file and which of the plurality of devices do not include a native application capable of opening the file,
sending, to at least one of the plurality of devices having a native application capable of opening the file, a first notification comprising an indication of a location at which the file is stored,
establishing a virtual environment comprising a virtualized application capable of opening the file,
opening the file with the virtualized application, and
sending, to at least one of the plurality of devices lacking a native application capable of opening the file, a second notification that, when received, launches a virtual client application that connects to the virtual environment such that the file is accessible at the virtualized application via the virtual client application.

2. The method of claim 1 further comprising:
receiving, from one of the plurality of devices, a second request to share content with a specified device of the plurality of devices; and
sending a notification only to the specified device using the orchestration framework wherein the notification indicates that the content has been shared with the specified device.

3. The method of claim 1 further comprising:
selecting one of the plurality of devices as a dedicated device to receive content having a user-selected content type;
receiving, from one of the plurality of devices, a second request to share content having the user-selected content type; and
sending a notification to only the dedicated device using the orchestration framework wherein the notification indicates that the content has been shared.

4. The method of claim 1 further comprising:
receiving, from one of the plurality of devices, a second request to share a link with one or more of the plurality of devices;
sending a notification comprising the link to at least one device of the plurality of devices using the orchestration framework; and
wherein receipt of the notification at the at least one device causes the at least one device to provide the link to an application capable of handling the link.

5. The method of claim 4 wherein:
the link is a web link for a web site; and
the application capable of handling the link is a web browser.

6. The method of claim 1 further comprising:
receiving, from one of the plurality of devices, a second request comprising content to be shared with one or more of the plurality of devices;

storing the content to be shared at a clipboard that is accessible to multiple devices of the plurality of devices; and sending a notification indicating the content to be shared is available at the clipboard to at least one of the plurality of devices using the orchestration framework.

7. The method of claim 6 further comprising:

receiving a paste request from a device of the plurality of devices; and providing, to the device that provided the paste request, the content stored at the clipboard.

8. The method of claim 1 further comprising:

storing a rule that specifies which of the plurality of devices should receive content shared by one or more of the plurality of devices; and receiving, from one of the plurality of devices, a second request to share selected content; and sending, using the orchestration framework, a notification to only the devices of the plurality of devices that are specified in the rule wherein the notification indicates the selected content has been shared.

9. Non-transitory computer-readable media storing instructions that, when executed by at least one processor of a client device, cause the client device to:

connect to a plurality of devices using an orchestration agent of an orchestration framework wherein the orchestration framework coordinates interactions between the client device and the plurality of devices interconnected with the client device through the orchestration framework;

receive a selection of a file to share with the plurality of devices, the file having a file type;

submit, to an orchestration service of the orchestration framework using the orchestration agent, a request to share the file; and wherein receipt of the request at the orchestration service causes the orchestration service to manage sharing of the file with the plurality of devices wherein, to manage the sharing, the orchestration service:

determines, based on the file type, which of the plurality of devices include a native application capable of opening the file and which of the plurality of devices do not include a native application capable of opening the file, sends, to at least one of the plurality of devices having a native application capable of opening the file, a first notification comprising an indication of a location at which the file is stored, establishes a virtual environment comprising a virtualized application capable of opening the file, opens the file with the virtualized application, and sends, to at least one of the plurality of devices lacking a native application capable of opening the file, a second notification that, when received, launches a virtual client application that connects to the virtual environment such that the file is accessible at the virtualized application via the virtual client application.

10. The non-transitory computer-readable media of claim 9 wherein the instructions, when executed, further cause the client device to:

display, using the orchestration agent, a list of devices indicating which of the plurality of devices that are available for selection as a selected device to receive the file; and wherein the request to share the file specifies the selected device.

11. The non-transitory computer-readable media of claim 10 wherein the list of devices indicates at least one of:

one or more devices associated with an online meeting a user of the client device is participating in;

one or more personal devices associated with the user of the client device;

one or more devices associated with a user group the user of the client device is associated with;

one or more devices physically located near each other in the same physical space; and combinations thereof.

12. The non-transitory computer-readable media of claim 9 wherein the instructions, when executed, further cause the client device to:

upload the file to the location at a data store using a remote storage interface of the orchestration framework.

13. The non-transitory computer-readable media of claim 12 wherein the instructions, when executed, further cause the client device to:

receive a share notification at the orchestration agent, the share notification indicating a shared file is available at the data store;

retrieve the shared file from the data store using the remote storage interface;

identify an application capable of opening the shared file using an application resolver of the orchestration framework;

launch the application capable of opening the shared file using an application launcher of the orchestration framework; and open the shared file using the application.

14. The non-transitory computer-readable media of claim 9 wherein the instructions, when executed, further cause the client device to:

submit, to the orchestration service using the orchestration agent, a second request comprising content associated with a copy command at the client device;

wherein receipt of the second request at the orchestration service causes the orchestration service to store the content at a clipboard that is accessible to multiple devices of the plurality of devices and causes the orchestration service to send a notification indicating the content is available at the clipboard to at least one of the plurality of devices.

15. The non-transitory computer-readable media of claim 14 wherein the instructions, when executed, further cause the client device to:

receive a share notification that content is available at the clipboard;

receive a paste command at the client device;

submit, to the orchestration service using the orchestration agent, a request for the content stored at the clipboard;

receive the content stored at the clipboard in response to receipt of the request at the orchestration service; and paste the shared content into an application at the client device.

16. The non-transitory computer-readable media of claim 9 wherein the instructions, when executed, further cause the client device to:

submit, to the orchestration service using the orchestration agent, a second request to share a link with the plurality of devices;

wherein receipt of the second request at the orchestration service causes the orchestration service to send a notification that includes the link to at least one of the plurality of devices.

17. The non-transitory computer-readable media of claim 9 wherein the instructions, when executed, further cause the client device to:
- receive a share notification at the orchestration agent, the share notification indicating a shared link;
- identify an application capable of handling the shared link using an application resolver of the orchestration framework;
- launch the application capable of handling the shared link using an application launcher of the orchestration framework; and
- handle the link using the application.

18. The non-transitory computer-readable media of claim 9 wherein the instructions, when executed, further cause the client device to:
- display, using the orchestration agent, a list of users indicating one or more users available for selection as a selected user to receive the file; and
- wherein the request to share the file specifies the selected user.

19. The non-transitory computer-readable media of claim 18 wherein the list of users indicates at least one of:
- one or more users associated with a user group of the user of the client device;
- one or more users associated with an online meeting the user of the client device is participating in;
- one or more users physically located near the user of the client device in the same physical space; and
- combinations thereof.

20. The non-transitory computer-readable media of claim 9 wherein the instructions, when executed, further cause the client device to:
- display, using the orchestration agent, a list of user groups indicating one or more user groups available for selection as a selected user group to receive the file; and
- wherein the request to share the file specifies the selected user group.

21. The non-transitory computer-readable media of claim 20 wherein the list of user groups indicates at least one of:
- one or more user groups derived from calendar information provided by a scheduling service wherein the calendar information indicates one or more online meetings scheduled for the user;
- a user group having one or more users associated with an online meeting the user is currently participating in;
- a user group having one or more users physically located near the user of the client device in the same physical space; and
- combinations thereof.

22. The non-transitory computer-readable media of claim 9 wherein the instructions, when executed, further cause the client device to:
- launch an online meeting application using an application launcher of the orchestration framework and join the online meeting using the meeting application;
- interconnect with a set of devices associated with the online meeting through the orchestration framework;
- share content with one or more of the devices associated with the online meeting using the orchestration framework during the online meeting; and
- receive shared content from one or more of the devices associated with the online meeting using the orchestration framework during the online meeting.

23. A system comprising:
- an orchestration server interconnecting a plurality of client devices using an orchestration framework such that the plurality of client devices are available to share content and computing activities with each other, wherein the orchestration framework comprises a set of server-side orchestration components and a set of client-side orchestration components that coordinate interactions between the plurality of client devices, and wherein the set of server-side orchestration components comprise instructions that, when executed by at least one processor of the orchestration server, cause the orchestration server to:
  - receive, from one of the plurality of client devices, a request to share a file having a file type, and
  - determine, based on the file type, which of the plurality of client devices include a native application capable of opening the file and which of the plurality of client devices do not include a native application capable of opening the file,
  - send, to at least one of the plurality of client devices having a native application capable of opening the file, a first notification comprising an indication of a location at which the file is stored,
  - establish a virtual environment comprising a virtualized application capable of opening the file,
  - open the file with the virtualized application, and
  - send, to at least one of the plurality of client devices lacking a native application capable of opening the file, a second notification that, when received, launches a virtual client application that connects to the virtual environment such that the file is accessible at the virtualized application via the virtual client application.

24. The system of claim 23, wherein:
- the set of server-side orchestration components comprise an orchestration service and a notification service, wherein the notification service comprises instructions that, when executed, cause the orchestration server to send respective notifications to one or more of the plurality of client devices based on operation of the orchestration service; and
- the set of client-side orchestration components comprise, for each client device of the plurality of client devices, an orchestration agent and a notification interface, wherein the notification interface comprises instructions that, when executed by at least one processor of the client device, cause the client device to receive one of the respective notifications from the notification service and pass the notification to the orchestration agent.

25. The system of claim 24 further comprising:
- a data store that stores one or more files shared between the plurality of client devices;
- wherein the set of client-side orchestration components comprises, for each client device of the plurality of client devices:
  - a remote file interface comprising instructions that, when executed by at least one processor of the client device, cause the client device to retrieve a file from the data store using a storage location included in one of the respective notifications received at the client device,
  - an application resolver comprising instructions that, when executed by the at least one processor of the client device, cause the client device to identify which application at the client device is capable of opening the file, and
  - an application launcher comprising instructions that, when executed by the at least one processor of the client device, cause the client device to launch the application capable of opening the file.

26. The system of claim 25 wherein:

one of the respective notifications received at the client device includes a shared link; the application resolver further comprises instructions that, when executed by the at least one processor of the client device, cause the client device to identify which application at the client device is capable of handling the shared link; and the application launcher further comprises instructions that, when executed by the at least one processor of the client device, cause the client device to launch the application capable of handling the shared link.

27. The system of claim 25 wherein:

the set of server-side orchestration components further comprise a clipboard that is accessible to multiple client devices of the plurality client devices and that stores content associated with a copy command at a first client device of the plurality of client devices; and the orchestration service further comprises instructions that, when executed by the at least one processor of the orchestration server, provides the content stored at the clipboard to a second client device of the plurality of client devices in response to a paste command at the second client device.

28. The system of claim 23 wherein:

the set of server-side orchestration components comprises a device service comprising instructions that, when executed by the at least one processor of the orchestration server, cause the orchestration server to manage device information related to the plurality of client devices; and the set of client-side orchestration components further comprise, for each client device of the plurality of client devices, a presence service comprising instructions that, when executed cause the client device to indicate an availability of the client device to the device service.

* * * * *